US012560000B2

(12) United States Patent
Saito

(10) Patent No.: US 12,560,000 B2
(45) Date of Patent: Feb. 24, 2026

(54) MOTORIZED LOCKING DEVICE FOR OPENING/SHUTTING UNIT

(71) Applicant: PIOLAX, INC., Kanagawa (JP)

(72) Inventor: Jun Saito, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 94 days.

(21) Appl. No.: 18/279,155

(22) PCT Filed: Feb. 14, 2022

(86) PCT No.: PCT/JP2022/005684
§ 371 (c)(1),
(2) Date: Aug. 28, 2023

(87) PCT Pub. No.: WO2022/185890
PCT Pub. Date: Sep. 9, 2022

(65) Prior Publication Data
US 2024/0141706 A1 May 2, 2024

(30) Foreign Application Priority Data
Mar. 5, 2021 (JP) ................................ 2021-035275

(51) Int. Cl.
*E05B 83/30* (2014.01)
*E05B 81/06* (2014.01)
(Continued)

(52) U.S. Cl.
CPC .............. *E05B 83/30* (2013.01); *E05B 81/06* (2013.01); *E05B 81/18* (2013.01); *E05B 81/30* (2013.01); *E05B 81/36* (2013.01); *E05C 9/04* (2013.01)

(58) Field of Classification Search
CPC .......... E05B 83/30; E05B 81/06; E05B 81/18; E05B 81/30; E05B 81/36; E05C 9/04; E05C 9/042
(Continued)

(56) References Cited

U.S. PATENT DOCUMENTS 9,689,183 B2 * 6/2017 Ito .......................... E05B 81/06
2007/0080542 A1 * 4/2007 Ookawara .............. E05B 83/30 292/36
(Continued)

FOREIGN PATENT DOCUMENTS

FR 3004207 A1 * 10/2014 .......... E05B 15/004
FR 3064660 A1 * 10/2018 ......... E05B 15/1635
(Continued)

OTHER PUBLICATIONS

Apr. 19, 2022, International Search Report issued for related PCT Application No. PCT/JP2022/005684.
(Continued)

*Primary Examiner* — Kristina R Fulton
*Assistant Examiner* — James Edward Ignaczewski
(74) *Attorney, Agent, or Firm* — Paratus Law Group, PLLC

(57) ABSTRACT

An electric lock device for an opening and closing member includes: a lock portion; a rod; a biasing member; and an actuator. The actuator includes a case, a motor, a wheel, and a rotor. The wheel is provided with a pressing portion that is configured to engage with a receiving portion provided on the rotor or the rod when the wheel rotates in a predetermined direction to move the rod. When a rotation force is applied to the rotor in a direction against a biasing force of the biasing member via the rod in a state where the rod is biased by the biasing member in a direction in which the rod is engaged with the lock portion, the rotor is capable of rotating independently of the wheel in a direction in which the receiving portion is separated from the pressing portion.

13 Claims, 37 Drawing Sheets

(51) Int. Cl.

| | |
|---|---|
| ***E05B 81/18*** | (2014.01) |
| ***E05B 81/30*** | (2014.01) |
| ***E05B 81/36*** | (2014.01) |
| ***E05C 9/04*** | (2006.01) |

(58) Field of Classification Search
USPC .............................................................. 70/277
See application file for complete search history.

(56) References Cited

U.S. PATENT DOCUMENTS

| | | | | |
|---|---|---|---|---|
| 2015/0137527 | A1* | 5/2015 | Hattori | F16H 19/02 292/144 |
| 2018/0347241 | A1* | 12/2018 | Nakasone | E05C 9/04 |
| 2018/0371795 | A1* | 12/2018 | Nakasone | E05C 9/041 |
| 2020/0056399 | A1* | 2/2020 | Mäkitalo | E05B 1/0046 |
| 2020/0308881 | A1* | 10/2020 | Nakasone | E05C 9/04 |
| 2020/0340276 | A1* | 10/2020 | Kulicki | E05B 81/36 |
| 2022/0341224 | A1* | 10/2022 | Minnich | E05B 81/06 |
| 2024/0018812 | A1* | 1/2024 | Wu | E05C 9/22 |

FOREIGN PATENT DOCUMENTS

| | | | |
|---|---|---|---|
| JP | 2013-234742 | A | 11/2013 |
| WO | WO 2016/185973 | A1 | 11/2016 |

OTHER PUBLICATIONS

Apr. 19, 2022, International Search Opinion issued for related PCT Application No. PCT/JP2022/005684.

* cited by examiner

MOTORIZED LOCKING DEVICE FOR OPENING/SHUTTING UNIT

CROSS REFERENCE TO PRIOR APPLICATION

This application is a National Stage Patent Application of PCT International Patent Application No. PCT/JP2022/005684 (filed on Feb. 14, 2022) under 35 U.S.C. § 371, which claims priority to Japanese Patent Application No. 2021-035275 (filed on Mar. 5, 2021), which are all hereby incorporated by reference in their entirety.

TECHNICAL FIELD

The present invention relates to an electric lock device for an opening and closing member, the electric lock device being for locking the opening and closing member openably and closably attached to an opening portion in a fixed member to a closed state.

BACKGROUND ART

For example, an opening and closing member such as a lid is openably and closably attached to an opening portion formed in a fixed member such as a glovebox of an automatic vehicle. Between the opening portion and the opening and closing member, a lock device is provided which can lock when the opening and closing member is closed and release the lock when the opening and closing member is opened. A lock device that releases locking using an electric actuator is also known.

For example, Patent Literature 1 described below describes an electric lock device for an opening and closing member. The electric lock device includes a pair of lock portions provided on an opening portion in a fixed member, a pair of rods engaged with and disengaged from the lock portions, a biasing member that biases the rods in a direction in which the rods are brought into engagement with the lock portions, and an actuator for sliding the pair of rods to disengage from the pair of lock portions. The actuator includes a case having an opening portion, a motor arranged within the case, a worm rotated by the motor, and a worm wheel supported rotatably on the case and rotating in conjunction with the worm. The worm wheel includes a rotating portion protruding outwards of the case from the opening portion of the case, and proximal end portions of the pair of rods are assembled individually to the rotating portion in a conjunction manner.

When the opening and closing member is opened from the opening portion in the fixed member by the electric lock device, first, the worm is rotated by the motor. Thus, the worm wheel rotates in conjunction with the worm, and the pair of rods disengage from the lock portion, and thus the lock of the opening and closing member can be released, and the opening and closing member can be opened from the opening portion.

CITATION LIST

Patent Literature

Patent Literature 1: WO2016/185973A1

SUMMARY OF INVENTION

Technical Problem

In the electric lock device of Patent Literature 1 described above, in a state in which the opening and closing member is opened from the opening portion, the pair of rods protrude in the direction in which the pair of rods are brought into engagement with the lock portions via the biasing member. When the opening and closing member is pushed in from this state, the pair of rods are pushed against a peripheral edge of the opening portion and are drawn into a direction in which the pair of rods disengage from the lock portions, and at this time, the worm wheel is also rotated. However, since the worm wheel meshes with the worm, the worm wheel receives resistance from the worm during rotation of the worm wheel, and thus a pushing load when pushing the opening and closing member is relatively high.

Therefore, an object of the present invention is to provide an electric lock device for an opening and closing member capable of reducing a pushing load of the opening and closing member when an opening portion in a fixed member is closed by the opening and closing member.

Solution to Problem

In order to achieve the above object, the present invention is an electric lock device for an opening and closing member configured to be openably and closably attached to an opening portion in a fixed member. The electric lock device includes: a lock portion provided on one of the opening and closing member er and the opening portion in the fixed member; a rod slidably arranged on the other of the opening and closing member and the fixed member and configured to engage with and disengage from the lock portion; a biasing member configured to directly or indirectly bias the rod in a direction in which the rod is brought into engagement with the lock portion; and an actuator arranged on the other of the opening and closing member and the fixed member and configured to slide the rod to disengage from the lock portion. The actuator includes a case attached to the other of the opening and closing member and the fixed member, a motor arranged within the case, a wheel configured to rotate in conjunction with the motor, and a rotor rotatably supported within the case and configured to engage with the rod and to cause the rod to engage with and disengage from the lock portion by the rotation operation. The wheel is provided with a pressing portion that is configured to engage with a receiving portion provided on the rotor or the rod when the wheel rotates in a predetermined direction to move the rod against a biasing force of the biasing member in a direction in which the rod disengages from the lock portion. When a rotation force is applied to the rotor in a direction against the biasing force of the biasing member via the rod in a state where the rod is biased by the biasing member in a direction in which the rod is engaged with the lock portion, the rotor is capable of rotating independently of the wheel in a direction in which the receiving portion is separated from the pressing portion.

Advantageous Effects of Invention

According to the present invention, in a state in which the rod is engaged with the lock portion, the motor is operated to rotate the wheel in the predetermined direction, whereby the pressing portion of the wheel is brought into contact with the receiving portion of the rotor, the rotor rotates against the biasing force of the biasing member, and the rod is disengaged from the lock portion, and thus the lock of the opening and closing member can be electrically released. Next, when the opening and closing member is pivoted in a closing direction in a state in which the opening and closing member is opened, the rod is brought into contact with an edge portion of the lock portion, and a force for drawing the rod against the biasing force of the biasing member acts, but the rotor can rotate independently of the wheel at this time, the rod can be drawn in without requiring much pushing force for the opening and closing member so as to ride over the edge portion of the lock portion and engage with the lock portion again. As a result, it is possible to reduce the pushing load when the opening and closing member is closed.

DESCRIPTION OF EMBODIMENTS (First Embodiment of Electric Lock Device for Opening and Closing Member)

Hereinafter, a first embodiment of an electric lock device for an opening and closing member according to the present invention will be described with reference to the drawings.

Figure 15:
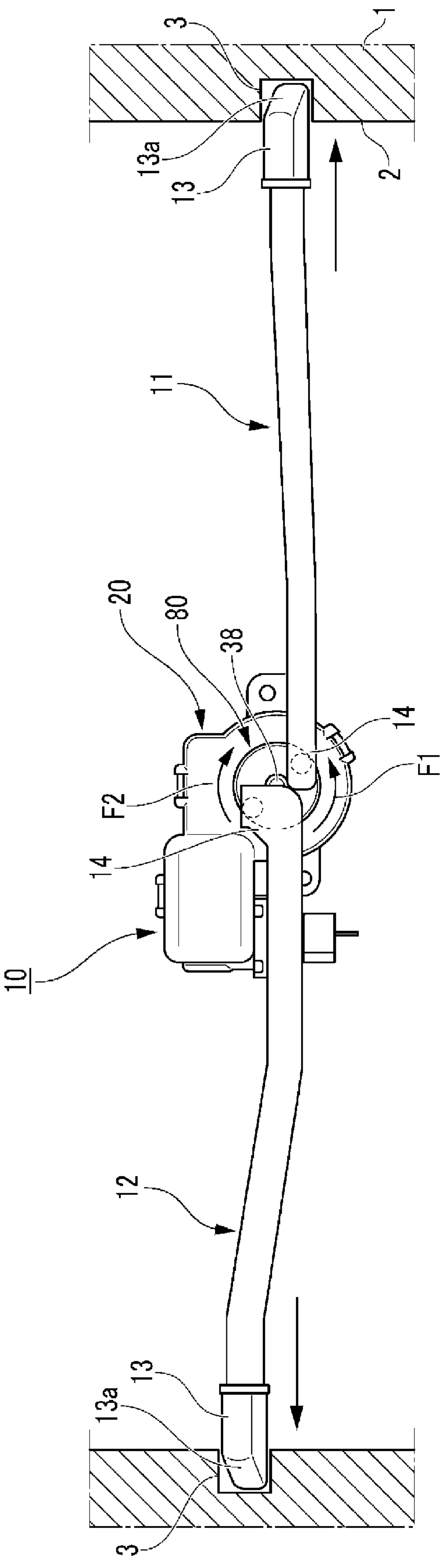
FIG. 15 is an explanatory view in a case where the opening and closing member is locked in a closed state by the electric lock device.
Figure 16:
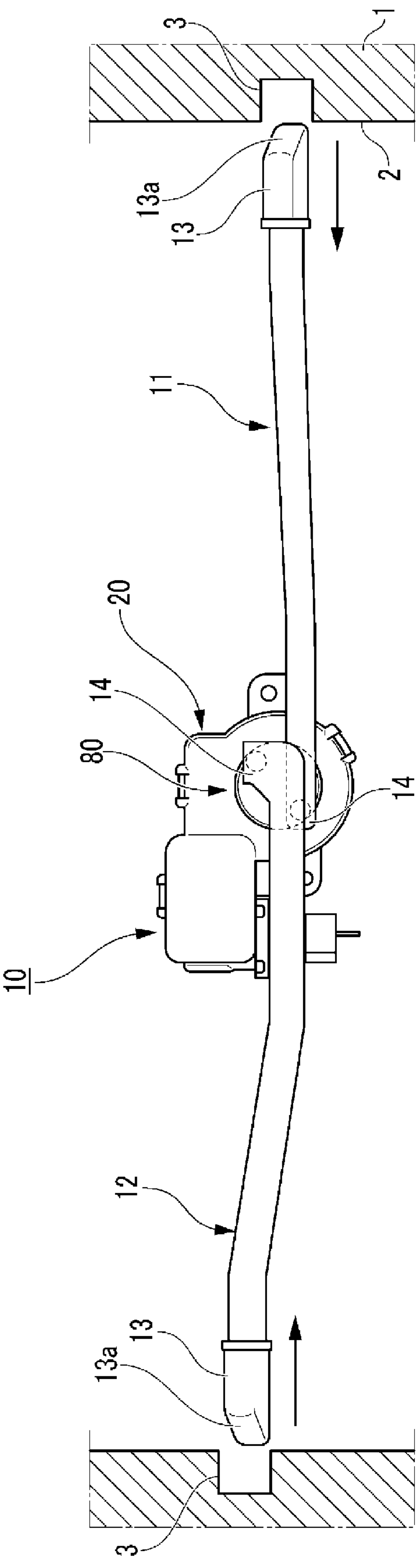
FIG. 16 is an explanatory view in a case where the lock in the state in which the opening and closing member is closed is released from the state shown in FIG. 15.

As shown in FIGS. 15 and 16, an electric lock device 10 for an opening and closing member (hereinafter, also simply referred to as an "electric lock device 10") according to this embodiment locks an opening and closing member 5, such as a glovebox, which is openably and closably attached to an opening portion 2 of a fixed member 1 such as an instrument panel of a vehicle to a closed state with respect to the opening portion 2 of the fixed member 1, and electrically opens the opening and closing member 5 in the locked state by an actuator 20, for example.

The electric lock device 10 of this embodiment includes a pair of lock portions 3 and 3 provided on the opening portion 2 of the fixed member 1 (refer to FIG. 15), a pair of rods 11 and 12 slidably arranged on an opening and closing member 5 (refer to FIGS. 17A to 18C) side and engaging with and disengaging from the pair of lock portions 3 and 3, a torsion spring 15 that indirectly biases the pair of rods 11 and 12 in a direction in which the pair of rods 11 and 12 are constantly engaged with the pair of lock portions 3 and 3, and an actuator 20 that is arranged on the opening and closing member 5 side and slides the pair of rods 11 and 12 to disengage the pair of rods 11 and 12 from the pair of lock portions 3 and 3. The torsion spring 15 serves as a "biasing member" in the present invention.

The actuator 20 includes a case 21 arranged on the opening and closing member 5 side, a motor 22 arranged within the case 21, a wheel 60 that rotates in conjunction with the motor 22, and a rotor 80 rotatably supported within the case 21 and inside the wheel 60, pivotally supported by engaging the pair of rods 11 and 12, and causing the pair of rods 11 and 12 to engage with and disengaging from the pair of lock portions 3 and 3 by a rotation operation.

Figure 1:
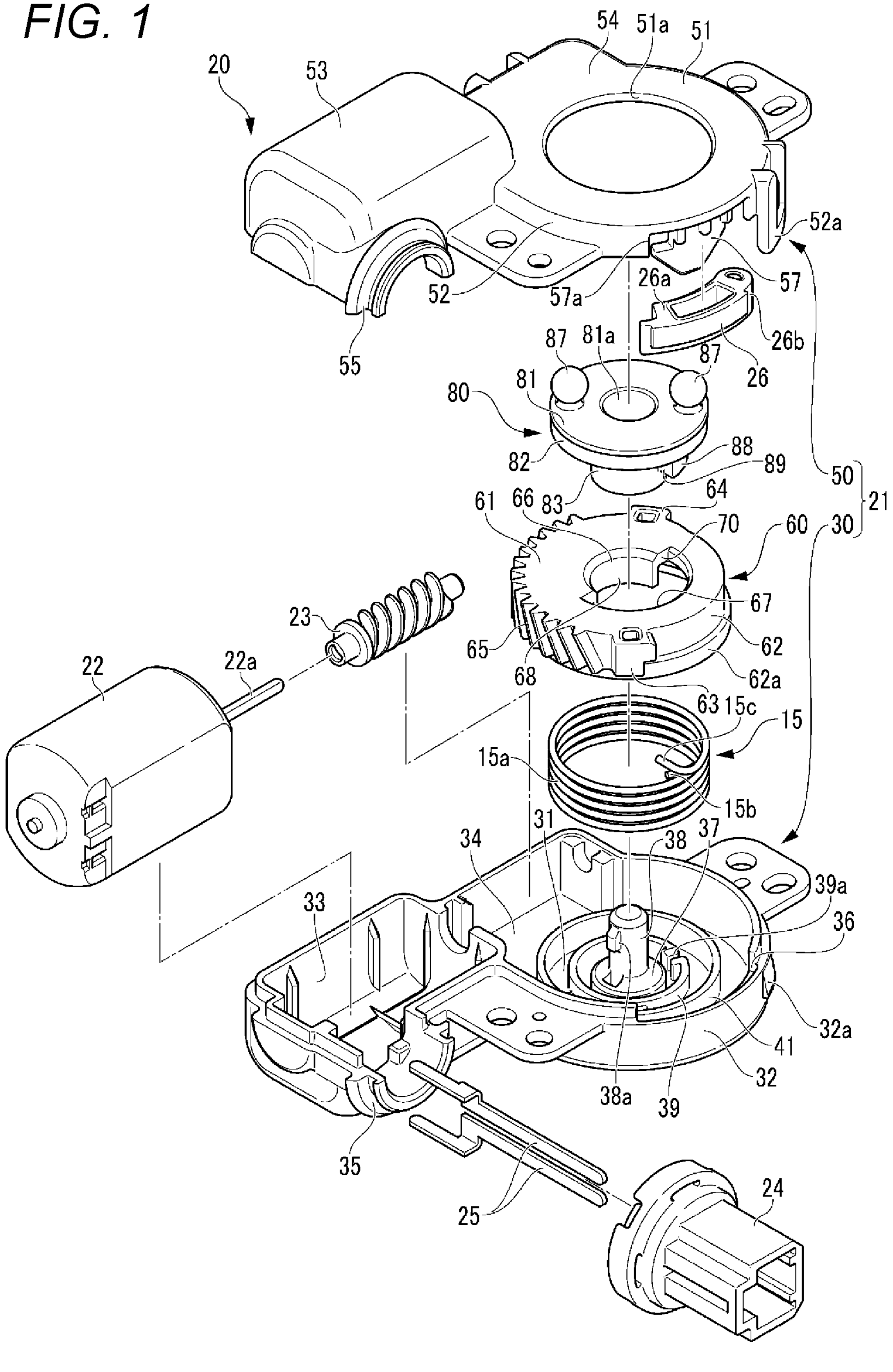
FIG. 1 is an exploded perspective view of an actuator constituting an electric lock device for an opening and closing member according to the present invention, showing a first embodiment of the electric lock device.

As shown in FIG. 1, in the actuator 20 of this embodiment, a gear 23 is provided on a drive shaft 22*a* of the motor 22 (the gear 23 is fixed to the drive shaft 22*a* in a rotation-restricting state). The gear 23 in this embodiment is a so-called worm gear that extends by predetermined length and has helical teeth formed on an outer periphery thereof. The gear 23 meshes with the wheel 60, and when the gear 23 is rotated by the motor 22, the wheel 60 rotates in conjunction with the gear 23. Further, the actuator 20 is assembled with an elastic member 26 made of an elastic material such as rubber.

As described above, the electric lock device may be applied to, for example, a structure in which a box-shaped glovebox is attached to an opening portion of an instrument panel in a pivoting manner (in this case, the instrument panel serves as the "fixed member" and the glovebox serves as the "opening and closing member") or a structure in which a lid is openably and closably attached to the opening portion of an instrument panel (in this case, the instrument panel serves as the "fixed member" and the lid serves as the "opening and closing member"), or can be widely used in various kinds of opening and closing members that open and close an opening portion of a fixed member.

As shown in FIGS. 15 and 16, in this embodiment, the pair of lock portions 3 and 3 having a hole shape are provided on both sides in a width direction of the opening portion 2 of the fixed member 1. The lock portion may have a concave shape, a protruding shape, a frame shape, or the like instead of the hole shape, may be provided on the opening and closing member instead of the fixed member, and is not particularly limited.

Further, a switch (a touch switch, a push button type switch, a lever type switch, or the like) (not shown) for operating the motor 22 is arranged at a predetermined position on a surface side of the opening and closing member 5.

The torsion spring 15 includes a winding portion 15*a* formed by winding a wire, a first arm portion 15*b* protruding inward from one end of the winding portion 15*a* in a circumferential direction, and a second arm portion 15*c* protruding inward from the other end of the winding portion 15*a* in the circumferential direction. The rotor 80 is rotationally biased in a predetermined direction by the torsion spring 15 (details will be described later). In this embodiment, a direction indicated by an arrow F1 in FIGS. 9, 10, and 15 means a rotation biasing direction of the rotor 80 by the torsion spring 15, which is the biasing member.

As shown in FIGS. 15 and 16, each of the rods 11 and 12 has a rod shape, and an engagement portion 13 having a tapered surface is provided at a distal end portion in an axis direction of each of the rods 11 and 12, and the engagement portions 13 and 13 engage with and disengage from the pair of lock portions 3 and 3. Further, a tapered surface 13*a* is formed on a side of the engagement portion 13 in a pushing direction of the opening and closing member 5 with respect to the opening portion 2 of the fixed member 1. The engagement portion 13 may be provided at the intermediate portion of the rods 11 and 12 in the axis direction instead of the distal end portions of the rods 11 and 12.

In the pair of rods 11 and 12, proximal end portions 14 and 14 are pivotally supported by the rotor 80, and the engagement portions 13 and 13 on a distal end side are biased via the rotor 80 rotationally biased by the torsion spring 15 in a direction in which the engagement portions 13 and 13 are engaged with the pair of lock portions 3 and 3 (see arrows in FIG. 15). That is, the pair of rods 11 and 12 in the present embodiment is indirectly slid and biased by the torsion spring 15, which is the biasing member, in the direction in which the pair of rods 11 and 12 are constantly engaged with the pair of lock portions 3 and 3. The rod may be directly slid and biased by the biasing member in a direction in which the rod is engaged with the lock portion 3 (this will be described in another embodiment).

In this embodiment, the rods 11 and 12 are slidably arranged on the opening and closing member 5, and the lock portion 3 is formed on an opening portion 2 side of the fixed member 1. On the contrary, the rod may be slidably arranged on a fixed member side, and the lock portion may be provided on an opening and closing member side. The rods 11 and 12 in this embodiment are a pair of rods, but may be a single rod.

Next, the case 21 constituting the actuator 20 will be described in detail.

As shown in FIG. 1, the case 21 of this embodiment includes a first case 30 and a second case 50 assembled to the first case 30.

Figure 4:
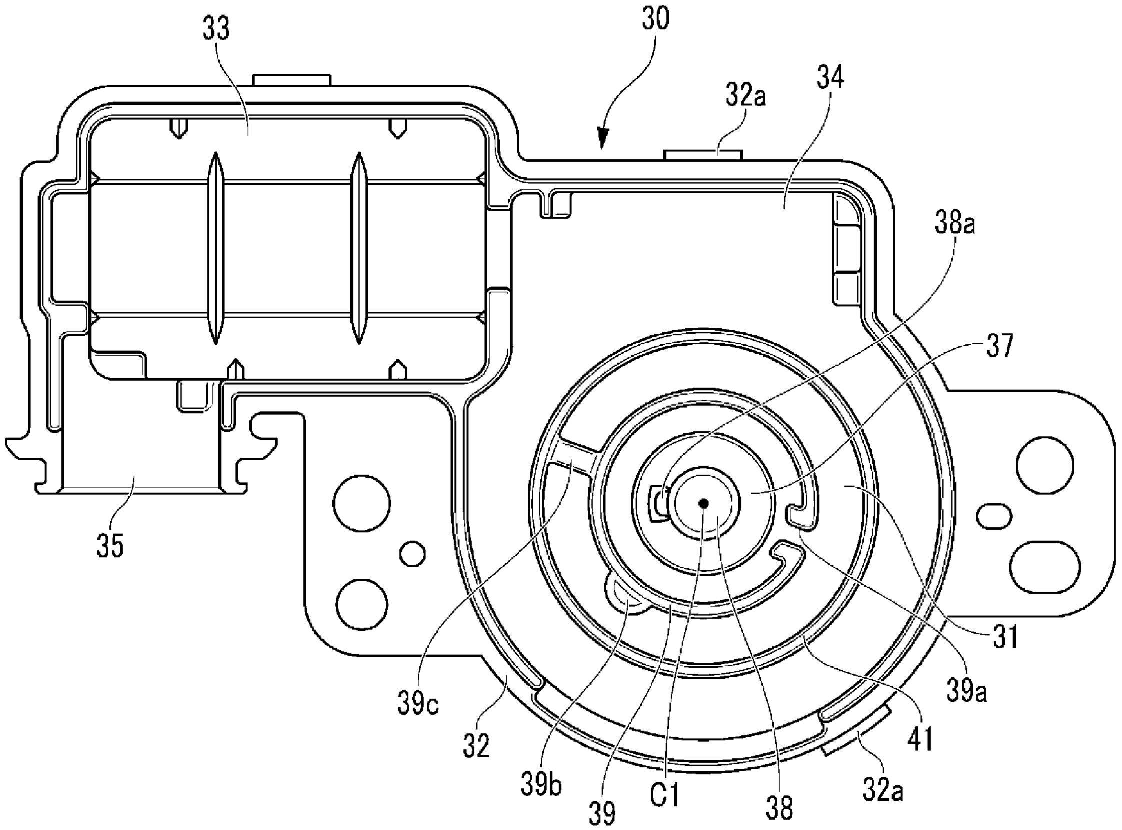
FIG. 4 is a plan view of a first case constituting a case of the actuator.

As shown in FIGS. 1 and 4, the first case 30 includes a bottom wall 31 and a peripheral wall 32 erected from a peripheral edge of the bottom wall 31 and has a bottomed frame shape in which an opposite surface side (upper side) facing the second case 50 is opened.

In addition, the first case 30 includes a motor arrangement portion 33 in which the motor 22 is arranged and a gear arrangement portion 34 which is provided adjacent to the motor arrangement portion 33 on a drive shaft 22*a* (refer to FIG. 1) side of the motor 22 and in which the gear 23, the wheel 60, and the rotor 80 are arranged. A connector insertion portion 35 into which a power connector (not shown) for supplying electricity to the motor 22 is inserted is provided on one side portion of the motor arrangement portion 33 of the first case 30.

Figure 2:
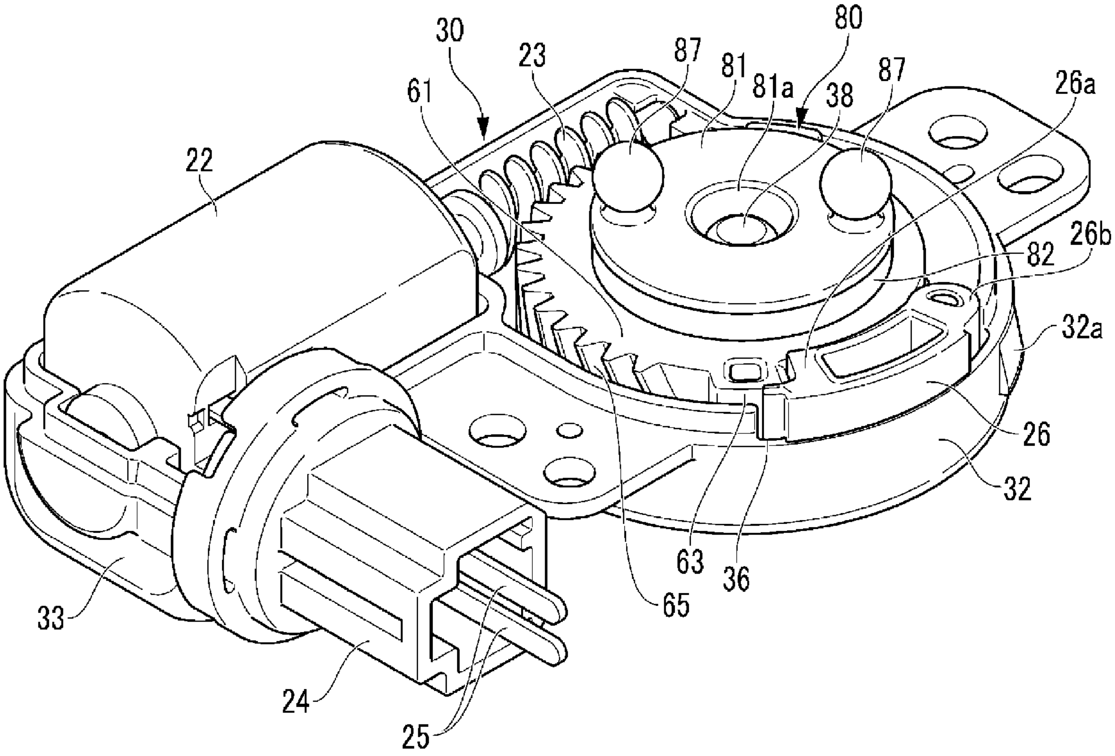
FIG. 2 is a perspective view of the actuator in a state in which a second case is removed.

Further, a portion of the peripheral wall 32 on a gear arrangement portion 34 side and opposite to an arrangement position of the gear 23 has a curved surface shape. In this curved surface portion, an elastic member arrangement concave portion 36 having a concave groove shape is formed, and a portion of the elastic member 26 is accommodated and arranged (refer to FIG. 2). In addition, a plurality of engagement protrusions 32*a* for assembling with the second case 50 are provided in a protruding manner at predetermined positions on an outer periphery of the peripheral wall 32.

Further, a substantially columnar support shaft 38 for rotatably supporting the rotor 80 is provided to protrude from an inner surface of the bottom wall 31 on a gear arrangement portion 34 side. The support shaft 38 is provided to protrude from a radial center portion of a raised portion 37 via the raised portion 37 raised from the inner surface of the bottom wall 31. The support shaft 38 extends perpendicularly to a surface direction of the inner surface of the bottom wall 31, and an axis thereof is indicated by a reference numeral "C1" (refer to FIG. 9). Further, one convex portion 38*a* is provided to protrude from an outer periphery of a distal end portion in a protruding direction of the support shaft 38. The support shaft 38 serves as a "rotation support portion configured to rotatably support the rotor" in the present invention.

Further, a spring lock wall 39 is erected on the inner surface of the bottom wall 31 on the gear arrangement portion 34 side and on the outer periphery of the support shaft 38 to form a concentric shape. In the spring lock wall 39, a notched groove-shaped spring lock groove 39*a* is formed at one position in the circumferential direction and has a substantially C-shaped annular shape. The first arm portion 15*b* of the torsion spring 15 is locked in the spring lock groove 39*a*.

Figure 11:
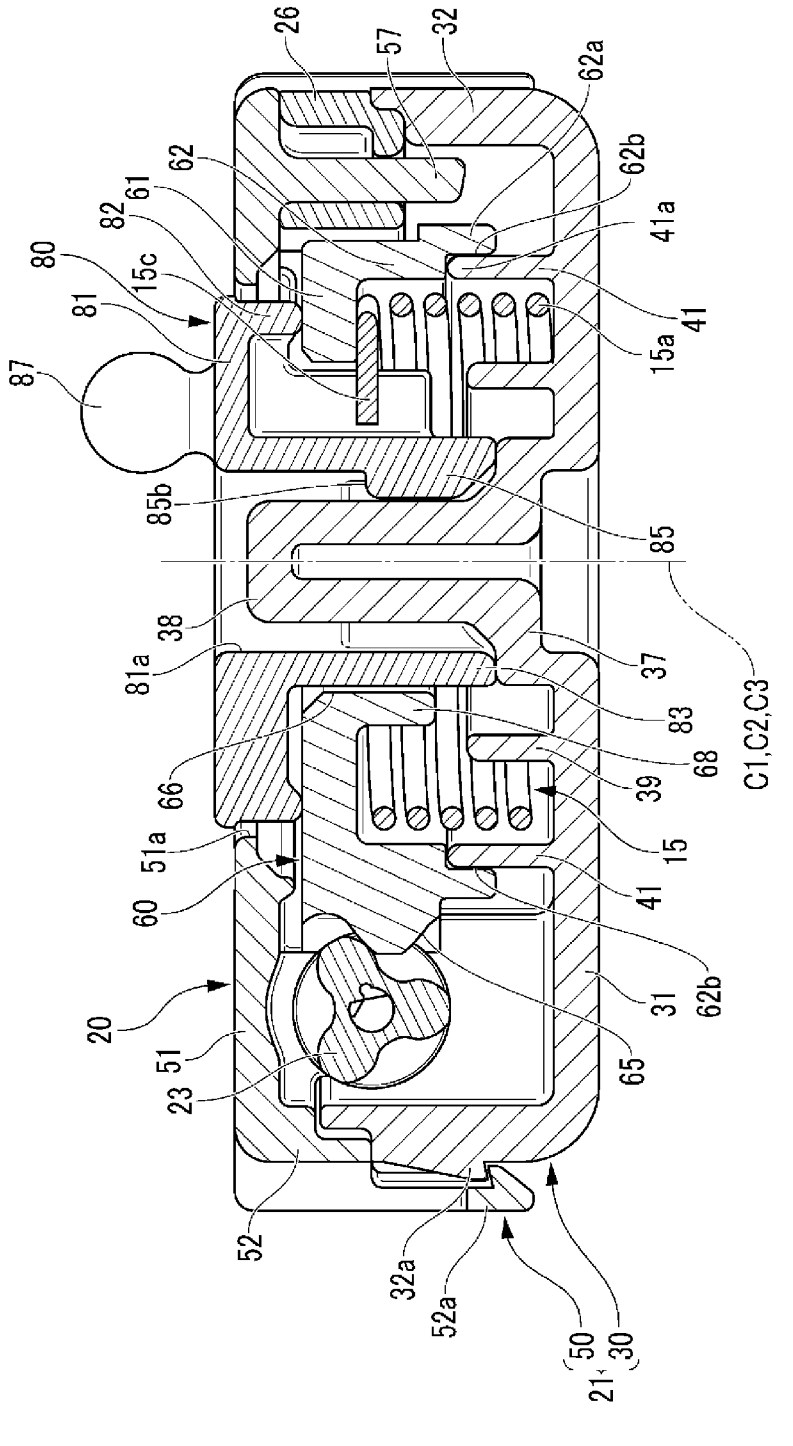
FIG. 11 is a cross-sectional view taken along line B-B of FIG. 3.

Further, a cylindrical wall 41 having a substantially cylindrical shape is erected on the inner surface of the bottom wall 31 on the gear arrangement portion 34 side and on the outer periphery of the spring lock wall 39. The cylindrical wall 41 is arranged concentrically with respect to the support shaft 38 and the spring lock wall 39. As shown in FIG. 11, the wheel 60 is rotatably supported by a distal end portion 41*a* in a protruding direction of the cylindrical wall 41.

The winding portion 15*a* of the torsion spring 15 is arranged between the spring lock wall 39 and the cylindrical wall 41. Further, as shown in FIG. 4, a protrusion portion 39*b* is provided to protrude from one position on the outer periphery of the spring lock wall 39, and a rib 39*c* is provided between the spring lock wall 39 and the cylindrical wall 41. The protrusion portion 39*b* and the rib 39*c* can suppress abnormal noise generated when the winding portion 15*a* of the torsion spring 15 is deformed.

On the other hand, the second case 50 assembled to the first case 30 includes a ceiling wall 51 and a peripheral wall 52 vertically provided from a peripheral edge of the ceiling wall 51 and has a frame shape in which an opposite surface side (lower side) with respect to the first case 30 is opened.

As shown in FIG. 1, the second case 50 is provided with a motor arrangement portion 53, a gear arrangement portion 54, and a connector insertion portion 55 at positions corresponding to the motor arrangement portion 33, the gear arrangement portion 34, and the connector insertion portion 35 of the first case 30, respectively.

A circular opening portion 51*a* is formed in the ceiling wall 51 on the gear arrangement portion 54 side so that a base portion 81 of the rotor 80, which will be described later, protrudes therefrom.

Figure 3:
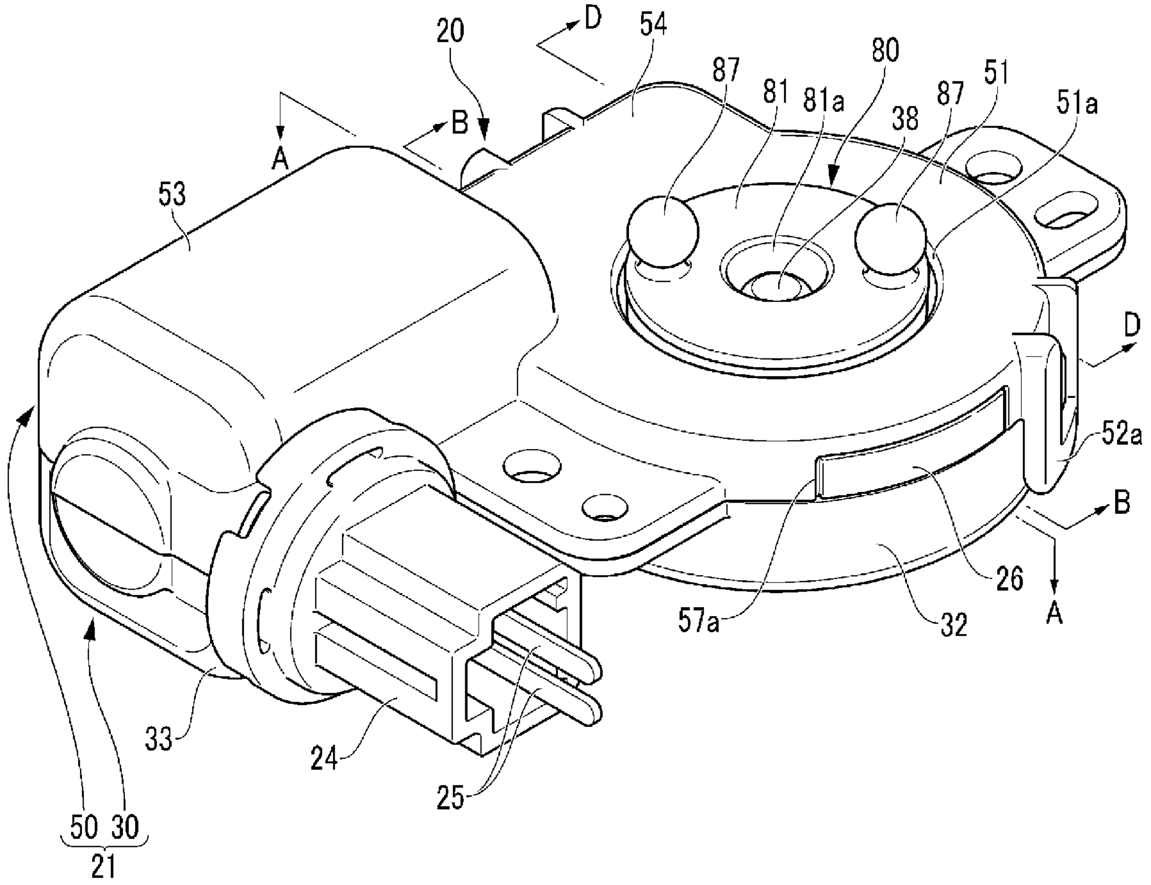
FIG. 3 is a perspective view of the actuator.

Further, a plurality of engagement pieces 52*a* are vertically provided on an outer periphery of the peripheral wall 52 and at positions corresponding to the plurality of engagement protrusions 32*a* of the first case 30. By engaging the plurality of engagement pieces 52*a* with the corresponding engagement protrusions 32*a*, the first case 30 and the second case 50 are assembled to form the case 21 as shown in FIG. 3. Inside the case 21, an arrangement space for the motor 22 is provided by the motor arrangement portions 33 and 53, an arrangement space for the gear 23, the wheel 60, and the rotor 80 is provided by the gear arrangement portions 34 and 54, and a connector insertion portion is provided by the connector insertion portions 35 and 55.

The motor 22 arranged in the motor arrangement space of the case 21 is electrically connected to the power connector (not shown) via a pair of bus bars 25 and 25, and the drive shaft 22*a* of the motor 22 is rotated by an operation of the switch (not shown) arranged on the surface side of the opening and closing member 5.

A cylindrical connector case 24 separate from the case 21 is assembled to the connector insertion portion (refer to FIG. 1). Inside the connector case 24, the pair of bus bars 25 and 25 are arranged, and the power connector (not shown) for supplying electricity to the motor 22 is inserted.

Further, a notch 57*a* is formed in a portion of the peripheral wall 52 on the gear arrangement portion 54 side opposite to the arrangement position of the gear 23 and at a position matching the elastic member arrangement concave portion 36 of the first case 30 (refer to FIG. 1). A wide protrusion piece 57 protrudes from an inner surface of the notch 57*a*, and the elastic member 26 is attached to the protrusion piece 57.

The case described above includes a pair of cases 30 and 50, but may be one member. Further, a shape and a structure of each portion (the bottom wall, the peripheral wall, the support shaft, the spring lock wall, the cylindrical wall, the engagement protrusion, the engagement piece, the protrusion piece, and the like) of each case are not limited to the above-described aspect.

Next, the wheel 60 will be described in detail.

Figure 5:
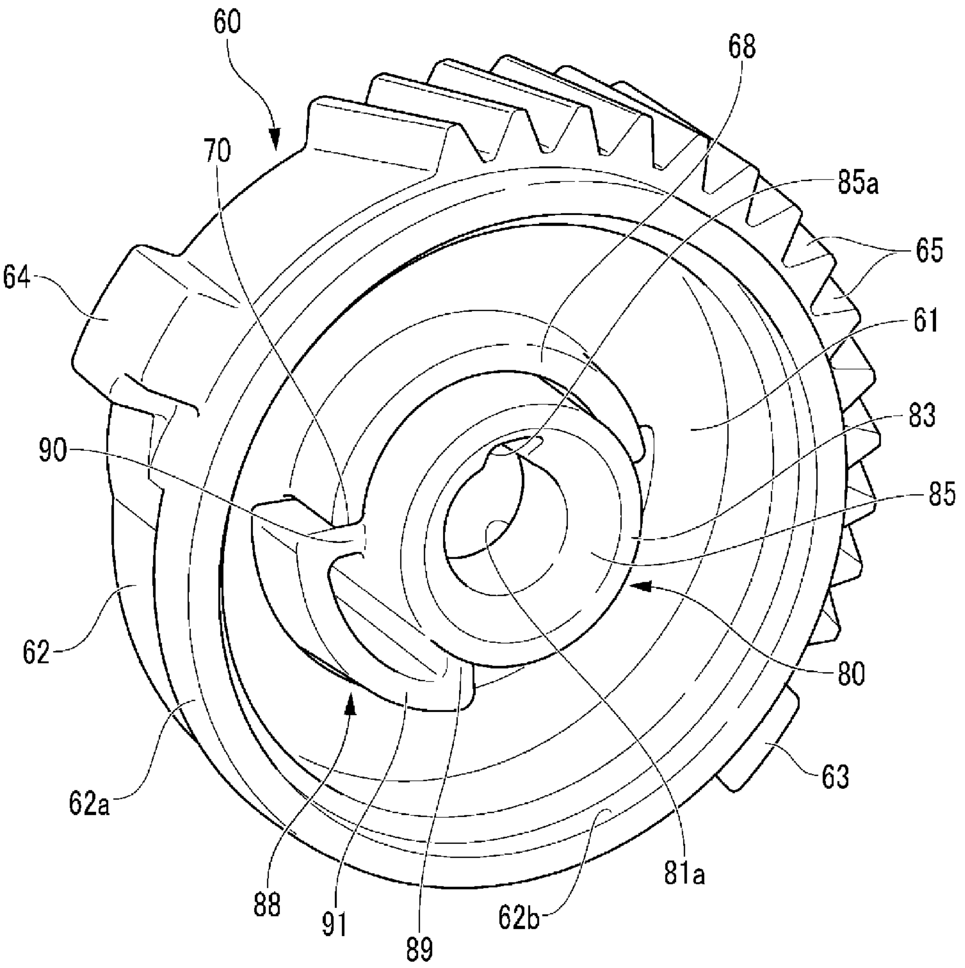
FIG. 5 is an assembly perspective view of a wheel and a rotor constituting the actuator.
Figure 6:
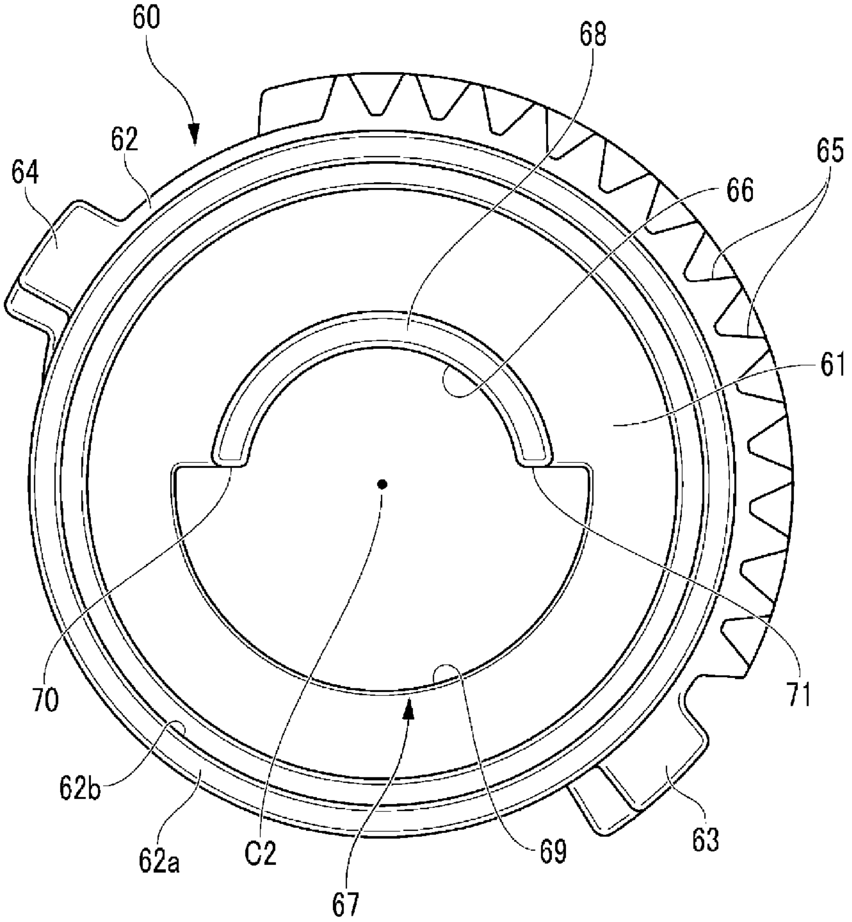
FIG. 6 is a rear view of the wheel constituting the actuator.

As shown in FIGS. 1, 5, and 6, the wheel 60 is separate from the rotor 80 and is rotatably supported by the case 21. The wheel 60 is provided with the pressing portion 70 that engages with a receiving portion 90 provided on the rotor 80 when the wheel 60 rotates in a predetermined direction to move the rods 11 and 12 against a biasing force of the biasing member (torsion spring 15) in a direction in which the rods 11 and 12 are disengaged from the lock portions 3.

More specifically, the wheel 60 of this embodiment includes a base portion 61 having a substantially circular plate shape and a peripheral wall 62 extending from a peripheral edge of the base portion 61 in a rotation axis direction of the wheel 60 and having a substantially cylindrical shape. The peripheral wall 62 of this embodiment extends perpendicularly to the base portion 61 from the peripheral edge of the base portion 61 toward a bottom wall 31 side of the first case 30. As shown in FIG. 11, the winding portion 15*a* of the torsion spring 15 is arranged inside the peripheral wall 62 of the wheel 60. A rotation axis of the wheel 60 means an axis passing through a rotation center C2 (refer to FIG. 9) of the wheel 60, and the rotation axis direction of the wheel 60 means a direction extending along the axis.

Figure 10:
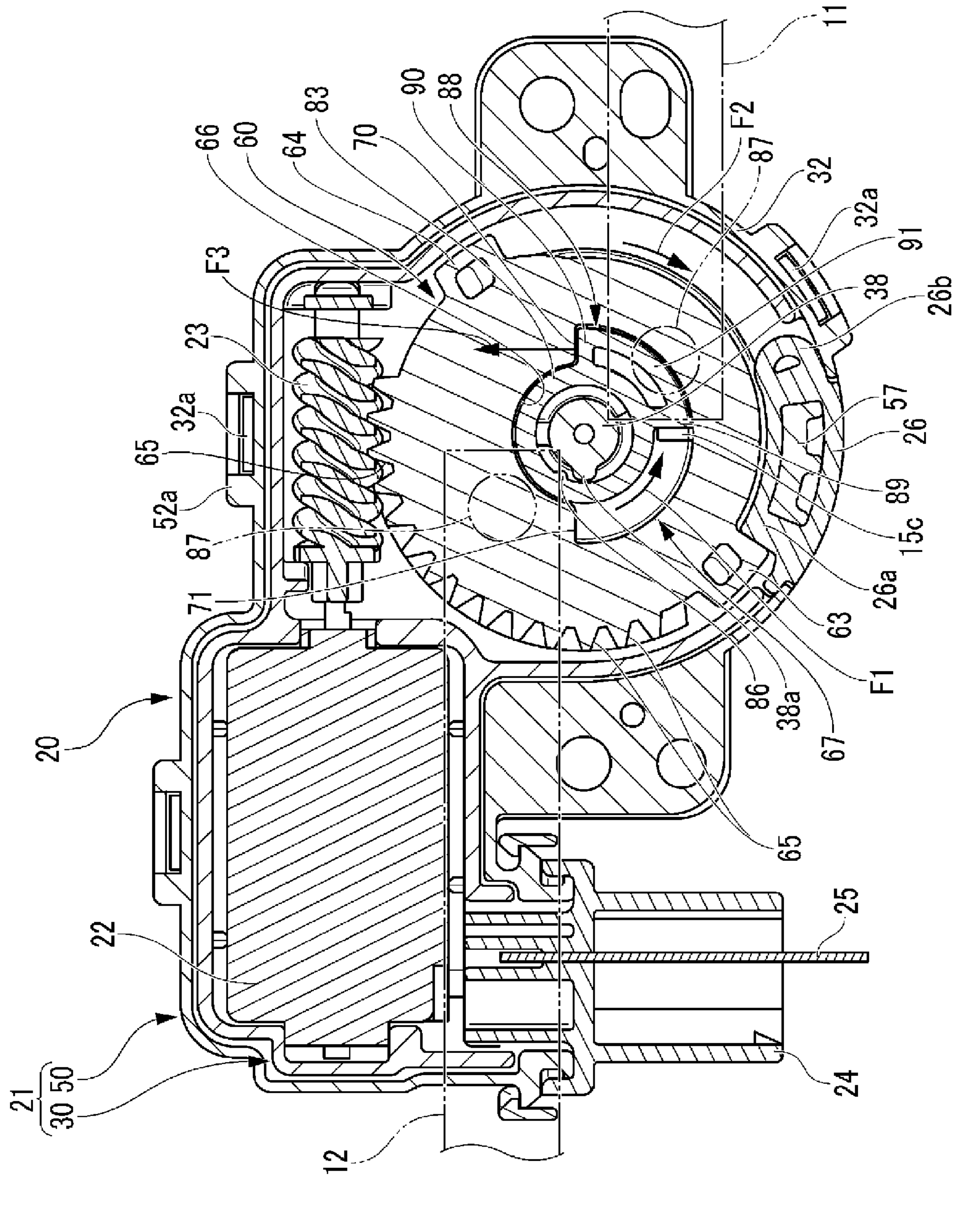
FIG. 10 is a cross-sectional view taken along line A-A of FIG. 3.
Figure 13:
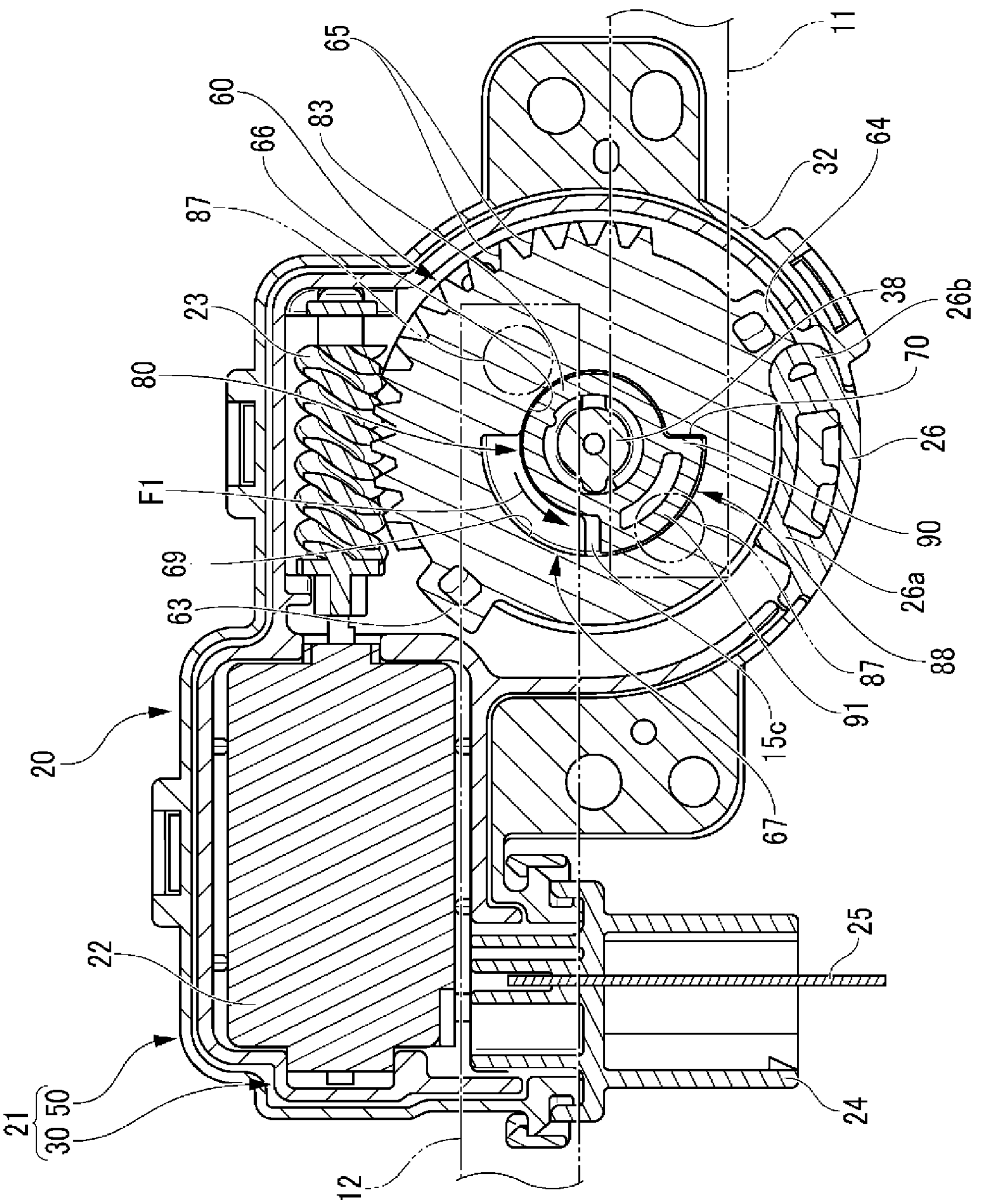
FIG. 13 is a sectional explanatory view showing a state in which the rotor is rotated in a predetermined direction from a state shown in FIG. 10.

A pair of protruding portions 63 and 64 are provided to protrude from predetermined positions on an outer periphery of the peripheral wall 62. As shown in FIG. 10, in a state in which the motor 22 does not operate and the gear 23 does not rotate, one of the protruding portion 63 is brought into contact with one end portion 26*a* of the elastic member 26, and a rotation position of the wheel 60 is restricted. As shown in FIG. 13, when the motor 22 operates to rotate the gear 23 and the wheel 60 is maximally rotated in a direction opposite to a rotation biasing direction of the rotor 80, the other protruding portion 64 is brought into contact with the other end portion 26*b* of the elastic member 26, and the rotation position of the wheel 60 is restricted.

Furthermore, helical (slanted) teeth 65 that mesh with the gear 23 are formed on the outer periphery of the peripheral wall 62 and between the pair of protruding portions 63 and 64. As a result, when the drive shaft 22*a* of the motor 22 is driven to rotate the gear 23, the wheel 60 rotates in a predetermined direction in conjunction with the gear 23. The configuration for rotating the wheel may not be a combination of a worm gear and a helical gear, and for example, a spur gear may be fixed to a drive shaft of the motor, and spur teeth meshing with the spur gear may be formed on the outer periphery of the wheel, as long as the wheel may be in conjunction with the motor.

Figure 8:
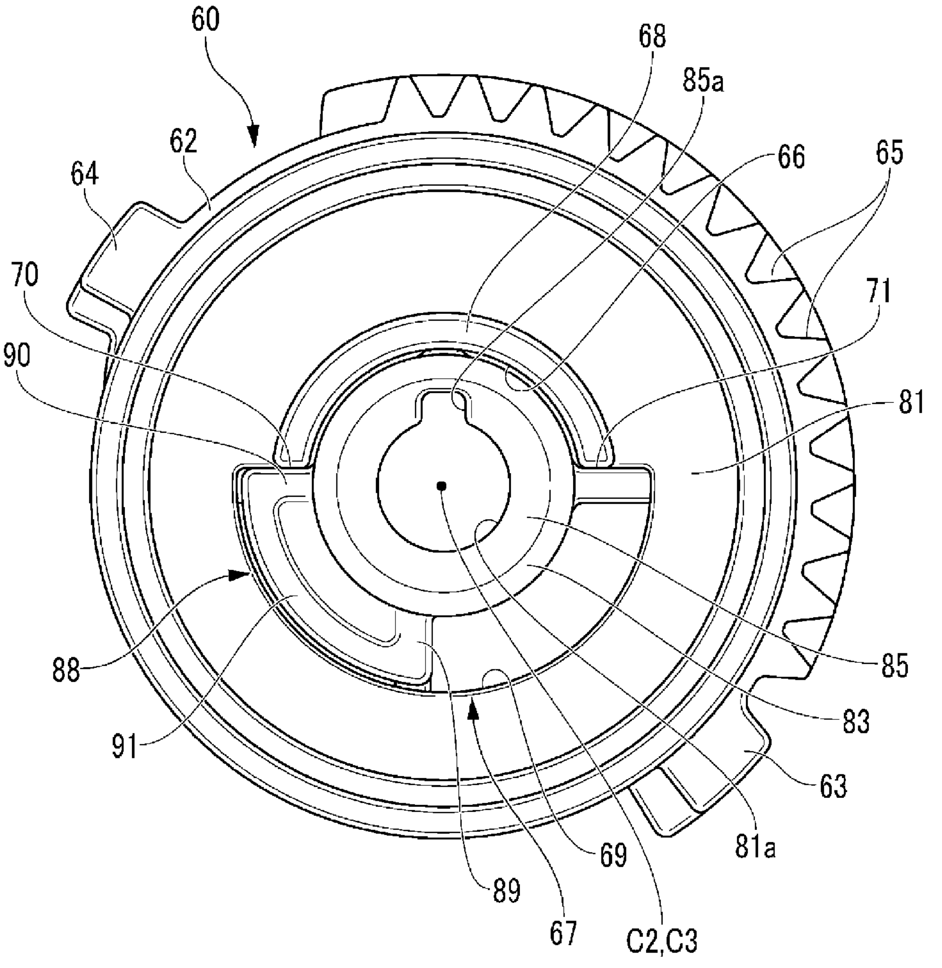
FIG. 8 is a rear view of the wheel and the rotor constituting the actuator.

At a radial center portion of the base portion 61, a shaft hole 66 having a substantially semicircular shape and a notch 67 having a substantially semicircular shape and a diameter larger than that of the shaft hole 66 are continuously provided in a state in which a diameter portion of the shaft hole 66 and a diameter portion of the notch 67 are opposed to each other. As shown in FIGS. 5 and 8, a portion of a cylindrical portion 83, which will be described later, of the rotor 80 is rotatably inserted into the shaft hole 66. A remaining portion of the cylindrical portion 83, which will be described later, of the rotor 80 is rotatably inserted into the notch 67, and a pivoting portion 88 is inserted into the notch 67 in a pivoting manner (refer to FIG. 8).

Further, an outer wall portion 68 having an arc shape extends from a back side peripheral edge of the shaft hole 66 toward the bottom wall 31 side of the first case 30. As shown in FIGS. 5 and 8, the outer wall portion 68 is arranged radially outward of the cylindrical portion 83 of the rotor 80, which will be described later.

As shown in FIG. 1, an enlarged diameter portion 62*a* whose diameter is larger than that of other portions is provided at a distal end portion in an extending direction of the peripheral wall 62 (an end portion on the side of the bottom wall 31 of the first case 30). As shown in FIG. 5, a stepped concave portion 62*b* is formed on an inner surface side of the enlarged diameter portion 62*a* of the peripheral wall 62. The concave portion 62*b* has a stepped concave portion having an inner periphery having a circular shape, and an inner diameter of the concave portion 62*b* has a size that matches an outer diameter of the distal end portion 41*a* of the cylindrical wall 41 provided on a case 21 side.

As shown in FIG. 11, the distal end portion 41*a* of the cylindrical wall 41 in the protruding direction enters the concave portion 62*b*, the outer periphery of the distal end portion 41*a* is arranged to face the inner periphery of the concave portion 62*b*, and an upper end of the distal end portion 41*a* is brought into contact with a bottom portion of the concave portion 62*b*, whereby the wheel 60 is rotatably supported by the cylindrical wall 41. The rotation center C2 of the wheel 60 at this time is the same as the axis C1 of the support shaft 38 and a rotation center C3 of the rotor 80 (refer to FIGS. 9 and 11). As shown in FIG. 11, an inner surface of the peripheral wall 62 is flush with an inner surface of the cylindrical wall 41.

As shown in FIG. 11, a certain amount of gap exists between an outer periphery of the cylindrical portion 83, which will be described later, of the rotor 80 and an inner periphery of the shaft hole 66 and the outer wall portion 68 of the wheel 60, whereas almost no gap exists between the outer periphery of the distal end portion 41*a* of the cylindrical wall 41 and the inner periphery of the concave portion 62*b* (that is, the gap between the outer periphery of the distal end portion 41*a* of the cylindrical wall 41 and the inner periphery of the concave portion 62*b* is smaller than the gap between the outer periphery of the cylindrical portion 83 and the inner periphery of the shaft hole 66 and the outer wall portion 68). That is, the wheel 60 is not rotatably supported by the cylindrical portion 83 of the rotor 80 but is rotatably supported by the cylindrical wall 41 on the case 21 side.

As shown in FIG. 6, the notch 67 having a substantially semicircular shape has an inner peripheral edge portion 69 having an arc shape. The pressing portion 70 that extends toward the rotation center C2 of the wheel 60 is provided from one end in a circumferential direction of the inner peripheral edge portion 69. On the other hand, a spring contact portion 71 that extends toward the rotation center C2 of the wheel 60 is provided on the other end in the circumferential direction of the inner peripheral edge portion 69. The pressing portion 70 and the spring contact portion 71 are arranged on the same straight line passing through the rotation center C2 of the wheel 60.

The wheel described above is not limited to the above-described shape and structure and may be any shape and structure having at least a pressing portion. An operation of the wheel 60 will be described later together with an operation of the rotor 80.

Next, the rotor 80 will be described in detail.

As shown in FIGS. 1, 5, 7, and 8, the rotor 80 is a separate member from the wheel 60, is rotatably supported by the case 21, is rotatably arranged inside the wheel 60, and performs two rotation operations of an operation of rotating in conjunction with the wheel 60 and an operation of rotating independently of the wheel 60 (also referred to as a free rotation). In addition, the rotor 80 includes the receiving portion 90 that is brought into contact with the pressing portion 70 provided on the wheel 60 and receives a pressing force from the pressing portion 70.

More specifically, the rotor 80 of this embodiment includes a base portion 81 having a substantial disc shape, a circular shaft hole 81*a* formed in a radial center portion of the base portion 81, a peripheral wall 82 having a substantially cylindrical shape and vertically provided from a peripheral edge of the base portion 81 toward the bottom wall 31 side of the first case 30, and a cylindrical portion 83 having a substantially cylindrical shape and vertically provided from a back side of the base portion 81 and from a back side peripheral edge of the shaft hole 81*a*.

Figure 7:
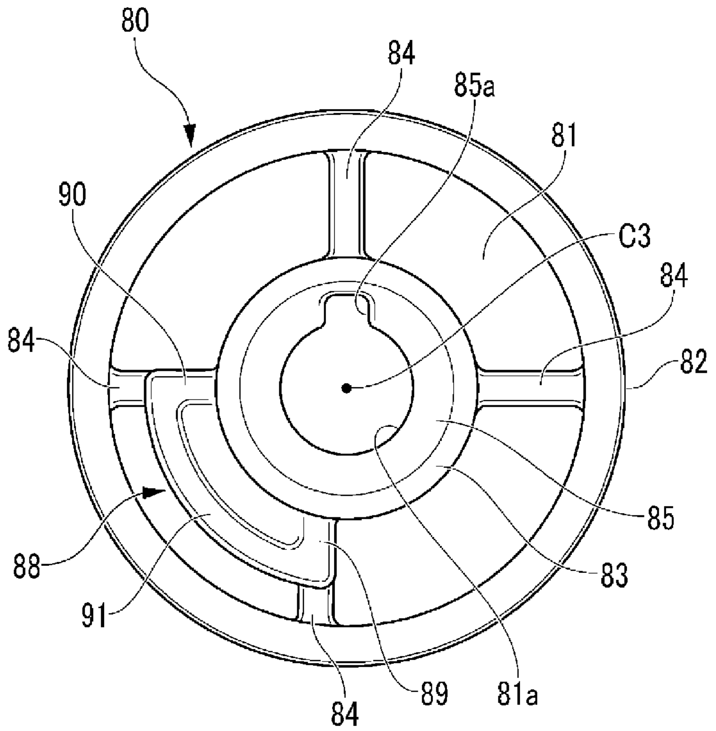
FIG. 7 is a rear view of the rotor constituting the actuator.

As shown in FIG. 7, a plurality of ribs 84 extending radially from the rotation center of the rotor 80 are provided on the back side of the base portion 81 and between the peripheral wall 82 and the cylindrical portion 83. Here, four ribs 84 are provided at equal intervals in the circumferential direction.

As shown in FIGS. 5 and 7, an inner protruding portion 85 protrudes from an inner peripheral surface of the cylindrical portion 83. The inner protruding portion 85 is formed by notching an axial notch 85*a* extending along an axis direction of the cylindrical portion 83 in a part of the inner protruding portion 85 in the circumferential direction and has a substantially C-shaped annular shape. A convex portion 38*a* provided on the support shaft 38 can be inserted into the axial notch 85*a*.

As shown in FIG. 11, an upper end surface of the inner protruding portion 85 forms a stepped lock surface 85*b*. When an external force is applied to the lock surface 85*b* in a direction in which the rotor 80 is separated from the bottom wall 31 of the first case 21, the convex portion 38*a* of the support shaft 38 is locked to retain the rotor 80.

Figure 9:
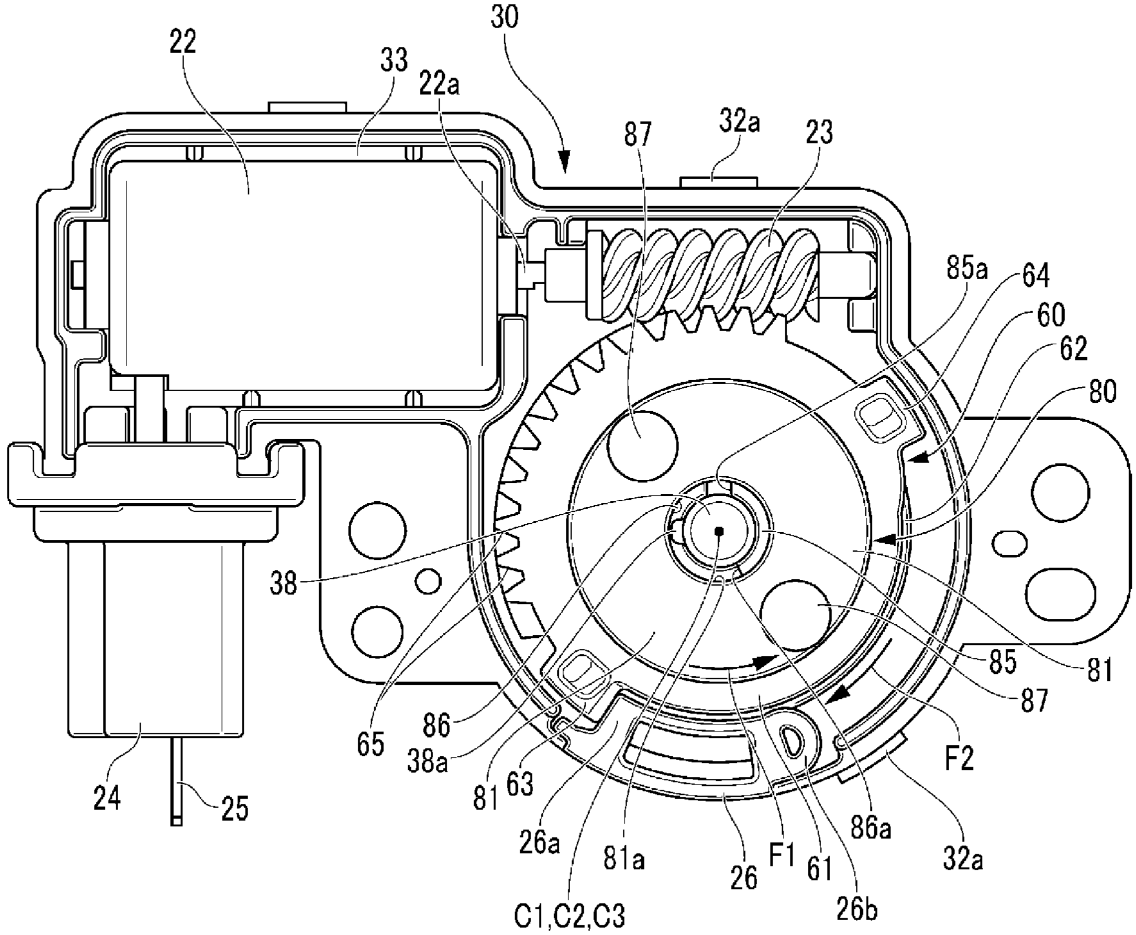
FIG. 9 is a plan view of the actuator in a state in which the second case and the like are removed.

The support shaft 38 provided in the first case 30 is inserted into the inner protruding portion 85 on the inner periphery of the cylindrical portion 83, whereby the rotor 80 is rotatably supported by the first case 30 via the support shaft 38. As shown in FIGS. 9 and 11, the rotation center C3 of the rotor 80 at this time is the same as the axis C1 of the support shaft 38 and the rotation center C2 of the wheel 60.

In this embodiment, the support shaft 38 is provided on the first case 30 side, and the cylindrical portion 83 and the shaft hole 81*a* into which the support shaft 38 can be inserted are provided on the rotor 80 side, but for example, a support shaft may be provided on a second case 50 side to rotatably support the rotor 80, or a support shaft may be provided on a rotor 80 side, and a support hole or the like into which the support shaft can be inserted may be provided on the first case 30 side or the second case 50 side to rotatably support the rotor 80.

An inner diameter of the inner protruding portion 85 is smaller than an outer diameter of the distal end portion of the support shaft 38 including the convex portion 38*a* and has an inner diameter matching an outer diameter of the support shaft 38. Therefore, in a state in which the support shaft 38 is inserted into the inner protruding portion 85 on the inner periphery of the cylindrical portion 83, the rotor 80 can be rotatably supported with less backlash relative to the support shaft 38.

The axial notch 85*a* of the rotor 80 is aligned with the convex portion 38*a* of the support shaft 38, the support shaft 38 is inserted from a lower end opening of the cylindrical portion 83, the convex portion 38*a* is inserted from an upper opening of the axial notch 85*a*, and then the rotor 80 is rotated in a direction opposite to the rotation biasing direction of the torsion spring 15, whereby the convex portion 38*a* of the support shaft 38 is displaced in the circumferential direction with respect to the axial notch 85*a* and is arranged to face the lock surface 85*b*, and thus the rotor 80 can be retained and held with respect to the support shaft 38.

As shown in FIG. 9, a convex portion 86 is provided to protrude from the lock surface 85*b* and at a predetermined position in the circumferential direction of the inner peripheral surface of the cylindrical portion 83. The convex portion 86 is arranged to approach and separate from the convex portion 38*a* of the support shaft 38. When the rotor 80 is rotationally supported in a state in which the torsion spring 15 is interposed in the first case 30, the convex portion 86 engages with the convex portion 38*a* of the support shaft 38 to form a temporary fixing portion that restricts the rotation of the rotor 80. Further, as shown in FIG. 9, a stepped rotor rotation restricting portion 86*a* is provided at a predetermined position in the circumferential direction of the inner peripheral surface of the cylindrical portion 83. The rotor rotation restricting portion 86*a* can be engaged with the convex portion 38*a* of the support shaft 38, and after the rotor 80 is temporarily fixed to the support shaft 38 as described above, when the rotor 80 is permanently fixed to the support shaft 38, the rotor rotation restricting portion 86*a* engages with the convex portion 38*a* at the time of the rotation of the rotor 80 to restrict the rotation of the rotor 80.

Figure 12:
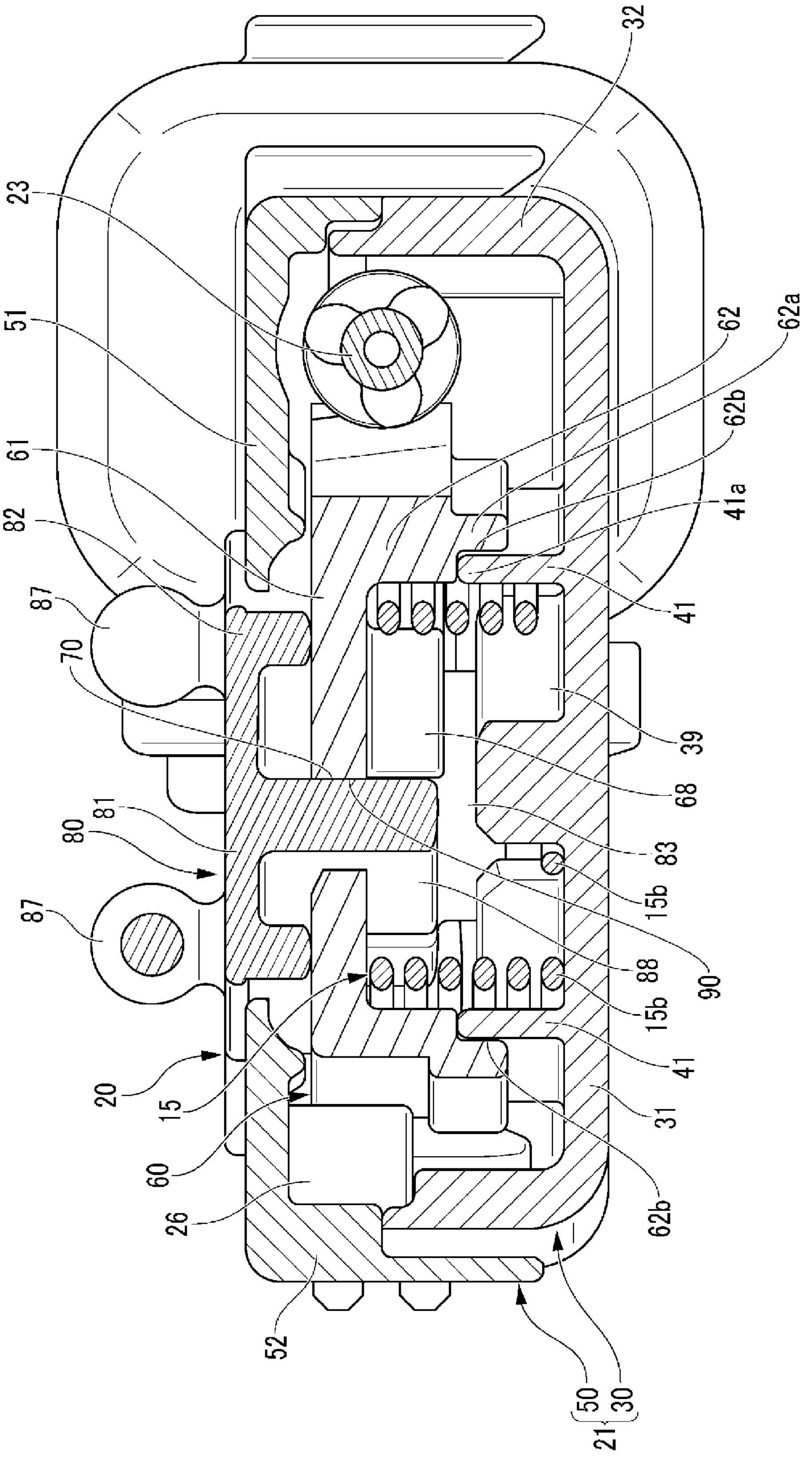
FIG. 12 is a cross-sectional view taken along line D-D of FIG. 3.

Further, in a state in which the rotor 80 is rotatably supported by the support shaft 38, as shown in FIG. 10, the cylindrical portion 83 and the pivoting portion 88 are accommodated and arranged within the shaft hole 66 and the notch 67 of the wheel 60, and as shown in FIGS. 11 and 12, the base portion 81 and the peripheral wall 82 of the rotor 80 are arranged on the surface side of the base portion 61 of the wheel 60 to retain and hold the wheel 60.

As shown in FIG. 1, a pair of rod engagement portions 87 and 87, each of which has a spherical distal end, are provided in a protruding manner on a surface of the base portion 81 and at positions facing each other in the circumferential direction of the rotor 80. The pair of rod engagement portions 87 and 87 are inserted into and engaged with the proximal end portions 14 and 14 of the pair of rods 11 and 12 in a retained state, and the proximal end portions 14 and 14 of the pair of rods 11 and 12 are pivotally supported at positions facing the rotation center C3 of the rotor 80, respectively. As a result, when the rotor 80 rotates, the pair of rods 11 and 12 synchronously slide in mutually opposite directions (in a direction in which the engagement portions 13 and 13 disengage from the lock portions 3 and 3) (refer to FIG. 16).

As shown in FIG. 7, the pivoting portion 88 is provided to protrude from the back side of the base portion 81 to pivot in the notch 67 formed in the wheel 60. That is, a spring lock portion 89 having a long plate shape is vertically provided from a predetermined rib 84 provided on the back side of the base portion 81 toward the lower end opening of the cylindrical portion 83, and the receiving portion 90 having a long plate shape is vertically provided from the rib 84 adjacent in the circumferential direction with respect to the rib 84 in which the spring lock portion 89 is vertically provided, toward the lower end opening of the cylindrical portion 83. Further, a distal end of the spring lock portion 89 and a distal end of the receiving portion 90 are connected by a connecting wall 91 extending in a substantial arc shape, so that the pivoting portion 88 having a substantial fan shape is provided to protrude on the back side of the base portion 81.

The second arm portion 15*c* of the torsion spring 15, which is the biasing member, is locked to the spring lock portion 89. As described in paragraph 0029, the first arm portion 15*b* of the torsion spring 15 is locked to the spring lock groove 39*a* provided in the first case 30, and the rotor 80 is rotatably supported by the support shaft 38 on the first case 30 side in a state where the first arm portion 15*b* and the second arm portion 15*c* are separated from each other. Therefore, the rotor 80 is rotationally biased in a direction in which the second arm portion 15*c* comes close to the first arm portion 15*b* of the torsion spring 15, that is, in the direction of the arrow F1 in FIGS. 9 and 15, and as a result, the engagement portions 13 and 13 of the pair of rods 11 and 12 pivotally supported by the rotor 80 are biased in a direction in which the engagement portions 13 and 13 are engaged with the lock portions 3 and 3.

As shown in FIG. 10, the receiving portion 90 of the rotor 80, which is rotationally biased in the direction of the arrow F1 by the torsion spring 15, is constantly in contact with the pressing portion 70 of the wheel 60. Since the receiving portion 90 of the rotor 80, which is rotationally biased in the direction of the arrow F1 by the torsion spring 15, is brought into contact with the pressing portion 70 of the wheel 60, further rotation of the rotor 80 in the direction of the arrow F1 is restricted.

Figure 14:
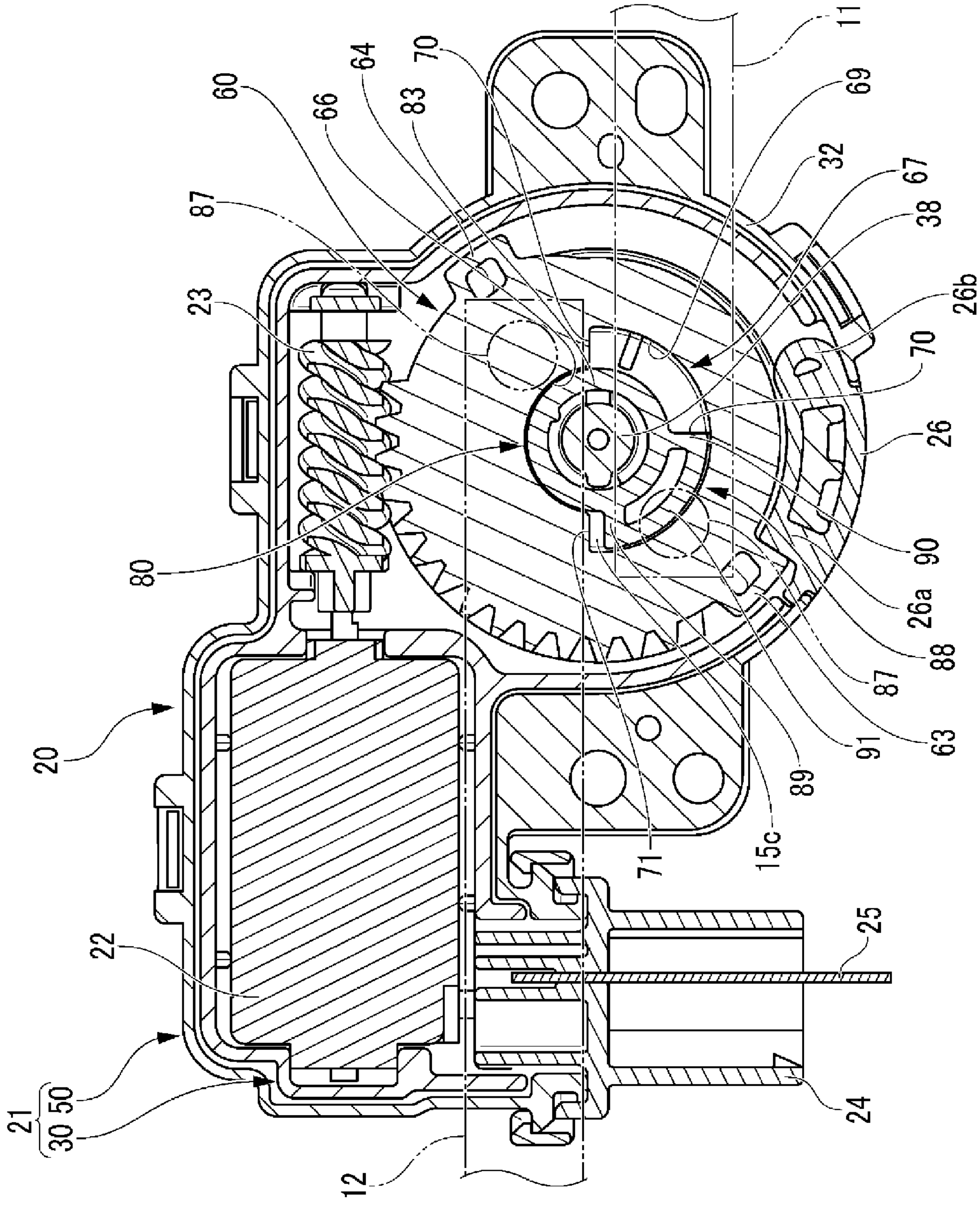
FIG. 14 is a sectional explanatory view showing a state in which the rotor is rotated in a predetermined direction independently of the wheel from the state shown in FIG. 10.

Meanwhile, when the rotor 80 is rotated in a predetermined direction via the support shaft 38, the receiving portion 90 is engaged with or separated from the pressing portion 70 of the wheel 60 as shown in FIGS. 10, 13, and 14. Further, when the rotor 80 is rotated, the connecting wall 91 of the pivoting portion 88 pivots along the inner peripheral edge portion 69 of the notch 67 of the wheel 60 (refer to FIGS. 10, 13, and 14), so that rotation guide of the rotor 80 is performed.

As shown in FIGS. 10 and 11, the wheel 60 and the rotor 80 are concentrically rotatably supported by the case 21. Further, although the rotor 80 is retained and held by the convex portion 38*a* of the support shaft 38 constituting the rotation support portion so as not to be separated from the bottom wall 31 of the first case 30, at this time, as shown in FIGS. 11 and 12, the base portion 81 and the peripheral wall 82 of the rotor 80 are placed on the base portion 61 of the wheel 60. As a result, the wheel 60 is retained and held by the rotor 80 so as not to be separated from the bottom wall 31 of the first case 30.

As shown in FIG. 10, at least the pressing portion 70 of the rotor 80 is arranged inside the peripheral wall 62 of the wheel 60, and as shown in FIG. 12, the pressing portion 70 of the wheel 60 and the receiving portion 90 of the rotor 80 are arranged in a region surrounded by the base portion 61 and the peripheral wall 62 of the wheel 60. The region surrounded by the base portion 61 and the peripheral wall 62 includes a thickness of the base portion 61 and a thickness of the peripheral wall 62. In this embodiment, the pressing portion 70 and the receiving portion 90 are provided within a range of the thickness of the base portion 61 (a portion extending from a lower surface to an upper surface of the base portion 61) (in this case, over the entire region of a plate thickness).

The rotor described above is not limited to the above-described shape and structure and may have any shape and structure as long as the rotor has at least a receiving portion and is independently rotatable with respect to the wheel under the following conditions. In this embodiment, the receiving portion 90 is provided on the rotor 80, but the receiving portion may be provided on the rod (this will be described in another embodiment).

Next, the operations of the wheel 60 and the rotor 80 will be described. In the electric lock device 10, the following configurations (A) to (C) are adopted.

(A) When the wheel 60 rotates in the direction opposite to the rotation biasing direction of the rotor 80 from a state in which the opening portion 2 is closed by the opening and closing member 5, the pressing portion 70 of the wheel 60 presses the receiving portion 90 of the rotor 80, and the wheel 60 and the rotor 80 are co-rotated in the direction opposite to the rotation biasing direction of the rotor 80, whereby the rods 11 and 12 are slid in a direction in which the rods 11 and 12 are disengaged from the lock portions 3 and 3 (refer to FIG. 13).

(B) When the opening and closing member 5 is opened from the opening portion 2 in the state (A), the rotor 80 is rotationally biased by the biasing member, the receiving portion 90 of the rotor 80 presses the pressing portion 70 of the wheel 60, and the rotor 80 and the wheel 60 are co-rotated in the same direction as to the rotation biasing direction of the rotor 80, whereby the rods 11 and 12 are slid in a direction in which the rods 11 and 12 are engaged with the lock portions 3 and 3.

(C) When the opening and closing member 5 is closed with respect to the opening portion 2 from the state (B), only the rotor 80 is rotated independently of the wheel 60 in the direction opposite to the rotation biasing direction of the rotor 80 via the rods 11 and 12, and the rods 11 and 12 are slid in the direction in which the rods 11 and 12 are disengaged from the lock portions 3 and 3 (refer to FIG. 14).

FIG. 10 shows a relation between the wheel 60 and the rotor 80 in a normal state. In this case, the pressing portion 70 of the wheel 60 is constantly in contact with the receiving portion 90 of the rotor 80. That is, in a state in which the motor 22 does not operate and the gear 23 is not rotating, and a rotation force in a direction (direction indicated by an arrow F2) opposite to the rotation biasing direction is not applied to the rotor 80, which is rotationally biased in the direction indicated by the arrow F1 (refer to FIG. 10 and the like), by the torsion spring 15, which is the biasing member, via the rods 11 and 12 (a state in which only a rotation biasing force of the torsion spring 15 is applied to the rotor 80 and an extremal force from the rod is not acting), the pressing portion 70 is brought into contact with the receiving portion 90 of the rotor 80. In this state, the spring lock portion 89 of the rotor 80 is separated from the spring contact portion 71 of the wheel 60.

When electricity is supplied to the motor 22 (energization to the actuator 20), the drive shaft 22*a* of the motor 22 rotates to rotate the gear 23 and the wheel 60 rotates in the direction indicated by the arrow F2 in FIG. 10 (rotates in the direction opposite to the rotation biasing direction indicated by F1 of the rotor 80), the pressing portion 70 brought into contact with and engaged with the receiving portion 90 presses the receiving portion 90 to rotate the rotor 80 in the direction indicated by F2 as shown in FIG. 13. That is, both the rotor 80 and the wheel 60 rotate together (co-rotate) in the direction indicated by F2. As a result, the pair of rods 11 and 12 slide in the direction in which the engagement portions 13 and 13 of the pair of rods 11 and 12 pivotally supported by the rotor 80 are disengaged from the pair of lock portions 3 and 3 (refer to FIG. 16).

When the supply of electricity to the motor 22 is stopped (the energization to the actuator 20 is stopped) from the state shown in FIG. 13, the drive shaft 22*a* of the motor 22 is stopped, and the gear 23 is no longer rotated, the rotor 80 is rotationally biased again in the direction indicated by F1 by the biasing force of the torsion spring 15. As a result, the receiving portion 90 of the rotor 80 is brought into contact with the pressing portion 70 of the wheel 60, presses the pressing portion 70, and rotates the wheel 60 in the direction indicated by F1. That is, both the rotor 80 and the wheel 60 rotate together in the direction indicated by F1, and as a result, the rotor 80 and the wheel 60 return to the state shown in FIG. 10. In addition, the pair of rods 11 and 12 slide in the direction in which the engagement portions 13 and 13 are engaged with the pair of lock portions 3 and 3 (refer to FIG. 15).

On the other hand, in the state shown in FIG. 10, that is, in a state where the rods 11 and 12 are biased by the torsion spring 15, which is the biasing member, in the direction in which the rods 11 and 12 are engaged with the lock portions 3 and 3, when a rotation force in a direction against the biasing force of the biasing member is applied to the rotor 80 via the rods 11 and 12, the receiving portion 90 moves in a direction away from the pressing portion 70, and the rotor 80 can rotate independently of the wheel 60.

More specifically, when the pair of rods 11 and 12 slide in the direction in which the engagement portions 13 and 13 of the pair of rods 11 and 12 pivotally supported by the rotor 80 rotationally biased by the torsion spring 15 are disengaged from the pair of lock portions 3 and 3 as shown in FIG. 16 from the state shown in FIG. 10, the rotation force in the direction indicated by the arrow F2 in FIG. 10 is applied to the rotor 80 via the rods 11 and 12. As a result, as shown in FIG. 14, the wheel 60 does not rotate, and only the rotor 80 rotates independently of the wheel 60 in the direction indicated by the arrow F2 against the rotation biasing force in the direction indicated by the arrow F1 by the torsion spring 15. In addition, as the rotor 80 rotates, the pair of rods 11 and 12 slide in the direction in which the engagement portions 13 and 13 are disengaged from the pair of lock portions 3 and 3 (refer to FIG. 16).

When the rotor 80 independently rotates as described above, as shown in FIG. 14, the pivoting portion 88 of the rotor 80 pivots in the notch 67 of the wheel 60, and the receiving portion 90 of the rotor 80 moves in a direction away from the pressing portion 70. When the rotor 80 rotates in the direction of the arrow F2, the spring lock portion 89 of the pivoting portion 88 is brought into contact with the spring contact portion 71 of the notch 67 via the second arm portion 15*c* of the torsion spring 15 (refer to FIG. 14). The stepped rotor rotation restricting portion 86*a* provided on the inner peripheral surface of the cylindrical portion 83 of the rotor 80 is engaged with the convex portion 38*a* provided on the support shaft 38, whereby the rotation operation of the rotor 80 in the direction indicated by the arrow F2 is restricted.

When the rotation force indicated by the arrow F2 is not applied to the rotor 80 via the rods 11 and 12, the rotor 80 is rotationally biased again in the direction indicated by F1 by the biasing force of the torsion spring 15, the receiving portion 90 is brought into contact with and pressed by the pressing portion 70 to co-rotate the wheel 60 via the rotor 80, the rotor 80 and the wheel 60 are returned to the state shown in FIG. 10, and the pair of rods 11 and 12 slide in the direction in which the engagement portions 13 and 13 are engaged with the pair of lock portions 3 and 3.

(Operation and Effect)

Next, the operation and effect of the electric lock device 10 having the above structure will be described with reference to FIGS. 17A to 18C.

Figure 17A:
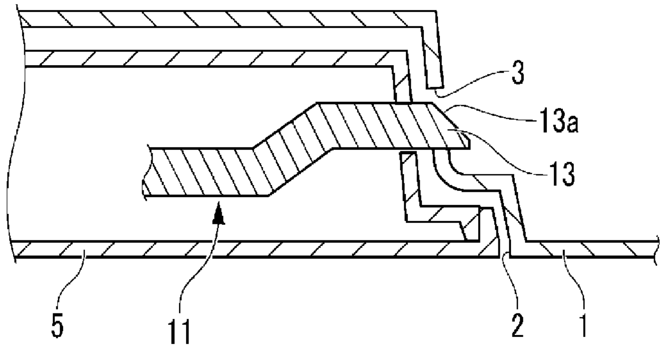
FIG. 17A is an explanatory view of a main part in a case where the opening and closing member is locked in the closed state by the electric lock device.

FIGS. 15 and 17A show a case where the opening portion 2 of the fixed member 1 is closed by the opening and closing member 5 and the state is locked. That is, the engagement portions 13 and 13 of the pair of rods 11 and 12 slidably biased via the rotor 80 rotationally biased by the torsion spring 15, which is the biasing member, are engaged with the pair of lock portions 3 and 3, whereby the opening portion 2 of the fixed member 1 is locked in the closed state by the opening and closing member 5.

When the opening and closing member 5 is opened from the opening portion 2 of the fixed member 1 from this state, a switch (not shown) on a front surface side of the opening and closing member 5 is operated. Thus, the electricity is supplied to the motor 22 via the bus bars 25 and 25 from the power connector connected to a power supply (not shown), the drive shaft 22*a* of the motor 22 is driven to rotate the gear 23, and the wheel 60 in conjunction with the gear 23 rotates in the direction of the arrow F2 in FIG. 10 against the rotation biasing force of the torsion spring 15. Accordingly, the pressing portion 70 of the wheel 60 presses the receiving portion 90 of the rotor 80, and both the rotor 80 and the wheel 60 co-rotate in the direction indicated by F2 as shown in FIG. 13, and thus the pair of rods 11 and 12 slide in the direction in which the engagement portions 13 and 13 are disengaged from the pair of lock portions 3 and 3 as shown in FIG. 16.

Figure 17B:
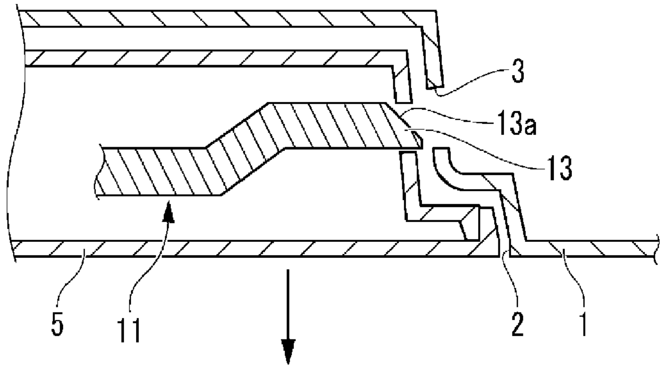
FIG. 17B is an explanatory view of a main part in a case where the lock in the state in which the opening and closing member is closed is released from the state shown in FIG. 17A.
Figure 17C:
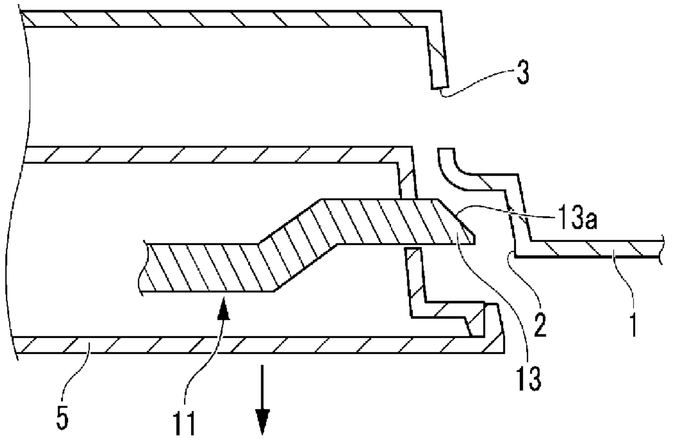
FIG. 17C is an explanatory view of a main part in a case in which the opening and closing member is further opened from the state shown in FIG. 17B.

As a result, as shown in FIG. 17B, the engagement portion 13 is pulled out from the lock portion 3, and the engagement between the engagement portion 13 and the lock portion 3 is released, and thus the opening and closing member 5 pivots downward by a weight thereof from the opening portion 2 of the fixed member 1, and the opening portion 2 of the fixed member 1 can be opened as shown in FIG. 17C.

As shown in FIG. 17C, when the opening and closing member 5 is in the opened state from the opening portion 2 of the fixed member 1, since the drive shaft 22*a* of the motor 22 is stopped and the gear 23 is no longer rotated, the rotor 80 is rotationally biased again in the direction indicated by F1 by the biasing force of the torsion spring 15. As a result, the receiving portion 90 of the rotor 80 presses the pressing portion 70 of the wheel 60, and both the rotor 80 and the wheel 60 co-rotate in the direction indicated by the arrow F1 to return to the state shown in FIG. 10, and the pair of rods 11 and 12 slide in the direction in which the engagement portions 13 and 13 are engaged with the pair of lock portions 3 and 3.

Figure 18A:
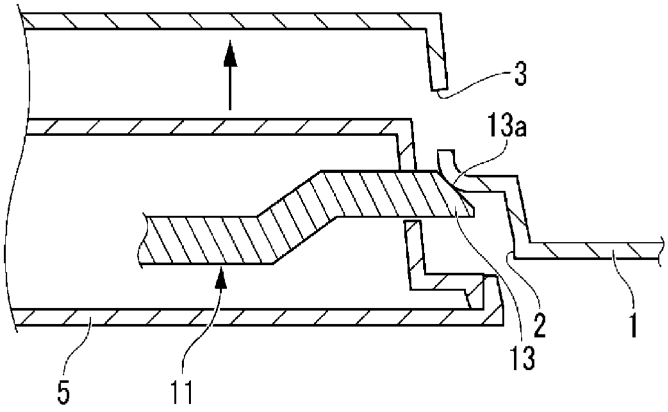
FIG. 18A is an explanatory view of a main part in a case in which the opening and closing member is pushed from the state shown in FIG. 17C.
Figure 18B:
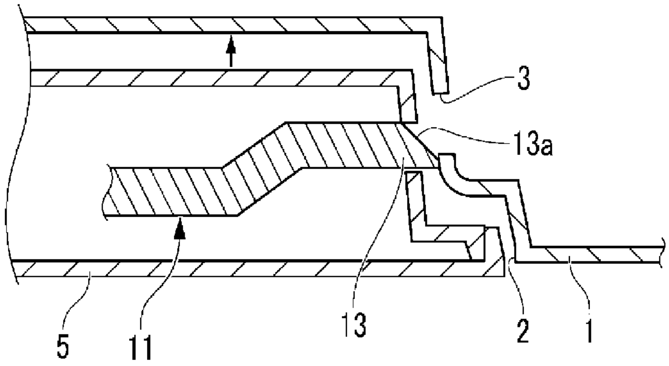
FIG. 18B is an explanatory view of a main part in a case in which the opening and closing member is further pushed from the state shown in FIG. 18A.

On the other hand, from the state shown in FIG. 17C, when the opening and closing member 5 is pushed into the opening portion 2 in order to close the opening portion 2 of the fixed member 1, as shown in FIG. 18A, the tapered surface 13*a* of the engagement portion 13 of each of the rods 11 and 12 is pressed against an inner edge portion of the opening portion 2, and the pair of rods 11 and 12 are drawn into the opening and closing member 5 against the biasing force of the torsion spring 15 (refer to FIG. 18B).

At this time, the rotation force in the direction indicated by the arrow F2 is applied to the rotor 80 via the rods 11 and 12, and as shown in FIG. 14, only the rotor 80 rotates independently of the wheel 60 in the direction indicated by the arrow F2 against the rotation biasing force in the direction indicated by the arrow F1 by the torsion spring 15. Accordingly, the pair of rods 11 and 12 slide in the direction in which the engagement portions 13 and 13 are disengaged from the pair of lock portions 3 and 3.

Figure 18C:
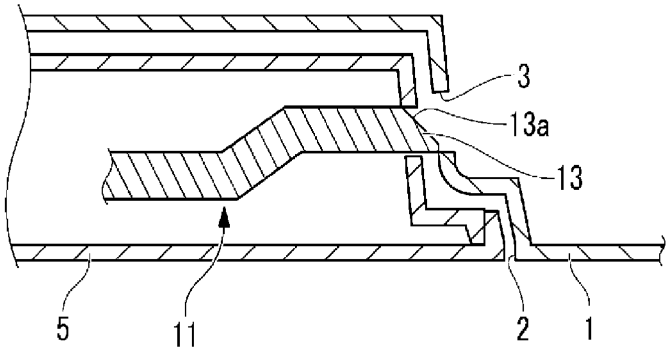
FIG. 18C is an explanatory view of a main part in a case in which the opening and closing member is further pushed from the state shown in FIG. 18B and the rod reaches a lock portion.

After that, the opening and closing member 5 is further pushed, as shown in FIG. 18C, when the engagement portion 13 of each of the rods 11 and 12 reaches the lock portion 3, the rotation force indicated by the arrow F2 is not applied to the rotor 80 via the rods 11 and 12. Therefore, the rotor 80 is rotationally biased again in the direction indicated by F1 by the biasing force of the torsion spring 15 and returns to the state shown in FIG. 10 (the wheel 60 has already returned to the state shown in FIG. 10), the rods 11 and 12 are pushed out toward the outside of the opening and closing member 5 via the rotor 80, and the engagement portions 13 and 13 engage with the pair of lock portions 3 and 3, respectively (refer to FIG. 15). As a result, the opening portion 2 of the fixed member 1 can be locked again in the closed state by the opening and closing member 5.

In this electric lock device 10, when the opening and closing member 5 is to be pushed in from the state shown in FIG. 17C in which the opening and closing member 5 is opened, as shown in FIGS. 18A and 18B, the respective rods 11 and 12 are pressed against the inner edge portion of the opening portion 2 and the pair of rods 11 and 12 are drawn into the inside of the opening and closing member 5 against the biasing force of the torsion spring 15, but at this time, as shown in FIG. 14, only the rotor 80 can rotate independently of the wheel 60 in the direction indicated by the arrow F2 against the rotation biasing force in the direction indicated by the arrow F1 by the torsion spring 15.

That is, when the opening and closing member 5 is pushed in, the wheel 60 meshing with the gear 23 does not rotate and only the rotor 80 rotates, and thus the rods 11 and 12 can be drawn in without requiring much pushing force for the opening and closing member 5 so that the engagement portions 13 and 13 can be engaged with the lock portions 3 and 3 again. As a result, a pushing load when the opening and closing member 5 is closed can be reduced.

When the opening and closing member 5 is pressed and the engagement portion 13 of the respective rods 11 and 12 reaches the lock portion 3 as shown in FIG. 18C, the rotor 80 is rotationally biased in the direction indicated by the arrow F1 by the torsion spring 15, which is the biasing member, the rods 11 and 12 are pushed out, and the engagement portions 13 and 13 are engaged with the lock portions 3 and 3. At this time, the torsion spring 15, which is the biasing member, rotationally biases only the rotor 80, instead of biasing the wheel 60 and the rotor 80. As a result, the rotor 80 can be firmly rotationally biased, the engagement portions 13 and 13 of the rods 11 and 12 can be reliably engaged with the lock portions 3 and 3, and a failure in the closed state of the opening and closing member 5 with respect to the opening portion 2 of the fixed member 1 can be suppressed.

Further, in this embodiment, as shown in FIG. 12, the pressing portion 70 of the wheel 60 and the receiving portion 90 of the rotor 80 are arranged in the region surrounded by the base portion 61 and the peripheral wall 62 of the wheel 60. Therefore, the wheel 60 and the rotor 80 can be made compact in the axis direction of the wheel 60 and the rotor 80.

In this embodiment, the case 21 includes the rotation support portion (here, the support shaft 38) for rotatably supporting the rotor 80, the rotor 80 is retained and held by the rotation support portion (here, retained and held by the convex portion 38*a* of the support shaft 38), and the wheel 60 is retained and held by the rotor 80 (here, the base portion 81 of the rotor 80) (refer to FIGS. 11 and 12).

That is, since the rotor 80 is retained and held by the rotation support portion of the case 21 and the wheel 60 is also retained and held by the rotor 80, for example, after the wheel 60 is rotationally supported by the case 21, the rotor 80 is retained by the rotation support portion of the case 21, whereby both the wheel 60 and the rotor 80 can be retained and held.

Specifically, the wheel 60 and the rotor 80 are assembled to the case 21 in the following steps (a) to (d).

(a) After the torsion spring 15 is arranged on the bottom wall 31 of the first case 21 by locking the first arm portion 15*b* of the torsion spring 15 in the spring lock groove 39*a* of the spring lock wall 39 of the first case 21, the winding portion 15*a* of the torsion spring 15 is arranged within the peripheral wall 62 of the wheel 60 (the wheel 60 covers the winding portion 15*a* of the torsion spring 15).

(b) The second arm portion 15*c* of the torsion spring 15 is locked to the spring lock portion 89 of the rotor 80, and while maintaining this state, the pivoting portion 88 of the rotor 80 is aligned with the notch 67 of the wheel 60, and the axial notch 85*a* of the rotor 80 is aligned with the convex portion 38*a* of the support shaft 38.

(c) The pivoting portion 88 of the rotor 80 is inserted from the upper opening of the notch 67 of the wheel 60, the support shaft 38 is inserted from the lower end opening of the cylindrical portion 83, and the convex portion 38*a* of the support shaft 38 is inserted outward from the upper opening of the axial notch 85*a* of the rotor 80.

(d) The rotor 80 is rotated in the opposite direction against the rotation biasing force of the torsion spring 15, and the convex portion 38*a* of the support shaft 38 is rotated until riding over the convex portion 86 of the rotor 80. Thereby, the convex portion 38*a* of the support shaft 38 is displaced in the circumferential direction with respect to the axial notch 85*a* of the rotor 80, the rotor 80 is retained and held with respect to the support shaft 38, and the wheel 60 is also retained and held by the base portion 81 and the peripheral wall 82 of the rotor 80 mounted on the base portion 61 of the wheel 60.

As described above, in the electric lock device 10 of this embodiment, the wheel 60 and the rotor 80 can be easily assembled to the case 21, and a structure for retaining and holding the wheel 60 can be simplified.

In this embodiment, as shown in FIG. 11, the rotor 80 is rotatably supported by the case 21 via the support shaft 38, the case 21 includes the bottom wall 31, the cylindrical wall 41 is erected from the bottom wall 31 to form a concentric shape on the outer periphery of the support shaft 28, and the wheel 60 is rotatably supported by the cylindrical wall 41.

According to this aspect, the rotor 80 is rotatably supported by the case 21 via the support shaft 38, the wheel 60 is rotatably supported by the cylindrical wall 41 of the case 21, and the wheel 60 and the rotor 80 rotate about the same axis, and thus the wheel 60 and the rotor 80 are not eccentric, and the pressing portion 70 of the wheel 60 and the receiving portion 90 of the rotor 80 can be easily engaged with each other with high accuracy. Further, since the wheel 60 is rotatably supported by the cylindrical wall 41 having a diameter larger than that of the support shaft 38, which is arranged on the outer periphery of the support shaft, the wheel 60 can be suppressed from rattling during rotation.

Furthermore, in this embodiment, as shown in FIG. 11, the wheel 60 includes the base portion 61 and the peripheral wall 62 in which teeth 65 that mesh with the gear 23 are formed, and the stepped concave portion 62*b* is formed on the inner surface side of an end portion of the peripheral wall 62 on a bottom wall 31 side of the case 21, and the distal end portion 41*a* of the cylindrical wall 41 on the case 21 side is arranged in the concave portion 62*b*, and the wheel 60 is rotatably supported.

According to this aspect, the distal end portion 41*a* of the cylindrical wall 41 of the case 21 is arranged in the stepped concave portion 62*b* of the peripheral wall 62 of the wheel 60 and the wheel 60 is rotatably supported, and thus the wheel 60 can be arranged at a predetermined position of the case 21 with high accuracy.

(Second Embodiment of Electric Lock Device for Opening and Closing Member)

Figure 19:
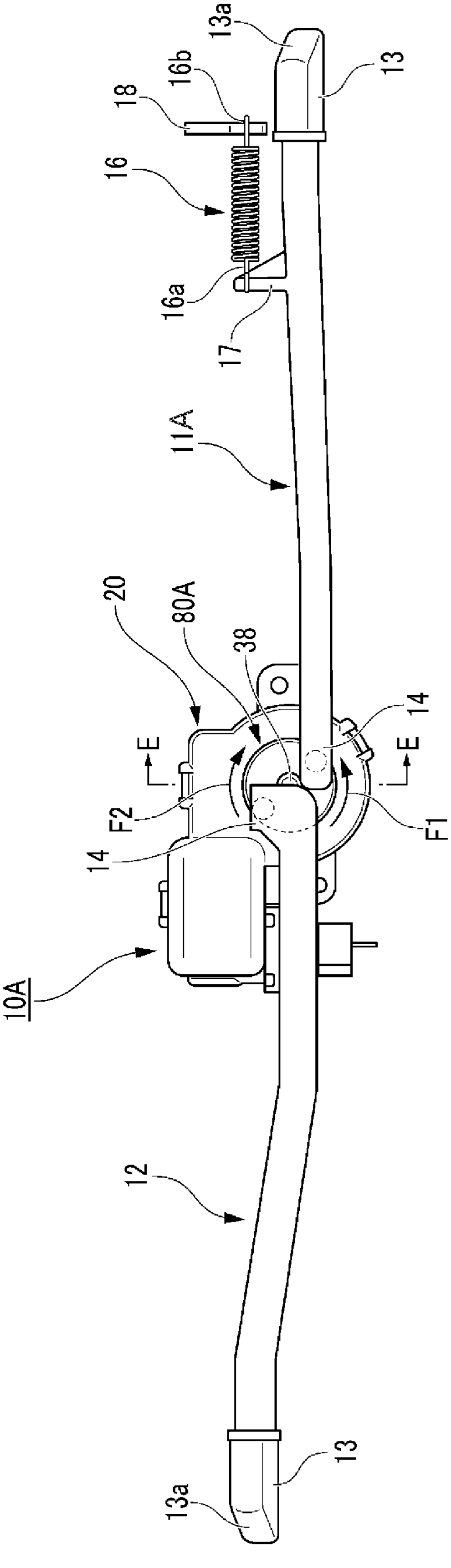
FIG. 19 is a plan view showing a second embodiment of the electric lock device for an opening and closing member according to the present invention.
Figure 20:
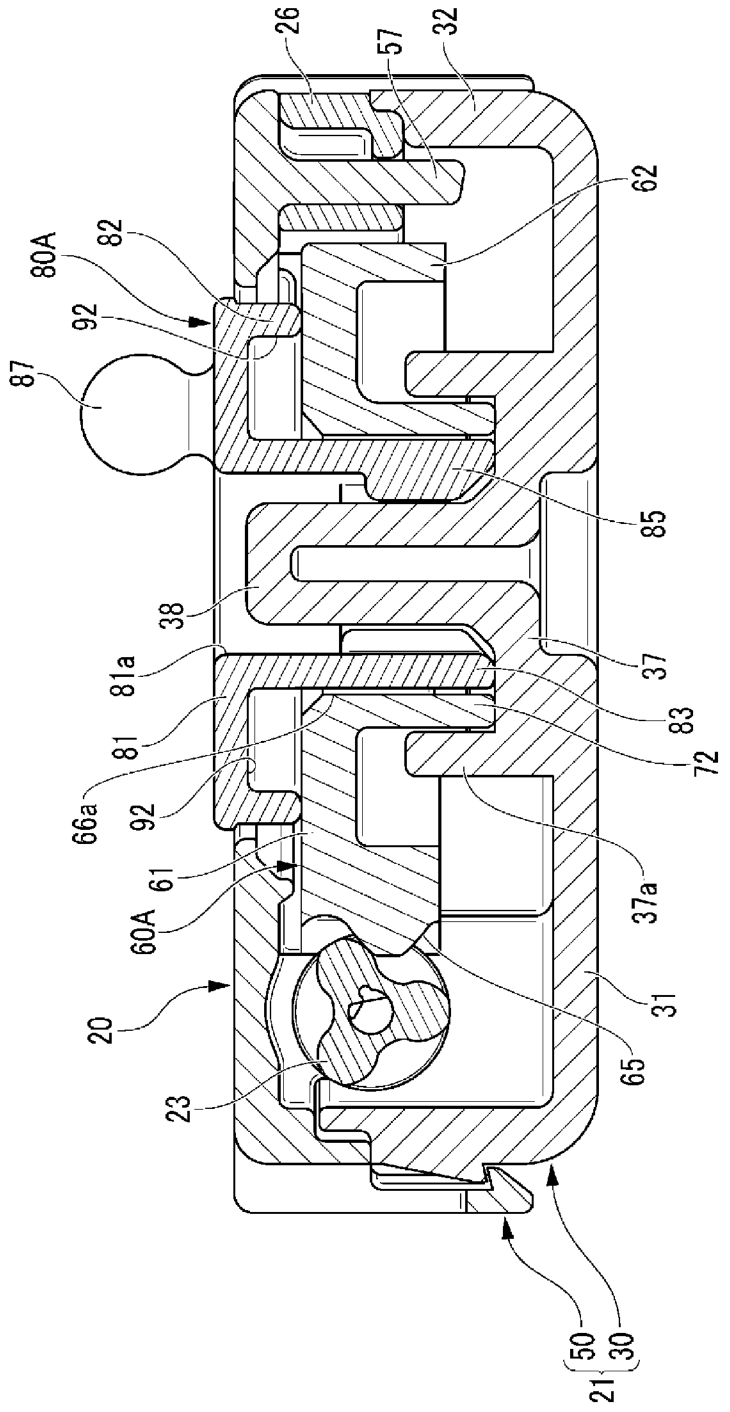
FIG. 20 is a cross-sectional view taken along line E-E in FIG. 19.
Figure 21:
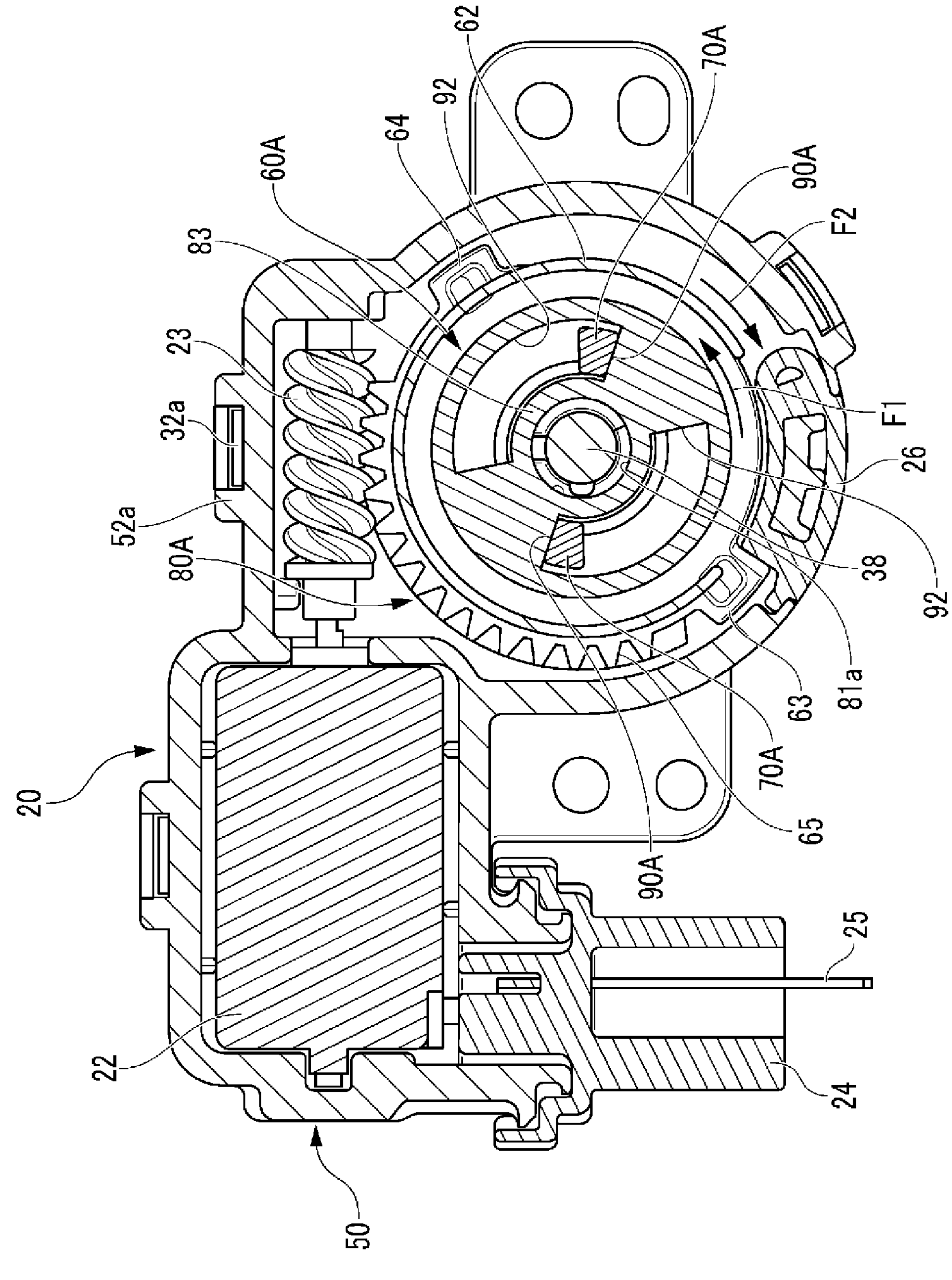
FIG. 21 is a cross-sectional view at a predetermined thickness position in the electric lock device.
Figure 22:
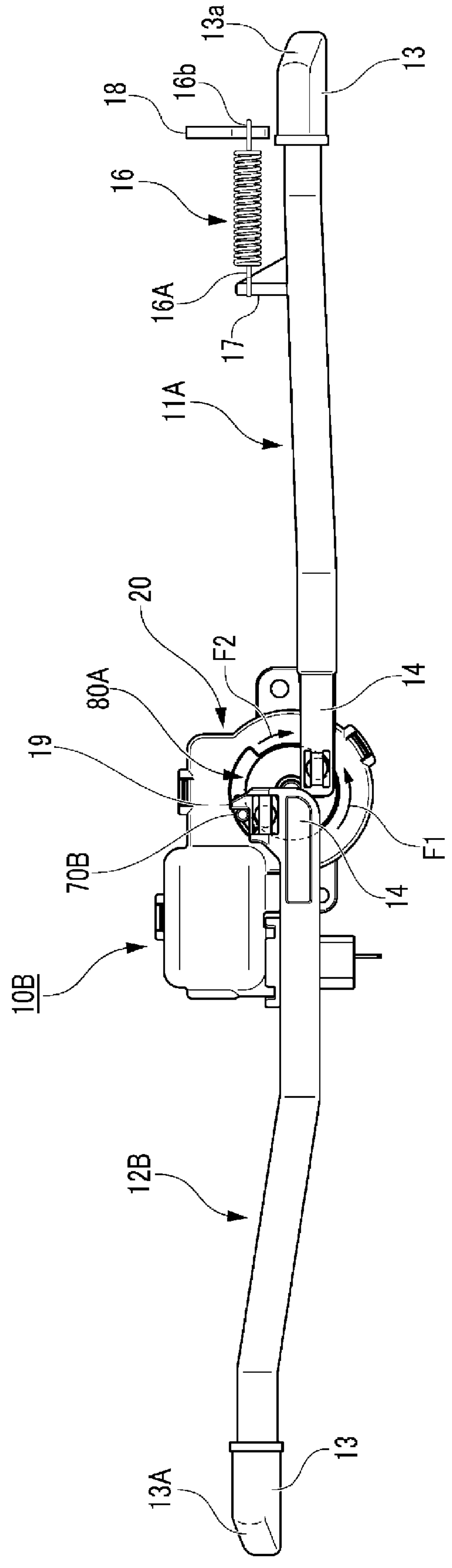
FIG. 22 is a plan view showing a third embodiment of the electric lock device for an opening and closing member according to the present invention.

FIGS. 19 to 21 show a second embodiment of the electric lock device for an opening and closing member according to the present invention. Portions that are substantially the same as those of the above embodiment are given the same reference numerals, and descriptions thereof are omitted.

In the electric lock device 10 of the above embodiment, the biasing member is the torsion spring 15 and indirectly biases the pair of rods 11 and 12 by rotationally biasing the rotor 80, whereas in an electric lock device 10 A for an opening and closing member according to this embodiment (hereinafter, also simply referred to as an "electric lock device 10A"), the biasing member is a coil spring 16 and directly biases the pair of rods 11 and 12. Along with this, structures of a wheel 60A and a rotor 80A are also different.

As shown in FIG. 19, a spring lock portion 17 is provided in a protruding manner in the vicinity of a distal end portion of one rod 11A, and a spring lock portion 18 is also provided in an opening and closing member (not shown). In the coil spring 16 serving as the biasing member, one end portion 16*a* is locked to the spring lock portion 17, and the other end portion 16*b* is locked to the spring lock portion 18. As a result, the engagement portion 13 of the rod 11A is biased in a direction in which the engagement portion 13 is engaged with the lock portion 3 (not shown), and accordingly, the rotor 80A is also rotationally biased in the direction indicated by the arrow F1 in FIG. 19. Furthermore, the engagement portion 13 of the rod 12 is also biased in the direction in which the engagement portion 13 is engaged with the lock portion 3 (not shown) via the rotor 80A.

As shown in FIG. 20, the raised portion 37 raised in a disk shape is provided to protrude from the inner surface of the bottom wall 31 of the first case 30, and the support shaft 38 is provided to protrude from a radial center portion of the raised portion 37. Further, a cylindrical wall 37*a* having a cylindrical shape is erected from an outer peripheral edge portion of the raised portion 37.

In the wheel 60A, a circular shaft hole 66*a* is formed in the base portion 61 (a configuration without the notch 67 as in the above-described embodiment), and a cylindrical shaft portion 72 having a cylindrical shape is vertically provided from a back side peripheral edge of the shaft hole 66*a* (refer to FIG. 20). Further, pressing portions 70A and 70A having a protruding shape are provided to protrude from a surface of the base portion 61 of the wheel 60A and from positions facing each other in the radial direction (refer to FIG. 21).

In the rotor 80A, a pair of concave portions 92 and 92 having a substantial fan shape are formed on a back surface side of the base portion 81 (refer to FIG. 21). A pair of pressing portions 70A and 70A of the wheel 60A are accommodated and arranged in a pivoting manner inside the pair of concave portions 92 and 92. Further, an inner edge portion on one end side in the circumferential direction of each concave portion 92 forms a receiving portion 90A that engages with the pressing portion 70A and receives a pressing force thereof.

Also in this embodiment, similarly to the first embodiment, when the drive shaft 22*a* of the motor 22 rotates to rotate the gear 23, and the wheel 60A rotates in the direction indicated by the arrow F2 in FIG. 19, the pressing portion 70A that is brought into contact with and engaged with the receiving portion 90A presses the receiving portion 90A, rotates the rotor 80A in the direction indicated by F2, and co-rotates both the rotor 80A and the wheel 60A.

In the state shown in FIG. 19, that is, in a state where the rods 11A and 12 are biased by the coil spring 16, which is the biasing member, in the direction in which the rods 11A and 12 are engaged with the lock portions 3 and 3, when a rotation force in a direction against the biasing force of the biasing member is applied to the rotor 80A via the rods 11A and 12, the receiving portion 90A moves in a direction away from the pressing portion 70A, and the rotor 80A can rotate independently of the wheel 60A.

Therefore, also in the electric lock device 10A of this embodiment, the same operation and effect as those of the electric lock device 10 of the above-described embodiment can be obtained.

In the electric lock device 10A, the rod 11A is biased by the coil spring 16, which is the biasing member, and no biasing member is interposed between the wheel 60A and the rotor 80A, and thus the wheel 60A and the rotor 80A can be made compact in the radial direction.

(Third Embodiment of Electric Lock Device for Opening and Closing Member)

FIGS. 22 to 26C show a third embodiment of the electric lock device for an opening and closing member according to the present invention. Portions that are substantially the same as those of the above embodiment are given the same reference numerals, and descriptions thereof are omitted.

In an electric lock device 10B for an opening and closing member (hereinafter, also simply referred to as an "electric lock device 10B") according to this embodiment, a receiving portion 19 is provided in a rod 12B, a pressing portion 70B is provided in a wheel 60B, and the rod 12B is directly slid by a rotation operation of the wheel 60B.

The rod 11A is biased by the torsion spring 15 similar to the electric lock device 10A of the embodiment described above (refer to FIG. 22).

Further, the rod 12B is provided with a rod connecting portion 14*a* at the proximal end portion 14 thereof and is connected to the rotor 80A by engaging a spherical protruding rod engagement portion 87 from a surface side of the base portion 81 of the rotor 80A (an opposite surface of the rods 11A and 12B) in an engagement concave portion 14*b* (refer to FIG. 25) on a back surface side of the rod connecting portion 14*a*. The receiving portion 19 protrudes from an outer surface of the rod connecting portion 14*a* of the rod 12B. The receiving portion 19 has a receiving surface 19*a* orthogonal to an axis direction of the rod 12B.

Figure 23:
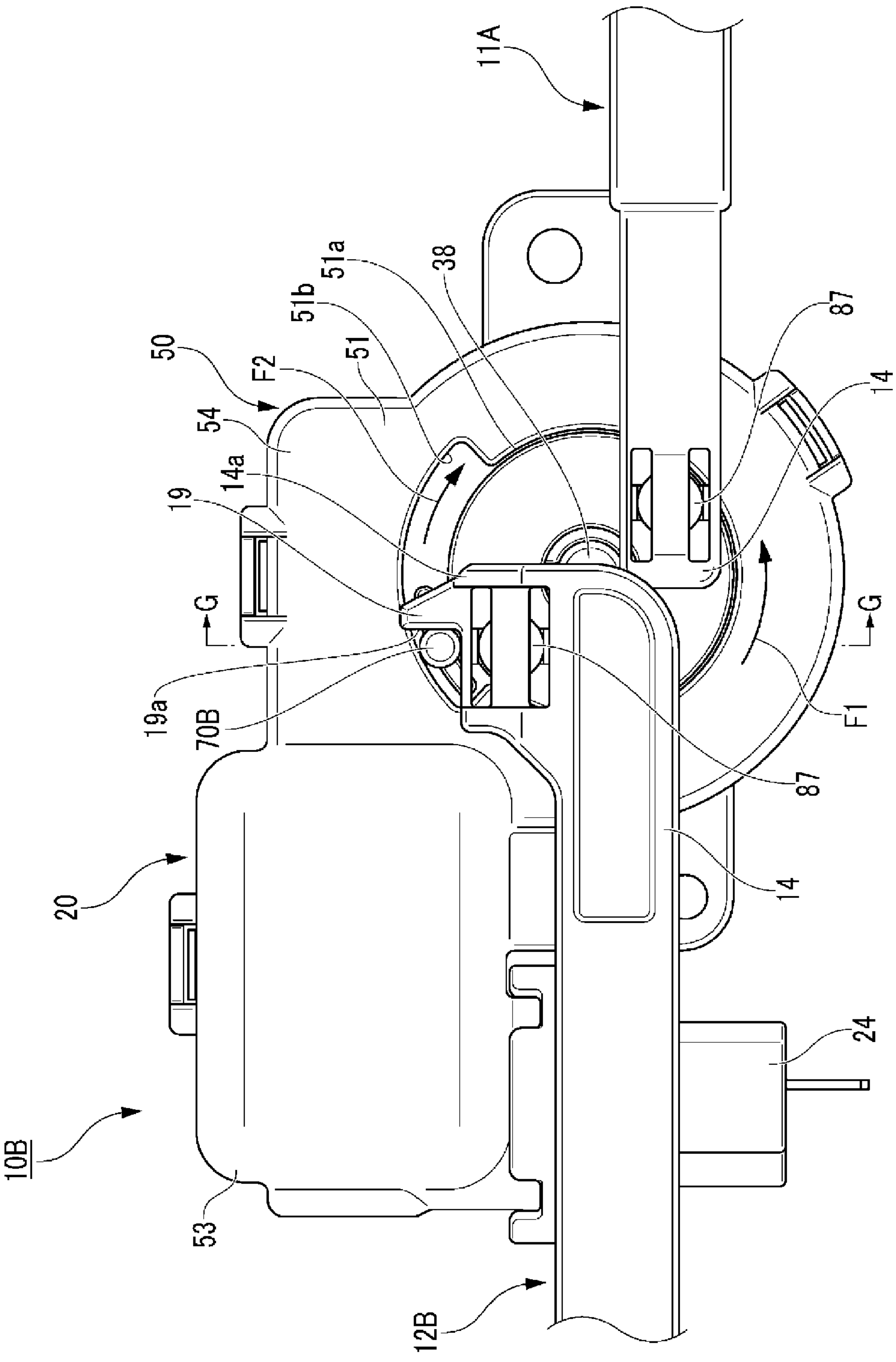
FIG. 23 is an enlarged plan view of a main part of the actuator constituting the electric lock device.

Further, as shown in FIG. 23, a notch 51*b* having an arc shape is formed in a predetermined range of an inner peripheral edge portion of the opening portion 51*a* formed in the ceiling wall 51 of the second case 50 constituting the case 21.

Figure 24:
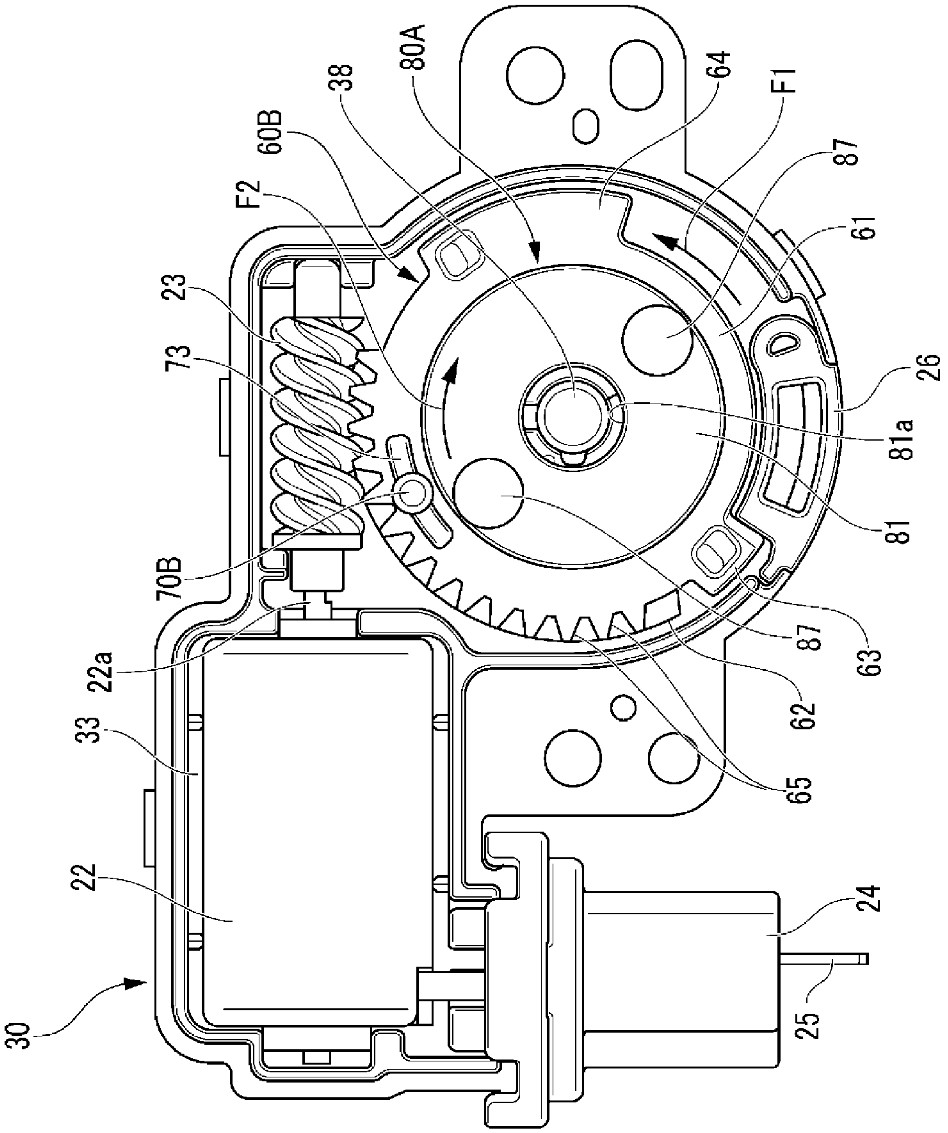
FIG. 24 is a plan view of the actuator in a state in which a second case and the like are removed.

Further, as shown in FIG. 24, a base portion 73 extending in a wide width along a circumferential direction of the wheel 60B is provided on a surface side of the base portion 61 of the wheel 60B and radially inward of the teeth 65 formed in the peripheral wall 62 and, and the pressing portion 70B having a circular protruding shape (circular pin shape) protrudes through the base portion 73. That is, the pressing portion 70B protrudes from the surface side of the base portion 81 of the rotor 80A in the same direction as the protruding direction of the rod engagement portion 87 which protrudes in a spherical shape (refer to FIG. 25). The base portion 73 and the pressing portion 70B are inserted outward from the notch 51*b* of the second case 50.

Figure 26A:
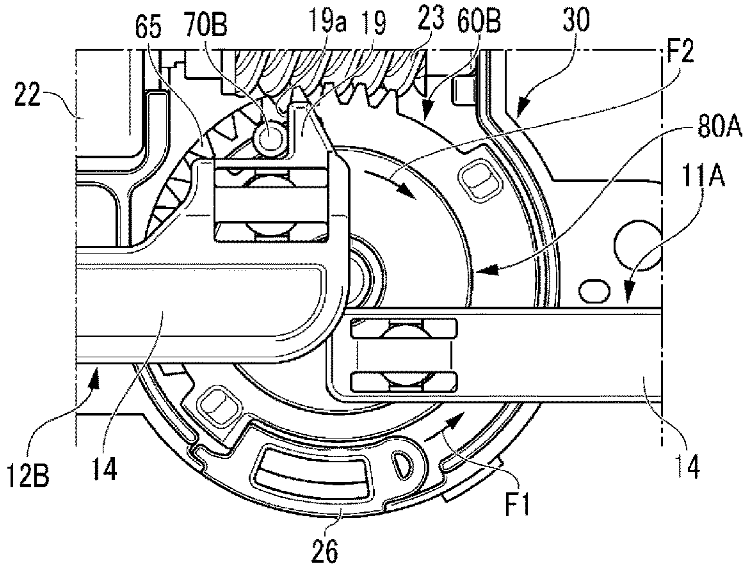
FIG. 26A is an explanatory view of a main part in a case where the opening and closing member is locked in a closed state by the electric lock device.

As shown in FIG. 26A, in a state in which the opening portion 2 is closed by the opening and closing member 5, the rotor 80A is rotationally biased in the direction indicated by the arrow F1 via the rod 11A biased by the torsion spring 15, which is the biasing member, and the engagement portion 13 of the rod 12B is biased via the rotor 80A in the direction in which the engagement portion 13 is engaged with the lock portion 3 (not shown). In this state, the receiving surface 19*a* of the receiving portion 19 of the rod 12B is brought into contact with and engaged with the pressing portion 70B of the wheel 60B.

Figure 26B:
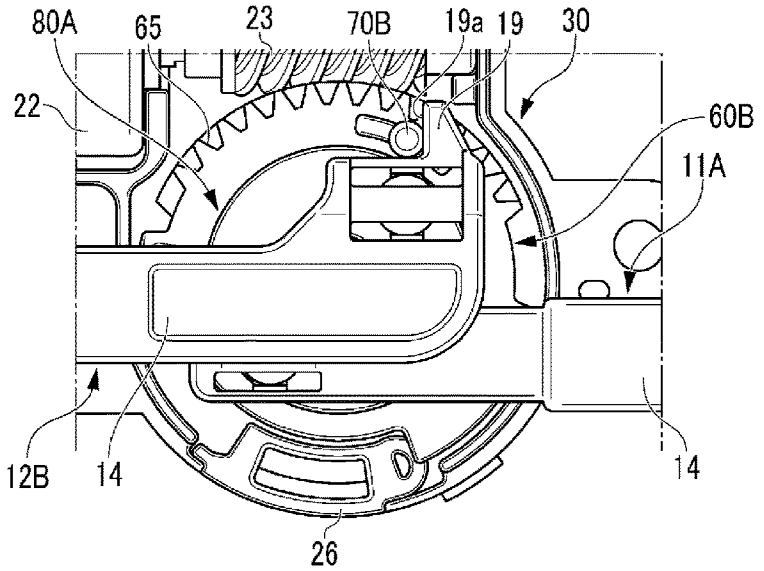
FIG. 26B is an explanatory view of a main part in a case where the lock in the state in which the opening and closing member is closed is released from the state shown in FIG. 26A.

In a case where the opening and closing member 5 is opened from the opening portion 2 of the fixed member 1 from the state described above, when the switch (not shown) on the surface side of the opening and closing member 5 is operated, the drive shaft 22*a* of the motor 22 is driven to rotate the gear 23, and the rotor 80A in conjunction with the gear 23 rotates in the direction of the arrow F2 against the rotation biasing force of the torsion spring 15. Then, as shown in FIG. 26B, the pressing portion 70B of the wheel 60B presses the receiving portion 19 of the rod 12B, and the engagement portion 13 slides in the direction in which the engagement portion 13 is disengaged from the lock portion 3. At the same time, since the rotor 80A rotates in the direction of the arrow F2 via the rod 12B, the rod 11A slides in the direction in which the engagement portion 13 is disengaged from the lock portion 3 in conjunction with the rotation of the rotor 80A.

As a result, the engagement portions 13 and 13 are pulled out from the pair of lock portions 3 and 3 and the engagement between the engagement portions 13 of the rods 11A and 12B and each lock portion 3 is released, and thus the opening and closing member 5 pivots downward by a weight thereof from the opening portion 2 of the fixed member 1, and the opening portion 2 of the fixed member 1 can be opened.

In the state (state shown in FIG. 26A) in which the engagement portions 13 and 13 of the rods 11A and 12B are biased via the torsion spring 15 in the direction in which the engagement portions 13 and 13 are engaged with the pair of lock portions 3, 3, when the opening and closing member 5 is pushed into the opening portion 2 in order to close the opening portion 2 of the fixed member 1, the tapered surface 13*a* of the engagement portion 13 of each of the rods 11A and 12B is pressed against an inner edge portion of the opening portion 2, and the pair of rods 11A and 12B are drawn into the opening and closing member 5 against the biasing force of the torsion spring 15.

Figure 26C:
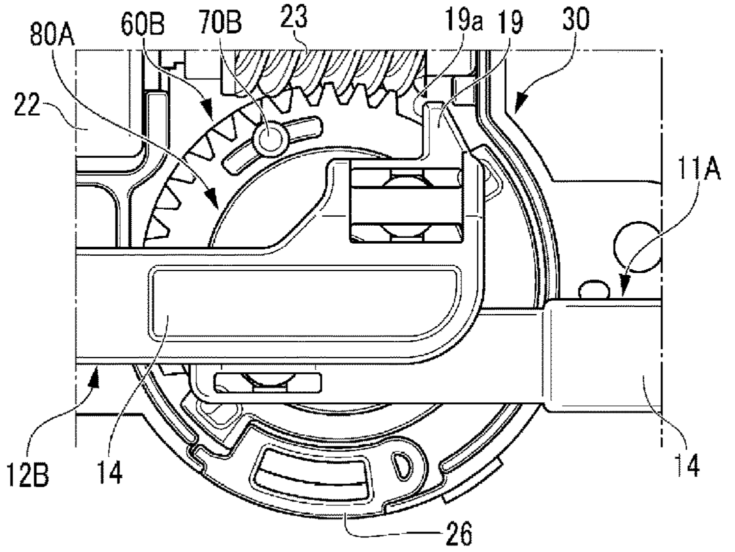
FIG. 26C is an explanatory view of a main part in a case where the opening and closing member is pushed in from a state in which the opening and closing member is opened from an opening portion of a fixed member in the electric lock device.

At this time, the rotation force in the direction indicated by the arrow F2 is applied to the rotor 80A via the rods 11A and 12B, and as shown in FIG. 26C, the wheel 60B does not rotate, and only the rotor 80A rotates independently of the wheel 60B in the direction indicated by the arrow F2 against the rotation biasing force in the direction indicated by the arrow F1 by the torsion spring 15. That is, the rotor 80 rotates independently of the wheel 60B in a direction in which the receiving portion 19 of the rod 12B is separated from the pressing portion 70B of the wheel 60B.

Therefore, also in the electric lock device 10B of this embodiment, the same operation and effect as those of the electric lock devices 10 and 10A of the above-described embodiment can be obtained.

In this embodiment, since the rod 12B is provided with the receiving portion 19 and the pressing portion 70B of the wheel 60B is engaged with and pressed against the receiving portion 19 (refer to FIG. 26A), the rod 12B can be quickly slid when the wheel 60B rotates. That is, the rod 12B can be directly slid without the rotor 80A intervening, and thus responsiveness when the rod 12B is slid is good.

Figure 25:
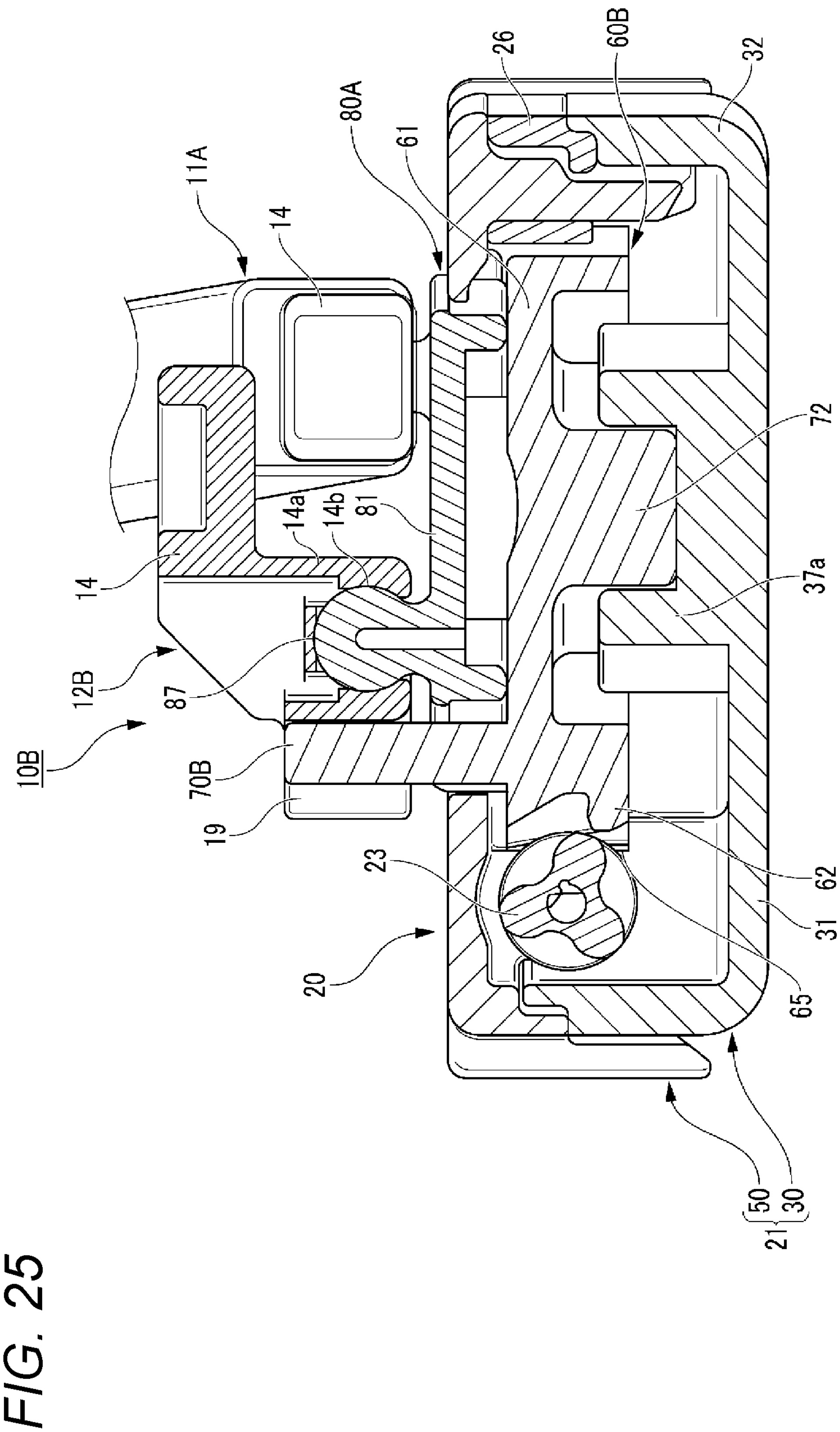
FIG. 25 is a cross-sectional view taken along line G-G in FIG. 23.

In addition, the pressing portion 70B provided on the wheel 60B protrudes in the same direction as the protruding direction of the rod engagement portion 87 protruding from the rotor surface side (refer to FIG. 25). As a result, since the pressing portion 70B partially overlaps in a thickness direction of the rod 12B engaged with the rod engagement portion 87, the lock device 10B can be relatively compact in its height direction (thickness direction).

(Fourth Embodiment of Electric Lock Device for Opening and Closing Member)

FIGS. 27 to 35 show a fourth embodiment of the electric lock device for an opening and closing member according to the present invention. Portions that are substantially the same as those of the above embodiment are given the same reference numerals, and descriptions thereof are omitted.

The electric lock device of the opening and closing member in this embodiment is different from the above-described embodiments in a shape of a cylindrical wall 41C of the first case 30 and the rotation range of the rotor 80.

Figure 27:
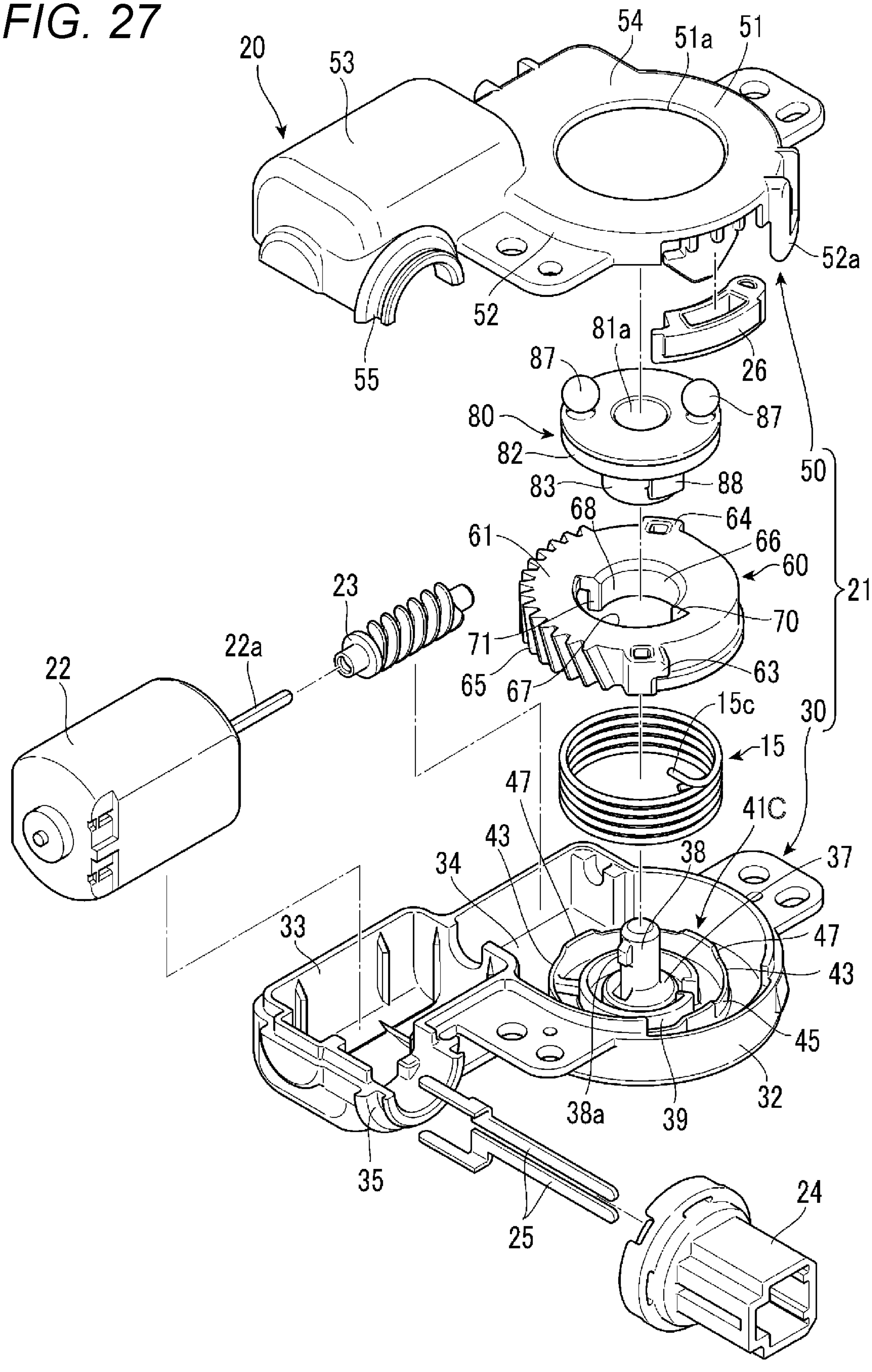
FIG. 27 is an exploded perspective view of an actuator constituting an electric lock device for an opening and closing member according to the present invention, showing a fourth embodiment of the electric lock device.
Figure 28:
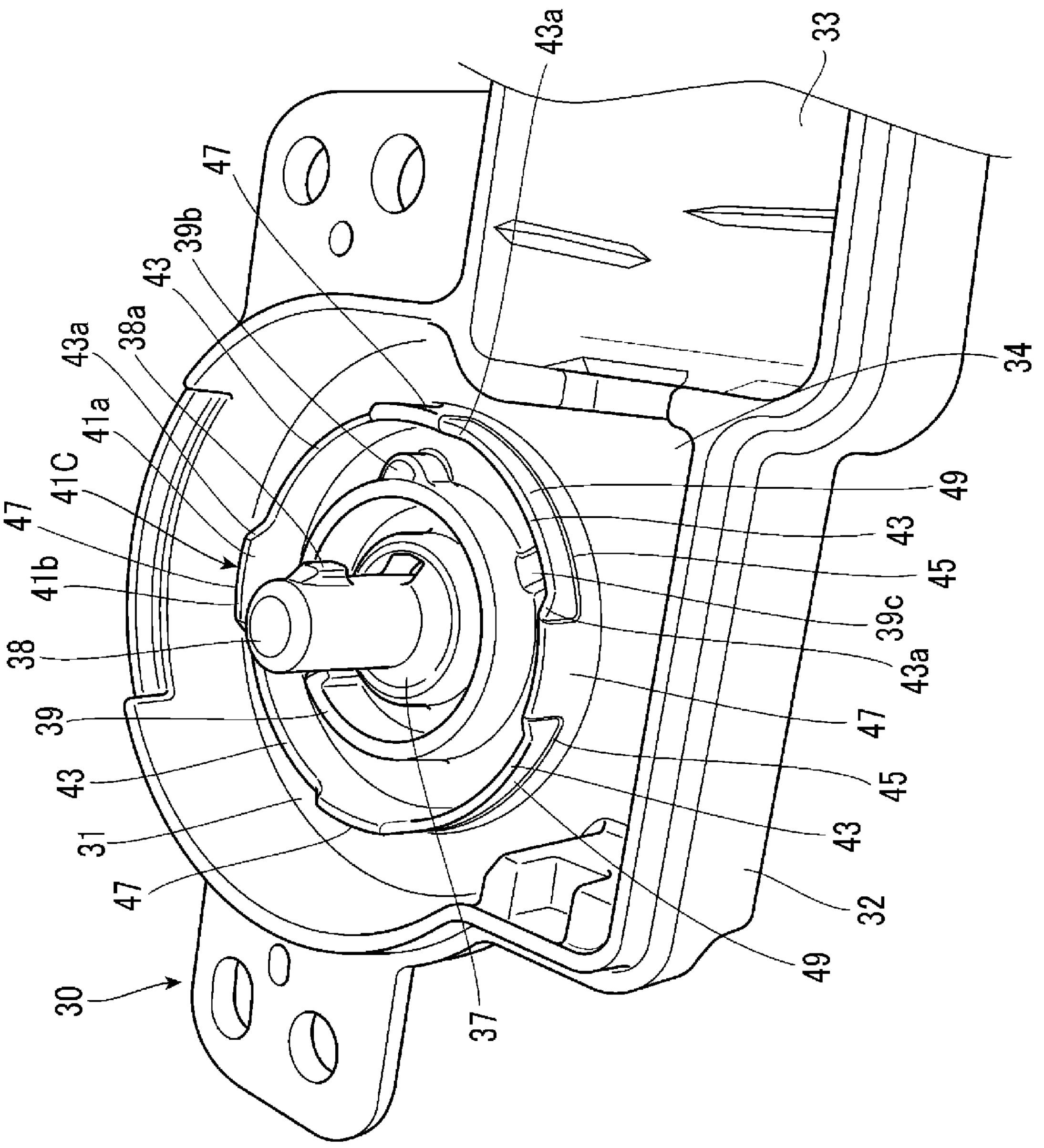
FIG. 28 is a perspective view of a first case constituting a case of the actuator.
Figure 29:
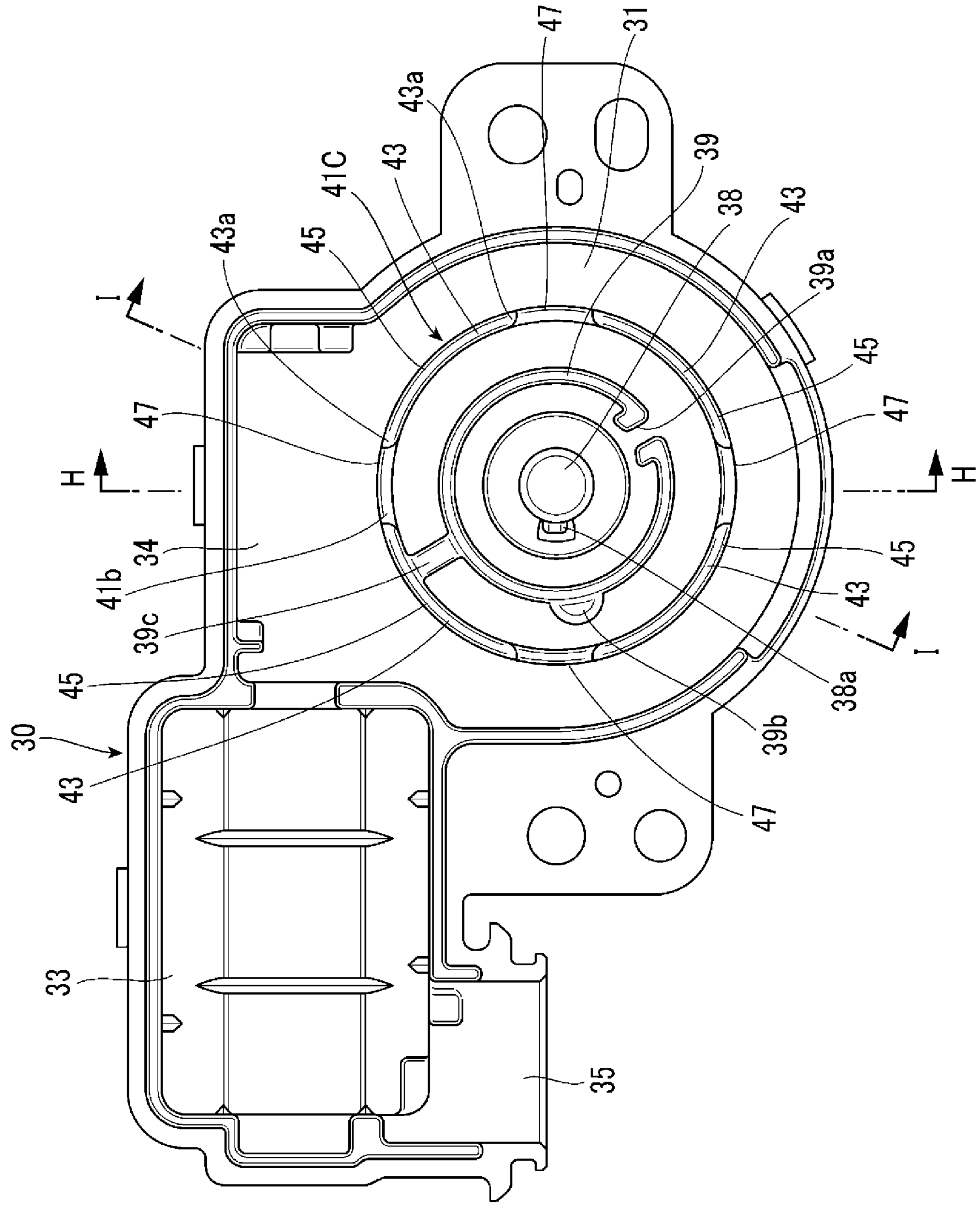
FIG. 29 is a plan view of the first case constituting the case of the actuator.
Figure 33:
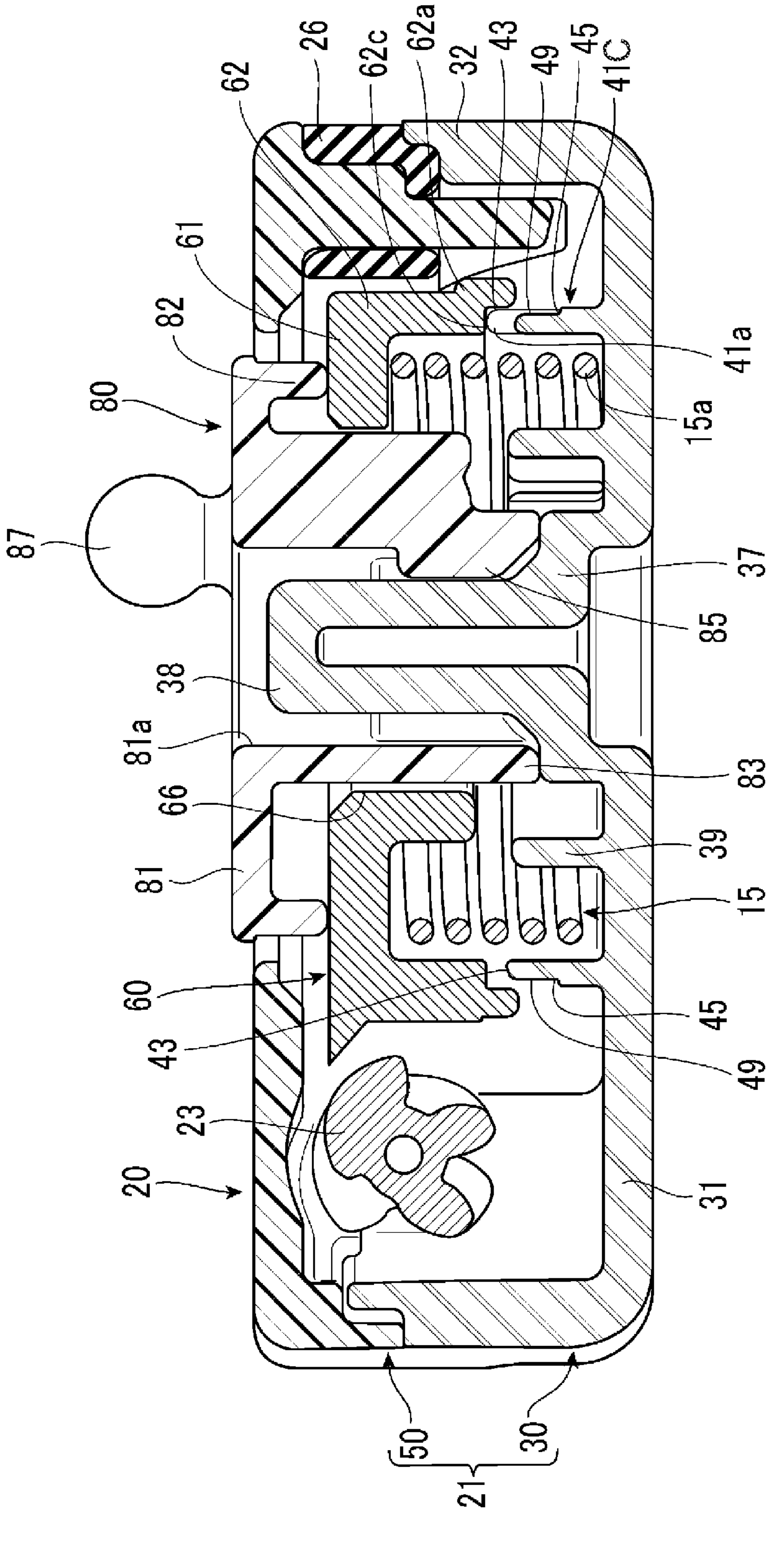
FIG. 33 is a cross-sectional view in a case where the first case is cut along line I-I in FIG. 29 in the actuator.

That is, in this embodiment, as shown in FIG. 33, the wheel 60 is rotatably supported outside the cylindrical wall 41C provided in the first case 30 constituting the case 21. As shown in FIGS. 27 to 29, an axial notch 43 formed in an opposite portion of the cylindrical wall 41C and the peripheral wall 62 in an axis direction of the cylindrical wall 41C and the peripheral wall 62 of the wheel 60, and the radial concave portion 45 formed in an opposite surface between the cylindrical wall 41C and the peripheral wall 62 in a radial direction of the cylindrical wall 41C and the peripheral wall 62 are provided, and a non-contact surface 49 is partially provided in which the cylindrical wall 41C and the peripheral wall 62 are not in contact with each other.

More specifically, as shown in FIG. 28, the cylindrical wall 41C has a substantially cylindrical shape as in the above-described embodiment.

As shown in FIG. 33, in the cylindrical wall 41C, the distal end portion 41*a* in an erecting direction from the bottom wall 31 is a portion opposite to an end surface 62*c* of the distal end portion in the extending direction of the peripheral wall 62 of the wheel 60, and the axial notch 43 is formed in the opposite portion.

Here, as shown in FIG. 28, the axial notch 43 is formed by notching a predetermined depth in the axis direction of the cylindrical wall 41C and a predetermined width in the circumferential direction of the cylindrical wall 41C from a distal end surface 41*b* of the distal end portion 41*a* in the erecting direction of the cylindrical wall 41C toward a proximal end side in the erecting direction. As shown in FIG. 29, a plurality of (here, four) axial notches 43 are formed at equal intervals in the circumferential direction of the cylindrical wall 41C. Further, tapered portions 43*a* and 43*a* are provided at both end portions in the circumferential direction of each axial notch 43 so as to gradually expand the axial notch 43 toward the distal end in the erecting direction of the cylindrical wall 41.

Further, a radial concave portion 45 is formed on a surface of the cylindrical wall 41C that faces the peripheral wall 62 of the wheel 60 (also referred to as an outer surface facing an inner surface of the peripheral wall 62. Hereinafter, also referred to as a "peripheral wall opposite surface").

As shown in FIG. 28, the radial concave portion 45 of this embodiment has a recessed groove shape that is recessed at a predetermined depth inward in the radial direction of the cylindrical wall 41C at a position matching the axial notch 43 of the cylindrical wall 41C and from the peripheral wall opposite surface of the cylindrical wall 41C toward an opposite surface in the thickness direction. As shown in FIG. 29, a plurality of (here, four) radial concave portions 45 are formed at equal intervals in the circumferential direction of the cylindrical wall 41C corresponding to the plurality of axial notches 43.

Figure 32:
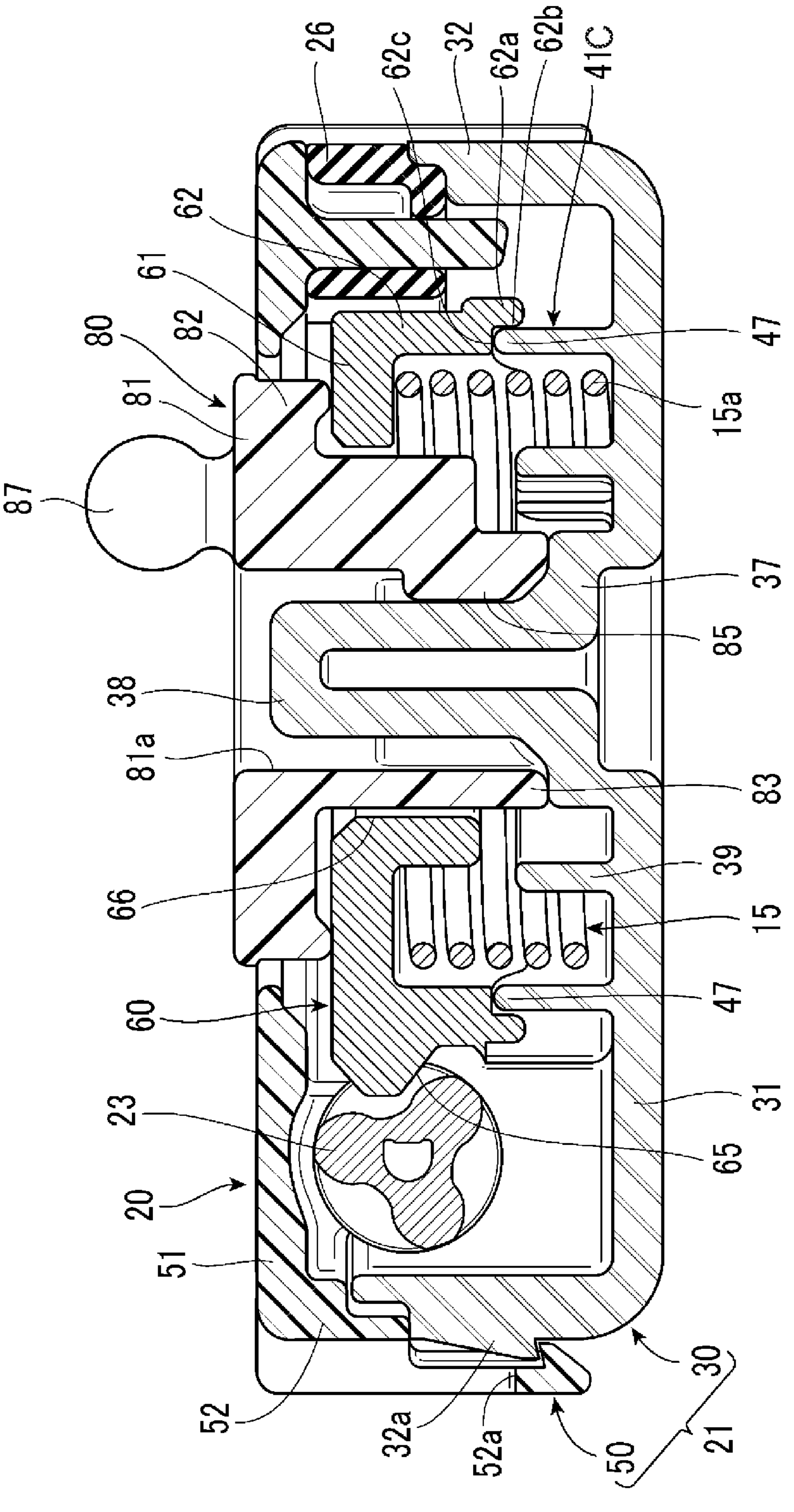
FIG. 32 is a cross-sectional view in a case where the first case is cut along line H-H in FIG. 29 in the actuator.

As shown in FIG. 28, the cylindrical wall 41C is provided with a wheel support portion 47 between the axial notches 43 and 43 adjacent in the circumferential direction. As shown in FIG. 32, in a state in which the peripheral wall 62 of the wheel 60 is arranged outside the cylindrical wall 41C and the wheel 60 is rotatably supported, the wheel support portion 47 is arranged close to a position facing the inner surface (a surface facing the cylindrical wall 41C) of the peripheral wall 62 of the wheel 60 and serves as a portion that supports the wheel 60.

Further, as shown in FIG. 33, in the state in which the peripheral wall 62 of the wheel 60 is arranged outside the cylindrical wall 41C and the wheel 60 is rotatably supported, a surface of the radial concave portion 45 that faces a peripheral wall 62 side of the wheel 60 is separated from the inner surface of the peripheral wall 62, and this surface forms the non-contact surface 49 in which the cylindrical wall 41C and the peripheral wall 62 are not brought into contact with each other.

Figure 31:
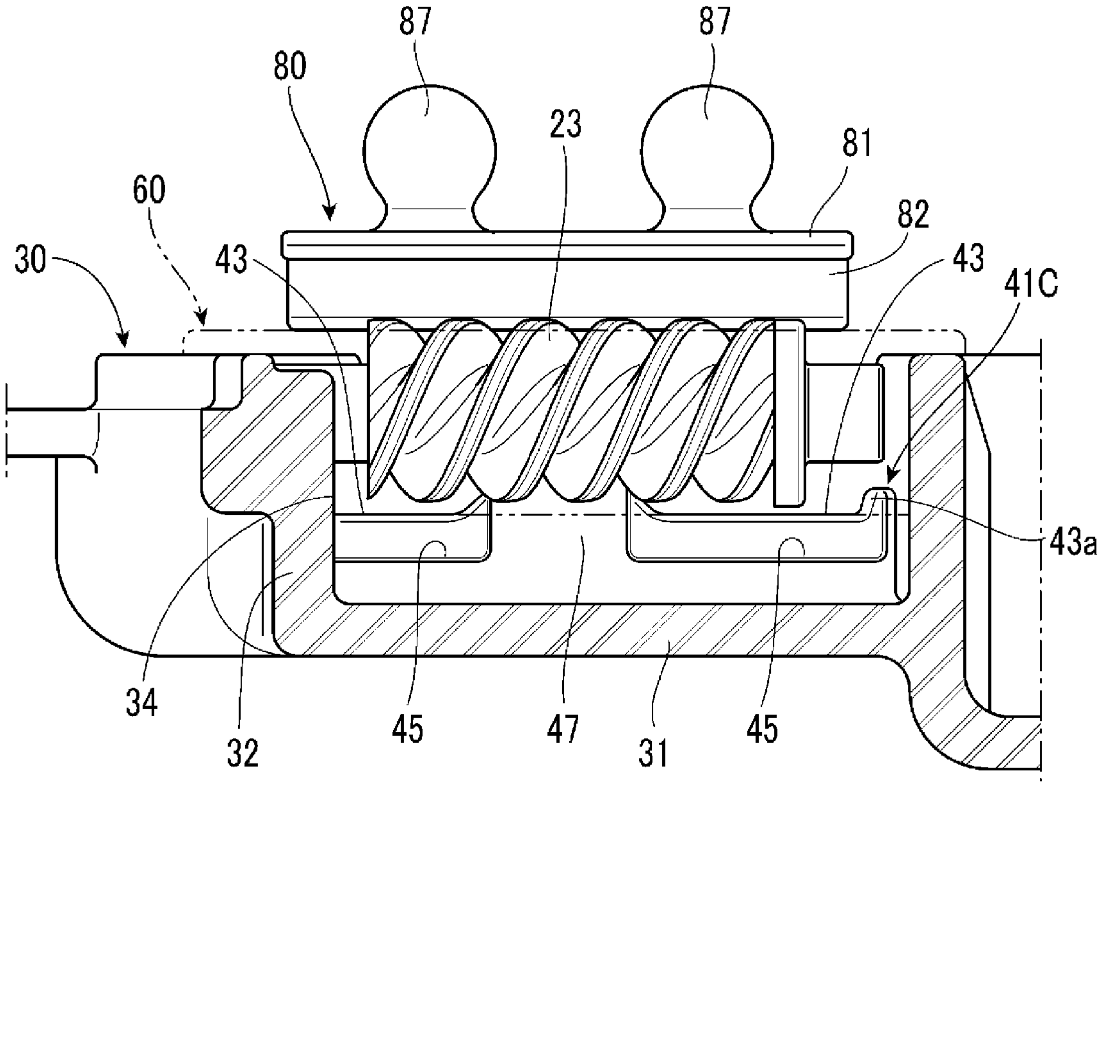
FIG. 31 is a partially sectional explanatory view showing a relation between a gear, the wheel, and the like when the wheel is viewed from a radial direction in the actuator.

In this embodiment, as shown in FIG. 31, when the wheel 60 is viewed from the radial direction, a predetermined wheel support portion 47 is arranged to overlap with the gear 23.

Referring also to FIG. 27, among the plurality of wheel support portions 47, the wheel support portion 47 arranged close to the gear 23 (the wheel support portion 47 positioned in the gear arrangement portion 34 of the first case 30 in FIG. 27) is arranged to overlap with the gear 23 when the wheel 60 is viewed from the radial direction (refer to FIG. 31).

As shown in FIG. 29, a spring lock groove 39*a* is formed at a predetermined position in the circumferential direction of the spring lock wall 39 provided inside the cylindrical wall 41C, and the spring lock groove 39*a* in this embodiment is arranged at a position closer to the circumferential direction of the spring lock wall 39 than the spring lock groove 39*a* shown in FIG. 4 of the first embodiment with respect to the convex portion 38*a* provided on the outer periphery of the distal end portion in the protruding direction of the support shaft 38. As a result, in the fourth embodiment, an assembling angle of the torsion spring 15 with respect to the spring lock wall 39 is different from that in the first embodiment.

Figure 34:
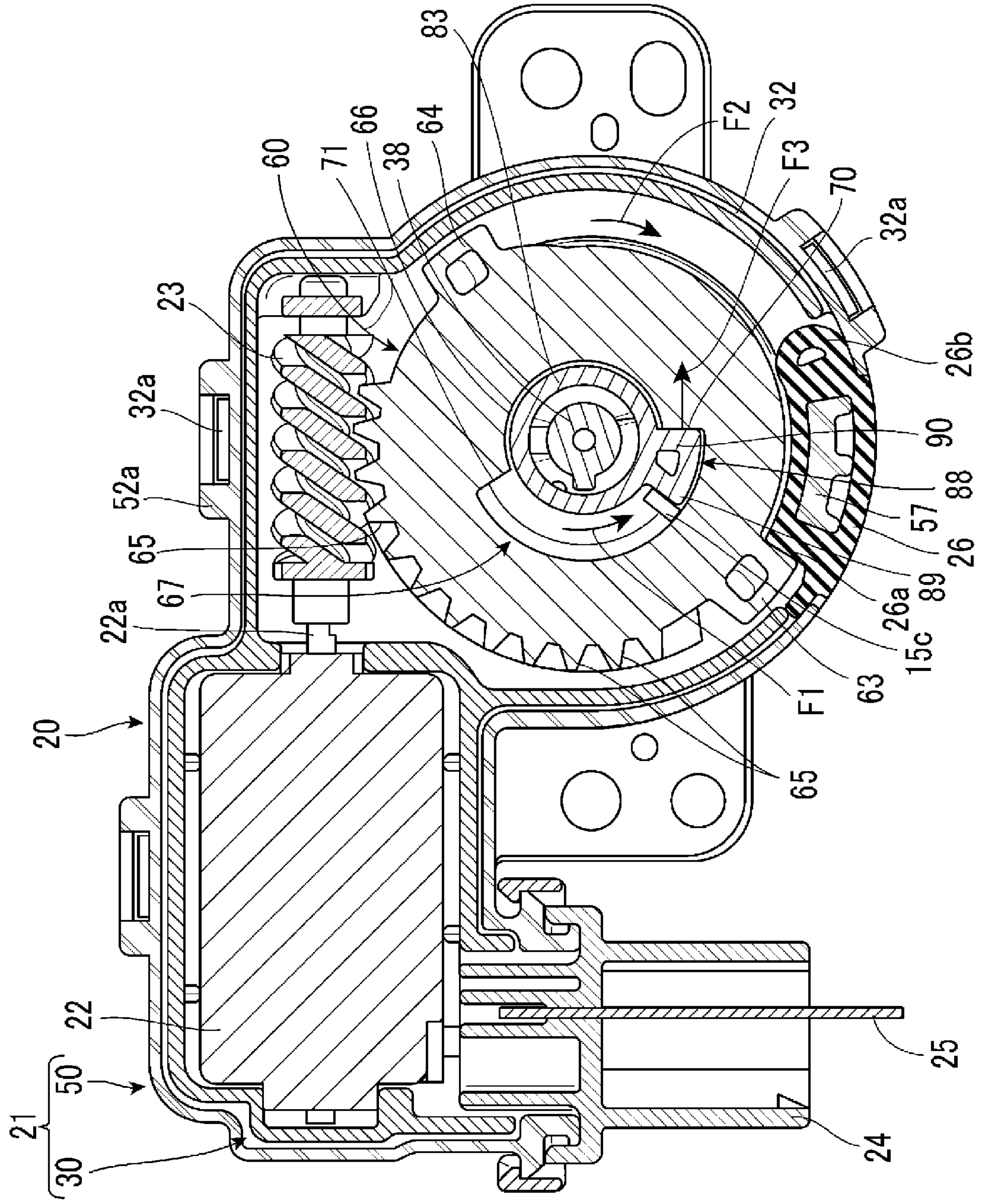
FIG. 34 is a transversal cross-sectional view of the actuator.
Figure 35:
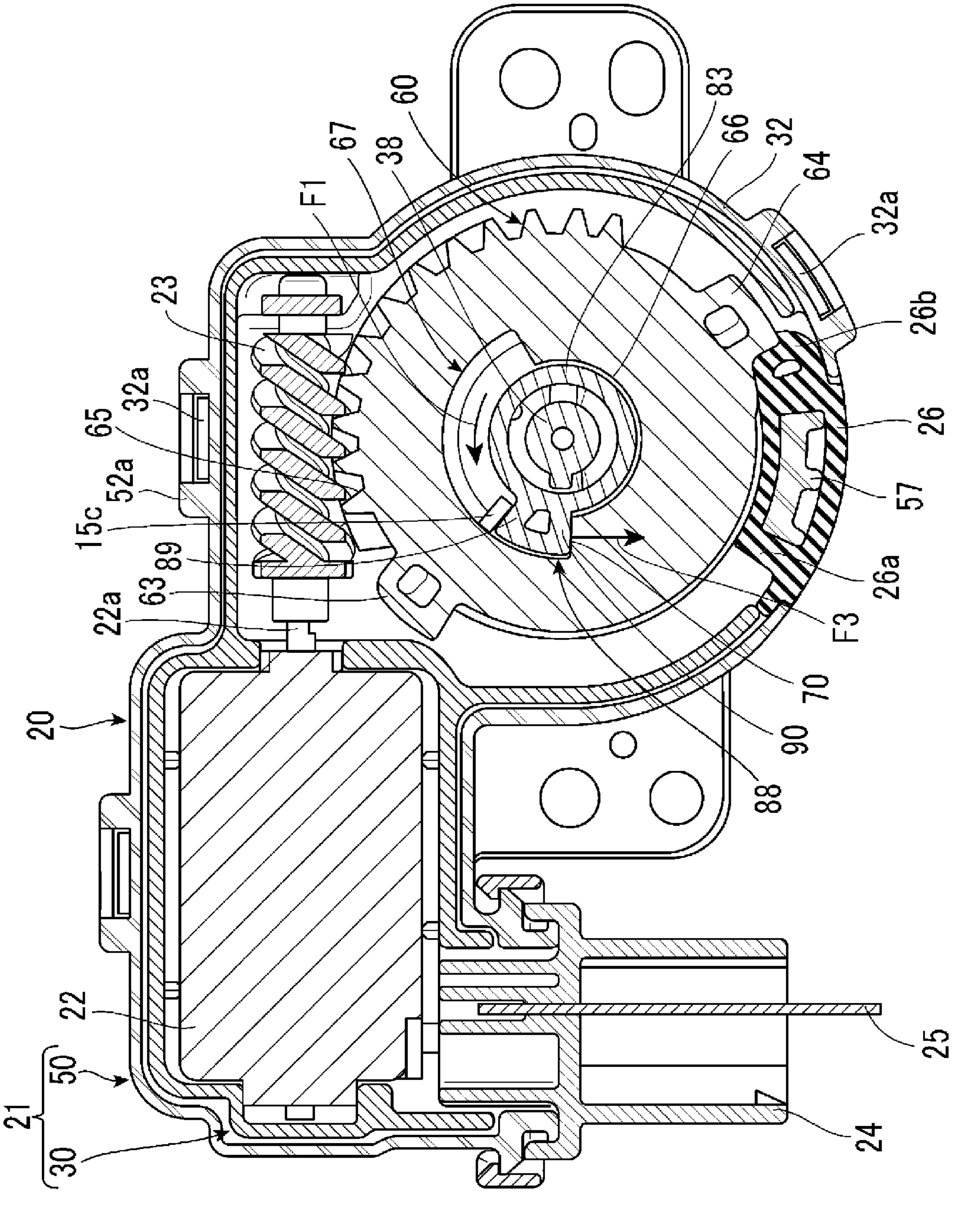
FIG. 35 is a sectional explanatory view showing a state in which the wheel and the rotor are rotated in a predetermined direction from a state shown in FIG. 34.

In the fourth embodiment, the number and a module of the teeth 65 formed on the outer periphery of the peripheral wall 62 of the wheel 60 shown in FIGS. 34 and 35 are different from the number and a module of the teeth 65 of the wheel 60 in the first embodiment shown in FIGS. 10, 13, and 14.

Figure 30:
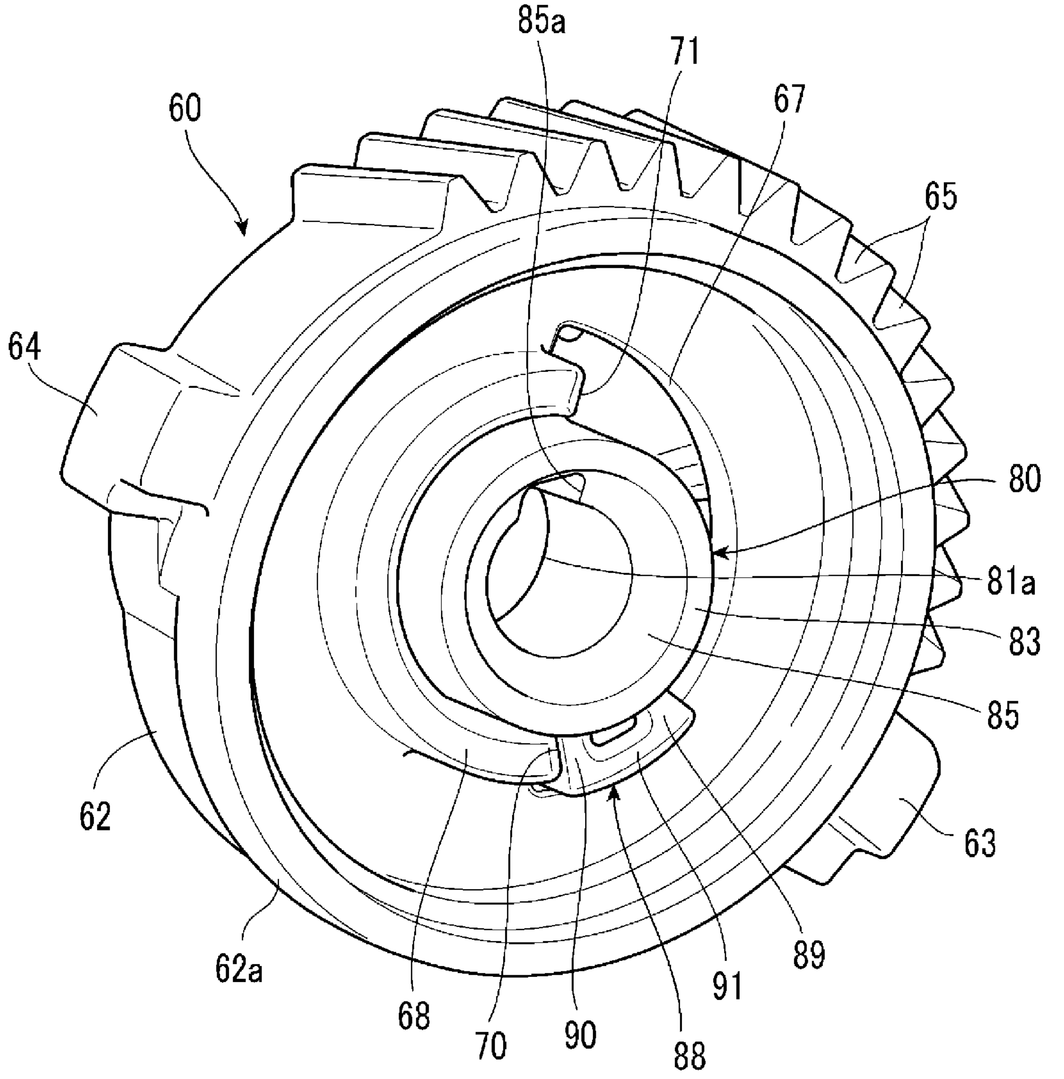
FIG. 30 is an assembly perspective view of a wheel and a rotor constituting the actuator.

Further, in this embodiment, as shown in FIGS. 27 and 30, the pressing portion 70 provided at one end of the notch 67 of the wheel 60 in the circumferential direction is arranged closer to the one protruding portion 63 provided on the outer periphery of the peripheral wall 62 of the wheel 60, and the spring contact portion 71 provided at the other end of the notch 67 in the circumferential direction is arranged at an intermediate position in the circumferential direction of the pair of protruding portions 63 and 64 provided on the outer periphery of the peripheral wall 62.

As shown in FIG. 30, in the rotor 80 in this embodiment, the pivoting portion 88 is formed to have a shorter circumferential length than the pivoting portion 88 of the rotor 80 in the above embodiment, and the pivoting range of the wheel 60C in the notch 67 is increased.

In the electric lock device 10C, in the rotation range of the wheel 60 rotated by the motor 22, a direction of the biasing force of the biasing member from the receiving portion 9) with respect to the pressing portion 70 is not directed to a portion where the gear 23 and the teeth 65 mesh with each other.

The "rotation range of the wheel" refers to (1) a range in which the motor 22 is driven to rotate the gear 23 and the wheel 60 is rotated in a predetermined direction (the direction indicated by F2 in FIG. 34) by energizing the actuator 20 from a state in which the rotation of the wheel 60 is stopped, and then the driving of the motor 22 and the rotation of the gear 23 are stopped by stopping the energization to the actuator 70 20, and (2) a range in which the receiving portion 90 of the rotor 80 presses the pressing portion 70 of the wheel 60 from the state in which the driving of the motor 22 and the rotation of the gear 23 are stopped and the rotation of the wheel 60 is stopped, whereby the wheel 60 is rotated in a direction (the direction indicated by F1 in FIG. 34 and also referred to as a return direction of the wheel 60) opposite to the predetermined direction.

The rotation range of the wheel will be described in comparison with the first embodiment. FIG. 10 shows a normal state of the electric lock device 10 of the first embodiment, that is, a state in which the motor 22 is not driven and the gear 23 is not rotated (a state before the energization to the actuator 20). In this normal state, the receiving portion 90 of the rotor 80 rotationally biased by the torsion spring 15, which is the biasing member, presses the pressing portion 70 of the wheel 60. That is, a biasing force F3 of the biasing member is applied to the pressing portion 70 of the wheel 60 from the receiving portion 90 of the rotor 80 (it can also be said that the biasing force F3 is applied to the pressing portion 70 via the receiving portion 90), but the biasing force F3 is directed to a portion where the gear 23 and the teeth 65 mesh with each other in the electric lock device 10 of the first embodiment.

Meanwhile, in the electric lock device 10C of the fourth embodiment, the assembling angle of the torsion spring 15 with respect to the spring lock wall 39 is different from that in the first embodiment, and thus in the normal state, the biasing force F3 of the biasing member, which is applied to the pressing portion 70 of the wheel 60 from the receiving portion 90 of the rotor 80 is not directed to the portion where the gear 23 and the teeth 65 mesh with each other.

In this embodiment, as shown in FIG. 34, in a state in which the torsion spring 15 is assembled to the spring lock wall 39 and the peripheral wall 62 of the wheel 60 is arranged outside the cylindrical wall 41C, the pressing portion 70 of the wheel 60 and the receiving portion 90 of the rotor 80, which is brought into contact with the pressing portion 70 are arranged at a position intersecting (here, a position orthogonal to) the axis direction of the drive shaft 22*a* of the motor 22 and the gear 23 (it can be said that the pressing portion 70 and the receiving portion 90 are arranged at the 6 o'clock position on the paper surface of FIG. 34).

In this embodiment, when the actuator 20 is energized, the motor 22 is driven to rotate the gear 23 and the wheel 60 rotates in the direction indicated by the arrow F2 (clockwise direction in the drawing), and in this case, the pressing portion 70 and the receiving portion 90 are preferably arranged to be in a range from the 6 o'clock position to the 12 o'clock position on the paper surface of FIG. 34.

In the electric lock device 10C of the fourth embodiment, after the actuator 20 is energized, the motor 22 is driven to rotate the gear 23, and the wheel 60 and the rotor 80 are maximally rotated (refer to FIG. 35), the rotor 80 is rotationally biased in the direction indicated by the arrow F1 by the biasing force of the torsion spring 15, the receiving portion 90 presses the pressing portion 70 of the wheel 60 to rotate the wheel 60 in the direction indicated by the arrow F1 in FIG. 35 to return to the state shown in FIG. 34, and also in this state, the biasing force F3 of the biasing member, which is applied to the pressing portion 70 of the wheel 60 from the receiving portion 90 of the rotor 80 is not directed to the portion where the gear 23 and the teeth 65 mesh with each other.

(Modification of Fourth Embodiment)

In this embodiment, the peripheral wall 62 of the wheel 60 is arranged outside the cylindrical wall 41C, but a peripheral wall of a wheel may be arranged inside a cylindrical wall. In addition, in this embodiment, the axial notch 43 and the radial concave portion 45 are formed in a cylindrical wall 41C side, but an axial notch and/or a radial concave portion may be formed in a peripheral wall side of the wheel. Furthermore, in this embodiment, both the axial notch 43 and the radial concave portion 45 are formed in the cylindrical wall 41C, but only one of the axial notch and the radial concave portion may be formed.

That is, instead of the structure shown in FIGS. 27 to 35 (a structure in which the peripheral wall of the wheel is arranged outside the cylindrical wall and the axial notch and the radial concave portion are formed in the cylindrical wall), this embodiment may have (1) a structure in which the peripheral wall of the wheel is arranged outside the cylindrical wall and the axial notch or the radial concave portion is formed in the cylindrical wall, (2) a structure in which the peripheral wall of the wheel is arranged inside the cylindrical wall and the axial notch and/or the radial concave portion are formed in the cylindrical wall, (3) a structure in which the peripheral wall of the wheel is arranged outside the cylindrical wall and the axial notch and/or the radial concave portion are formed in the peripheral wall of the wheel (this will be described in detail in a fifth embodiment which will be described later), and (4) a structure in which the peripheral wall of the wheel is arranged inside the cylindrical wall and the axial notch and/or the radial concave portion are formed in the peripheral wall of the wheel.

In the fourth embodiment, when the actuator 20 is energized, the rotor 80 is rotated in the direction indicated by the arrow F2 in FIG. 34, while the rotor 80 may be rotated in the direction indicated by the arrow F1 (counterclockwise direction in the drawing) in FIG. 34 when the actuator 20 is energized. In this case, a pressing portion of the wheel and a receiving portion of the rotor are preferably arranged to be in a range from the 12 o'clock position to the 6 o'clock position on the paper surface of FIG. 34.

(Operation and Effect of Fourth Embodiment)

Next, operations and effects of the electric lock device having the structure described above will be described.

That is, in this embodiment, as shown in FIG. 33, since the axial notch 43 and the radial concave portion 45 are provided in one of the cylindrical wall 41C and the peripheral wall 62 (here, the cylindrical wall 41C) and the non-contact surface 49 is partially provided, sliding resistance between the cylindrical wall 41C and the peripheral wall 62 can be reduced.

As a result, when the rotor 80 is rotationally biased in the direction indicated by the arrow F1 by the biasing force of the torsion spring 15, which is the biasing member and the receiving portion 90 of the rotor 80 presses the pressing portion 70 of the wheel 60 to return the wheel 60 to the state shown in FIG. 34 from the state in which the energization to the actuator 20 is stopped to stop the driving of the motor 22 and the rotation of the gear 23 as shown in FIG. 35, the wheel 60 can be easily returned.

In this embodiment, at least a plurality of the axial notches 43 are formed in the cylindrical wall 41C, a plurality of wheel support portions 47 are provided between these axial notches 43, and as shown in FIG. 31, and when the wheel 60 is viewed from the radial direction, a predetermined wheel support portion 47 is arranged to overlap with the gear 23.

According to the above aspect, when the wheel 60 is viewed from the radial direction, the predetermined wheel support portion 47 is arranged to overlap with the gear 23, and thus even if a force from the gear 23 is applied to the teeth 65 of the wheel 60 and the wheel 60 tends to tilt, the predetermined wheel support portion 47 receives the peripheral wall 62 of the wheel 60, the wheel 60 can be made less likely to tilt, and the wheel 60 can be maintained in a stable posture.

In this embodiment, as shown in FIG. 34, in the rotation range of the wheel 60 rotated by the motor 22, the direction (refer to the arrow F3) of the biasing force of the biasing member (here, the torsion spring 15) from the receiving portion 90 with respect to the pressing portion 70 is not directed to the portion where the gear 23 and the teeth 65 mesh with each other.

According to the above aspect, since the wheel 60 can be suppressed from being directed so as to approach to the gear 23 by the above-described configuration, it is possible to suppress an increase in the resistance between the gear 23 and the teeth 65. As a result, when the wheel 60 is to be retuned to the state shown in FIG. 34 from the state shown in FIG. 35, the wheel 60 can be more easily returned.

(Fifth Embodiment of Electric Lock Device for Opening and Closing Member)

Figure 36:
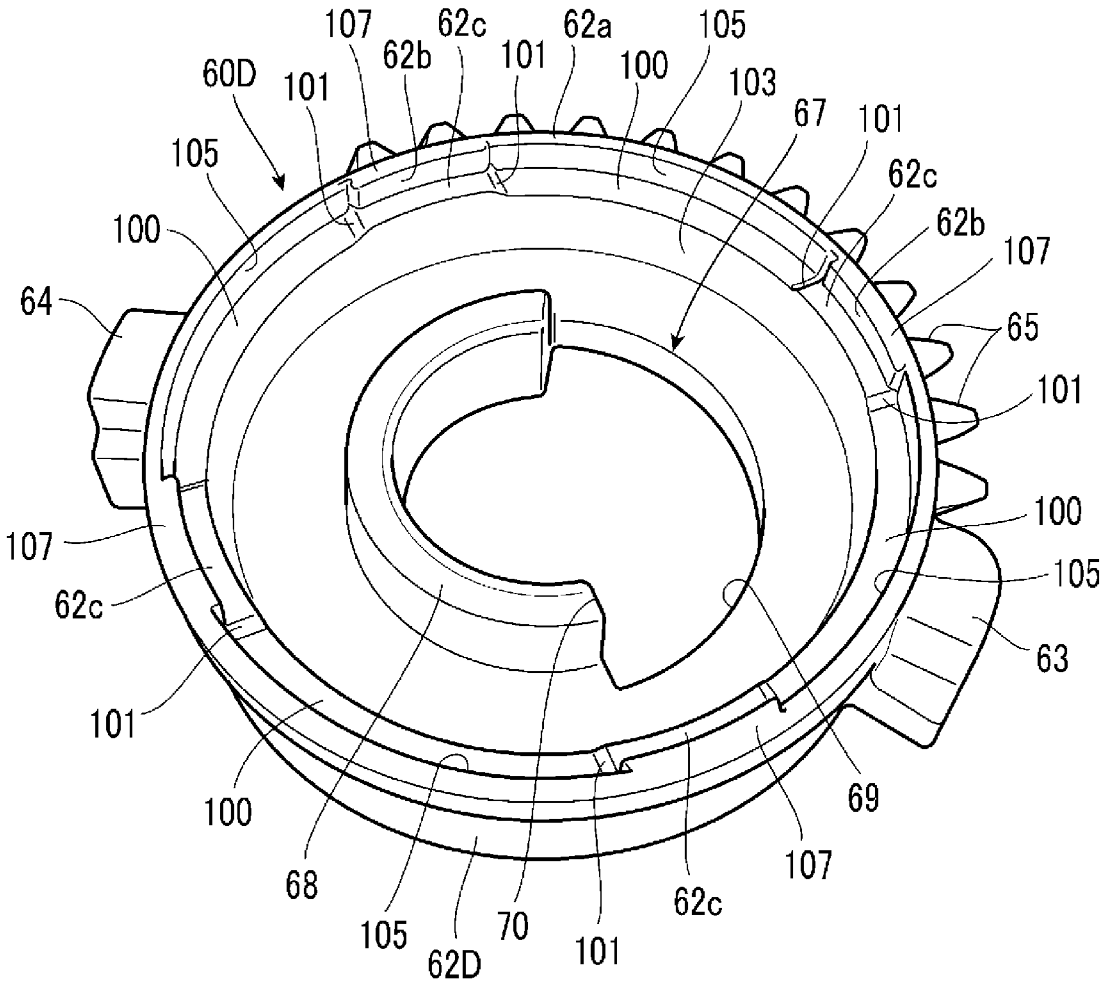
FIG. 36 is a perspective view of a wheel constituting an actuator, showing a fifth embodiment of an electric lock device for an opening and closing member according to the present invention.
Figure 37:
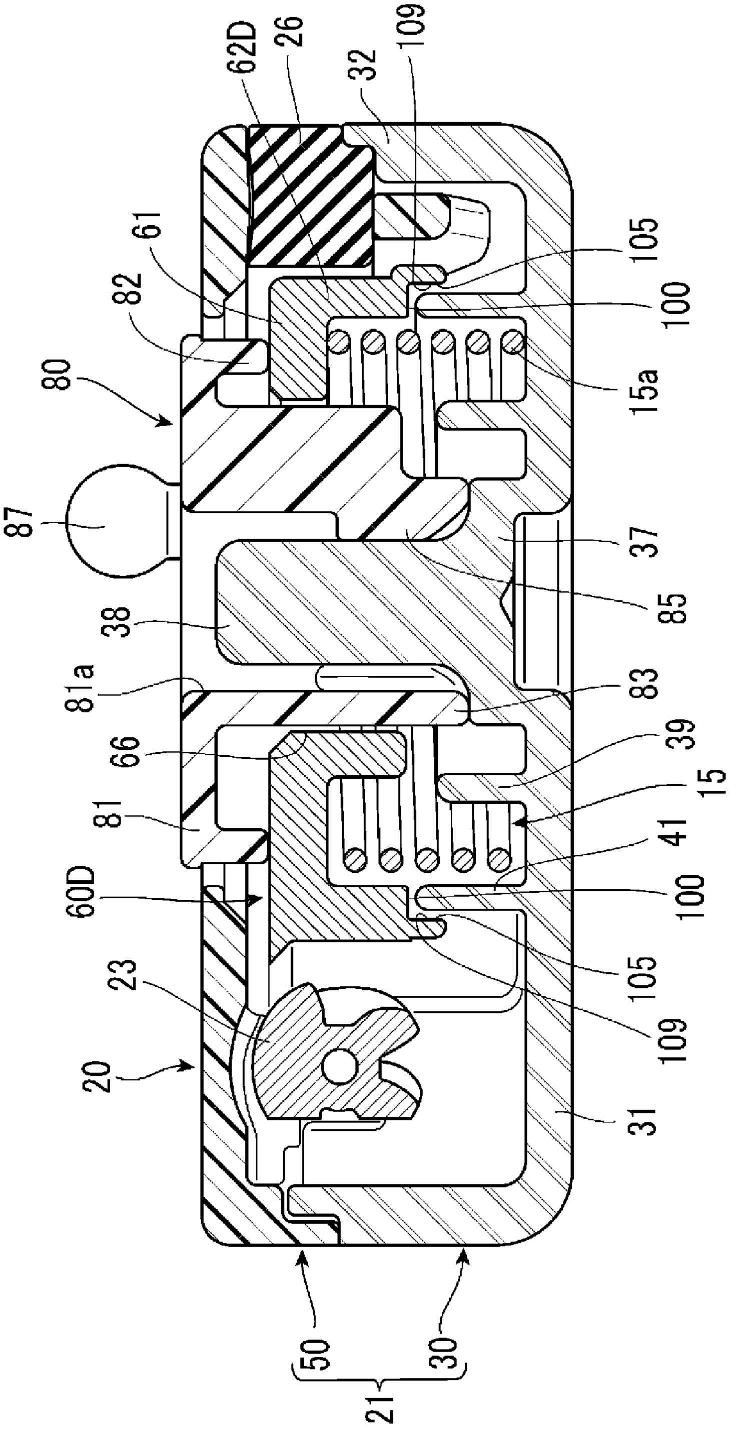
FIG. 37 is a longitudinal cross-sectional view of the actuator constituting the electric lock device.

FIGS. 36 and 37 show the fifth embodiment of the electric lock device for an opening and closing member according to the present invention. Portions that are substantially the same as those of the above embodiment are given the same reference numerals, and descriptions thereof are omitted.

The electric lock device for an opening and closing member of this embodiment is different from the fourth embodiment in that an axial notch 100 and a radial concave portion 105 are formed in a peripheral wall 62D of a wheel 60D.

As shown in FIG. 37, a distal end portion in an extending direction of the peripheral wall 62D of the wheel 60D is a portion opposite to the distal end portion in the erecting direction of the cylindrical wall 41 provided in the first case 30 constituting the case 21, and the axial notch 100 is formed in this opposite portion.

Here, the enlarged diameter portion 62*a* is formed in the distal end portion in an extending direction of the peripheral wall 62D, the stepped concave portion 62*b* is formed on an inner surface side of the enlarged diameter portion 62*a*, the end surface 62*c* positioned at a distal end in the erecting direction of the peripheral wall 62D is provided inside the enlarged diameter portion 62*a* and at a position connected to the concave portion 62*b*, and the axial notch 100 is formed from the end surface 62*c* toward a proximal end side in the erecting direction, which is notched at a predetermined depth in an axis direction of the peripheral wall 62D and at a predetermined width in a circumferential direction of the peripheral wall 62D (refer to FIG. 36). As shown in FIG. 36, a plurality of (here, four) axial notches 100 are formed at equal intervals in the circumferential direction of the peripheral wall 62D. Further, tapered portions 101 and 101 are provided at both end portions in the circumferential direction of each axial notch 100 so as to gradually expand the axial notch 100 toward the distal end of the peripheral wall 62D in the erecting direction.

The radial concave portion 105 is formed on a surface of the peripheral wall 62D facing the cylindrical wall 41 of the first case 30 (also referred to as an inner surface facing the outer surface of the cylindrical wall 41. Hereinafter, also referred to as a "cylindrical wall opposite surface").

As shown in FIG. 36, the radial concave portion 105 of this embodiment has a recessed groove shape that is recessed at a predetermined depth outward in the radial direction of the peripheral wall 62D at a position matching the axial notch 100 of the peripheral wall 62D and from the cylindrical wall opposite surface of the peripheral wall 62D toward an opposite surface in the thickness direction. As shown in FIG. 36, a plurality of (here, four) radial concave portions 105 are formed at equal intervals in the circumferential direction of the peripheral wall 62D corresponding to the plurality of axial notches 100.

As shown in FIG. 36, the peripheral wall 62D is provided with a wheel support portion 107 between the axial notches 100 and 100 adjacent in the circumferential direction. In a state in which the peripheral wall 62D is arranged outside the cylindrical wall 41 of the first case 30 and the wheel 60 is rotatably supported, the wheel support portion 107 is arranged close to a position facing the outer surface (a surface facing the peripheral wall 62D) of the cylindrical wall 41 and serves as a portion that supports the wheel 60.

Further, as shown in FIG. 37, in the state in which the peripheral wall 62D is arranged outside the cylindrical wall 41 and the wheel 60 is rotatably supported, a surface of the radial concave portion 105 that faces a cylindrical wall 41 side of the first case 30 is separated from the outer surface of the cylindrical wall 41, and this surface forms a non-contact surface 109 in which the cylindrical wall 41 and the peripheral wall 62D are not brought into contact with each other.

Also in the electric lock device of the fifth embodiment having the above structure, the same operation and effect as those of the electric lock device of the fourth embodiment can be obtained.

The present invention is not limited to the embodiments described above, various modifications can be made within the scope of the gist of the present invention, and such embodiments are also included in the scope of the present invention.

REFERENCE SIGNS LIST

1: fixed member
2: opening portion
3: lock portion
5: opening and closing member
10, 10A, 10B: electric lock device for opening and closing member (electric lock device)
11, 11A, 12, 12B: rod
13: engagement portion
15: torsion spring (biasing member)
16: coil spring (biasing member)
19: receiving portion
20: actuator
21, 21B: case
22: motor
23: gear
30: first case
31: bottom wall
32: peripheral wall
38: support shaft (rotation support portion)
41, 41C: cylindrical wall
43: axial notch
45: radial concave portion
47: wheel support portion
49: non-contact surface
50: second case
51: ceiling wall
52: peripheral wall
60, 60A: wheel
61: base portion
62, 62D: peripheral wall
65: teeth
70, 70A, 70B: pressing portion
80, 80A: rotor
81: base portion
82: peripheral wall
90, 90A: receiving portion
100: axial notch
105: radial concave portion
107: wheel support portion
109: non-contact surface

The invention claimed is:

1. An electric lock device for an opening and closing member configured to be openably and closably attached to an opening portion in a fixed member, the electric lock device comprising:

a lock portion provided on one of the opening and closing member and the fixed member;

a rod slidably arranged on an other of the opening and closing member and the fixed member and configured to engage with and disengage from the lock portion;

a biasing member configured to directly or indirectly bias the rod in a direction in which the rod is brought into engagement with the lock portion; and an actuator arranged on the other of the opening and closing member and the fixed member and configured to slide the rod to disengage from the lock portion, wherein the actuator includes a case attached to the other of the opening and closing member and the fixed member, a motor arranged within the case, a wheel configured to rotate in conjunction with the motor, and a rotor rotatably supported within the case and configured to engage with the rod and to cause the rod to engage with and disengage from the lock portion by a rotation operation, the wheel is provided with a pressing portion that is configured to engage with a receiving portion provided on the rotor or the rod when the wheel rotates in a predetermined direction to move the rod against a biasing force of the biasing member in a direction in which the rod disengages from the lock portion, when a rotation force is applied to the rotor in a direction against the biasing force of the biasing member via the rod in a state where the rod is biased by the biasing member in a direction in which the rod is engaged with the lock portion, the rotor is capable of rotating independently of the wheel in a direction in which the receiving portion is separated from the pressing portion, the rotor is rotatably arranged inside the wheel, the rotor includes a cylindrical portion, and the wheel includes a shaft hole into which the cylindrical portion is inserted.

2. The electric lock device for the opening and closing member according to claim 1, wherein the case includes a rotation support portion configured to rotatably support the rotor, and the rotor is retained and held by the rotation support portion, and the wheel is retained and held by the rotor.

3. The electric lock device for the opening and closing member according to claim 1, wherein the rotor is rotatably supported by the case via a support shaft, and the case includes a bottom wall, a cylindrical wall is erected from the bottom wall to form a concentric shape on an outer periphery of the support shaft, and the wheel is rotatably supported by the cylindrical wall.

4. The electric lock device for the opening and closing member according to claim 3, wherein a gear is provided on a drive shaft of the motor, the wheel includes a base portion and a peripheral wall in which teeth that mesh with the gear are formed, and a stepped concave portion is formed on an inner surface side of an end portion on a side opposite to the base portion of the wheel, and a distal end portion of the cylindrical wall is arranged in the concave portion, and the wheel is rotatably supported.

5. An electric lock device for an opening and closing member configured to be openably and closably attached to an opening portion in a fixed member, the electric lock device comprising:

a lock portion provided on one of the opening and closing member and the fixed member;

a rod slidably arranged on an other of the opening and closing member and the fixed member and configured to engage with and disengage from the lock portion;

a biasing member configured to directly or indirectly bias the rod in a direction in which the rod is brought into engagement with the lock portion; and an actuator arranged on the other of the opening and closing member and the fixed member and configured to slide the rod to disengage from the lock portion, wherein the actuator includes a case attached to the other of the opening and closing member and the fixed member, a motor arranged within the case, a wheel configured to rotate in conjunction with the motor, and a rotor rotatably supported within the case and configured to engage with the rod and to cause the rod to engage with and disengage from the lock portion by a rotation operation, the wheel is provided with a pressing portion that is configured to engage with a receiving portion provided on the rotor or the rod when the wheel rotates in a predetermined direction to move the rod against a biasing force of the biasing member in a direction in which the rod disengages from the lock portion, when a rotation force is applied to the rotor in a direction against the biasing force of the biasing member via the rod in a state where the rod is biased by the biasing member in a direction in which the rod is engaged with the lock portion, the rotor is capable of rotating independently of the wheel in a direction in which the receiving portion is separated from the pressing portion, a gear is provided on a drive shaft of the motor, the case includes a cylindrical wall, the wheel includes a peripheral wall in which teeth that mesh with the gear are formed, the peripheral wall of the wheel is arranged inside or outside the cylindrical wall, and the wheel is rotatably supported, and on one of the cylindrical wall and the peripheral wall, an axial notch formed in an opposite portion where the cylindrical wall and the peripheral wall face each other in an axis direction of the cylindrical wall and the peripheral wall and/or a radial concave portion formed in an opposite surface where the cylindrical wall and the peripheral wall face each other in a radial direction of the cylindrical wall and the peripheral wall are provided, and a non-contact surface in which the cylindrical wall and the peripheral wall are not in contact with each other is partially provided.

6. The electric lock device for the opening and closing member according to claim 5, wherein at least a plurality of the axial notches are formed in the cylindrical wall, a plurality of wheel support portions are provided between the axial notches, and when the wheel is viewed from the radial direction, a predetermined wheel support portion is arranged to overlap with the gear.

7. The electric lock device for the opening and closing member according to claim 5, wherein in a rotation range of the wheel configured to be rotated by the motor, a direction of the biasing force of the biasing member from the receiving portion with respect to the pressing portion is not directed to a portion where the gear and the teeth mesh with each other.

8. An electric lock device for an opening and closing member configured to be openably and closably attached to an opening portion in a fixed member, the electric lock device comprising:

a lock portion provided on one of the opening and closing member and the fixed member;

a rod slidably arranged on an other of the opening and closing member and the fixed member and configured to engage with and disengage from the lock portion;

a biasing member configured to directly or indirectly bias the rod in a direction in which the rod is brought into engagement with the lock portion; and an actuator arranged on the other of the opening and closing member and the fixed member and configured to slide the rod to disengage from the lock portion, wherein the actuator includes a case attached to the other of the opening and closing member and the fixed member, a motor arranged within the case, a wheel configured to rotate in conjunction with the motor, and a rotor rotatably supported within the case and configured to engage with the rod and to cause the rod to engage with and disengage from the lock portion by a rotation operation, the wheel is provided with a pressing portion that is configured to engage with a receiving portion provided on the rotor or the rod when the wheel rotates in a predetermined direction to move the rod against a biasing force of the biasing member in a direction in which the rod disengages from the lock portion, when a rotation force is applied to the rotor in a direction against the biasing force of the biasing member via the rod in a state where the rod is biased by the biasing member in a direction in which the rod is engaged with the lock portion, the rotor is capable of rotating independently of the wheel in a direction in which the receiving portion is separated from the pressing portion, the wheel includes a base portion, and a peripheral wall extending from a peripheral edge of the base portion, and the pressing portion is arranged inside the peripheral wall.

9. The electric lock device for the opening and closing member according to claim 8, wherein the pressing portion and the receiving portion are arranged in a region surrounded by the base portion and the peripheral wall of the wheel.

10. The electric lock device for the opening and closing member according to claim 9, wherein a gear is provided on a drive shaft of the motor, the wheel and the rotor are concentrically and rotatably supported by the case, the wheel includes the peripheral wall in which teeth that mesh with the gear are formed, and the pressing portion of the wheel and the receiving portion of the rotor are arranged in the region surrounded by the base portion and the peripheral wall of the wheel.

11. The electric lock device for the opening and closing member according to claim 1, wherein the receiving portion is provided in the rod, a rod engagement portion with which the rod is to be engaged protrudes from a surface side of the rotor, and the pressing portion has a protruding shape protruding from a surface side of the wheel in a same direction as the rod engagement portion.

12. The electric lock device for the opening and closing member according to claim 1, wherein the wheel includes a notch having a diameter larger than that of the shaft hole, the notch and the shaft hole being continuously provided.

13. The electric lock device for the opening and closing member according to claim 1, wherein the wheel includes an outer wall portion extending from a back side peripheral edge of the shaft hole, and a gap exists between an outer periphery of the cylindrical portion of the rotor and an inner periphery of the shaft hole and the outer wall portion of the wheel.

* * * * *